US012720031B2

(12) United States Patent
Misawa

(10) Patent No.: US 12,720,031 B2
(45) Date of Patent: Aug. 25, 2026

(54) VIRTUAL IMAGE DISPLAY APPARATUS, IMAGING APPARATUS, VIRTUAL IMAGE DISPLAY SYSTEM, AND METHOD

(71) Applicant: FUJIFILM Corporation, Tokyo (JP)

(72) Inventor: Atsushi Misawa, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 141 days.

(21) Appl. No.: 18/899,927

(22) Filed: Sep. 27, 2024

(65) Prior Publication Data

US 2025/0024009 A1 Jan. 16, 2025

Related U.S. Application Data

(63) Continuation of application No. PCT/JP2023/012414, filed on Mar. 28, 2023.

(30) Foreign Application Priority Data

Mar. 31, 2022 (JP) ................................ 2022-060129

(51) Int. Cl.
*H04N 13/117* (2018.01)
*H04N 13/156* (2018.01)
(Continued)

(52) U.S. Cl.
CPC ......... *H04N 13/117* (2018.05); *H04N 13/156* (2018.05); *H04N 13/243* (2018.05);
(Continued)

(58) Field of Classification Search
None
See application file for complete search history.

(56) References Cited

U.S. PATENT DOCUMENTS

2018/0324363 A1 11/2018 Wada
2019/0026950 A1 1/2019 Sawaki et al.
(Continued)

FOREIGN PATENT DOCUMENTS

JP 2015-41126 A 3/2016
JP 2017-224913 A 12/2017
(Continued)

OTHER PUBLICATIONS

International Preliminary Report on Patentability and Written Opinion of the International Searching Authority for International Application No. PCT/JP2023/012414, dated Oct. 10, 2024, with an English translation.

(Continued)

*Primary Examiner* — Kee M Tung
*Assistant Examiner* — Biao Chen
(74) *Attorney, Agent, or Firm* — Birch, Stewart, Kolasch & Birch, LLP

(57) ABSTRACT

A virtual image display apparatus, an imaging apparatus, a virtual image display system, and a method for displaying an image that cannot be displayed by an imaging apparatus alone, by superimposing a virtual image on a real world are provided. A virtual image display apparatus (100) including a processor and a first display receives a live view image from an imaging apparatus (200). The processor is configured to acquire transformation information used in superimposing the live view image on a display region of the imaging apparatus (200), and geometrically transform the live view image based on the transformation information. The first display displays the geometrically transformed live view image. A user can visually recognize the virtual live view image superimposed on the display region of the imaging apparatus (200) through an optical system (146).

28 Claims, 32 Drawing Sheets

(51) Int. Cl.

| | |
|---|---|
| ***H04N 13/243*** | (2018.01) |
| ***H04N 13/296*** | (2018.01) |
| ***H04N 13/361*** | (2018.01) |
| ***H04N 13/398*** | (2018.01) |

(52) U.S. Cl.

CPC ......... *H04N 13/296* (2018.05); *H04N 13/361* (2018.05); *H04N 13/398* (2018.05)

(56) References Cited

U.S. PATENT DOCUMENTS

| | | | | |
|---|---|---|---|---|
| 2022/0163802 | A1* | 5/2022 | Mima | G02B 27/017 |
| 2022/0382390 | A1* | 12/2022 | Ikeda | H04N 13/344 |

FOREIGN PATENT DOCUMENTS

| | | | |
|---|---|---|---|
| JP | 2019-21236 | A | 2/2019 |
| WO | WO 2017/122513 | A1 | 7/2017 |

OTHER PUBLICATIONS

International Search Report for International Application No. PCT/JP2023/012414, dated May 16, 2023, with an English translation.

* cited by examiner 200
203
240
242

Figure 31:
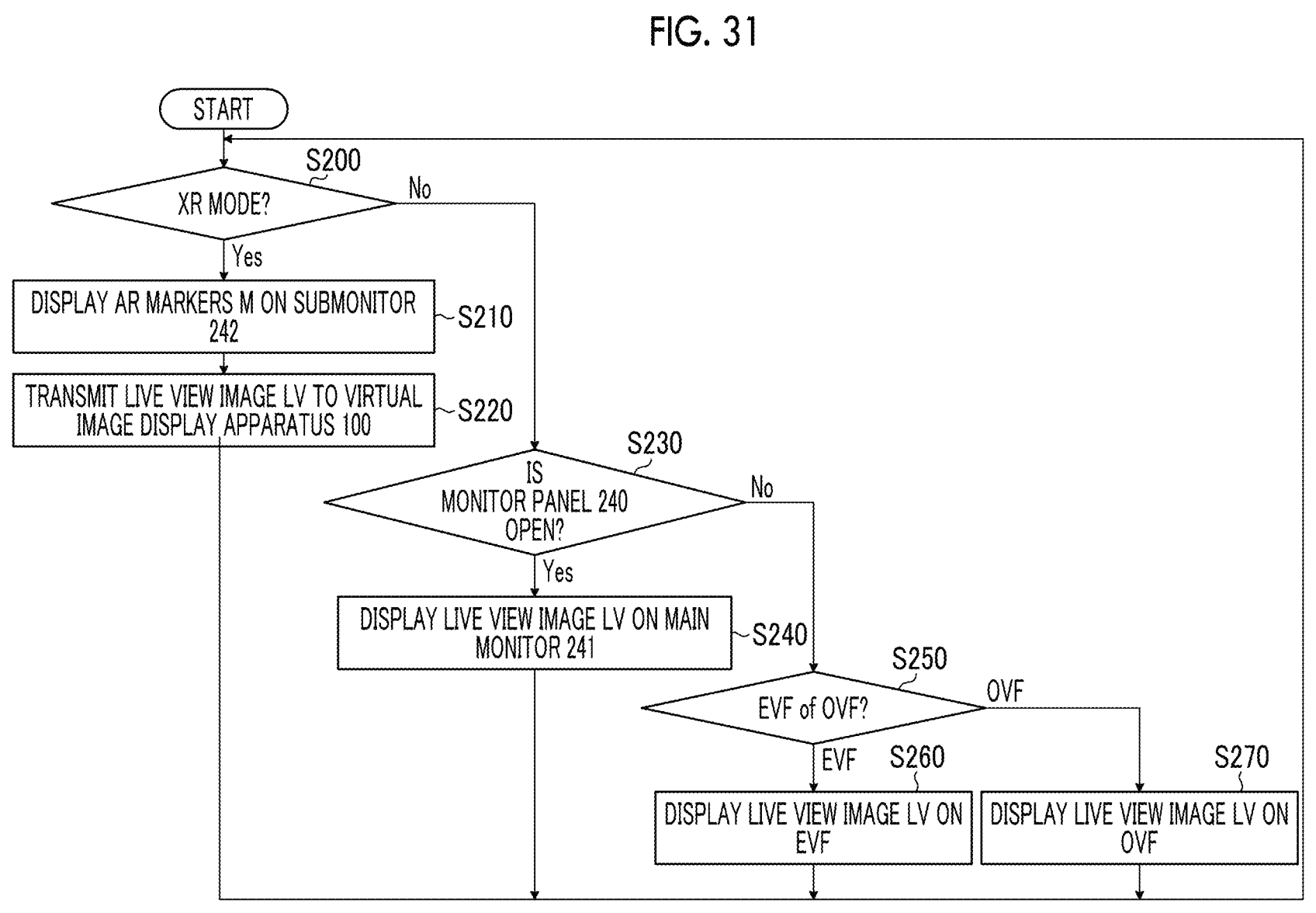

START

S200
XR MODE?
Yes
No

S210
DISPLAY AR MARKERS M ON SUBMONITOR 242

S220
TRANSMIT LIVE VIEW IMAGE LV TO VIRTUAL IMAGE DISPLAY APPARATUS 100

S230
IS MONITOR PANEL 240 OPEN?
Yes
No

S240
DISPLAY LIVE VIEW IMAGE LV ON MAIN MONITOR 241

S250
EVF of OVF?
EVF
OVF

S260
DISPLAY LIVE VIEW IMAGE LV ON EVF

S270
DISPLAY LIVE VIEW IMAGE LV ON OVF

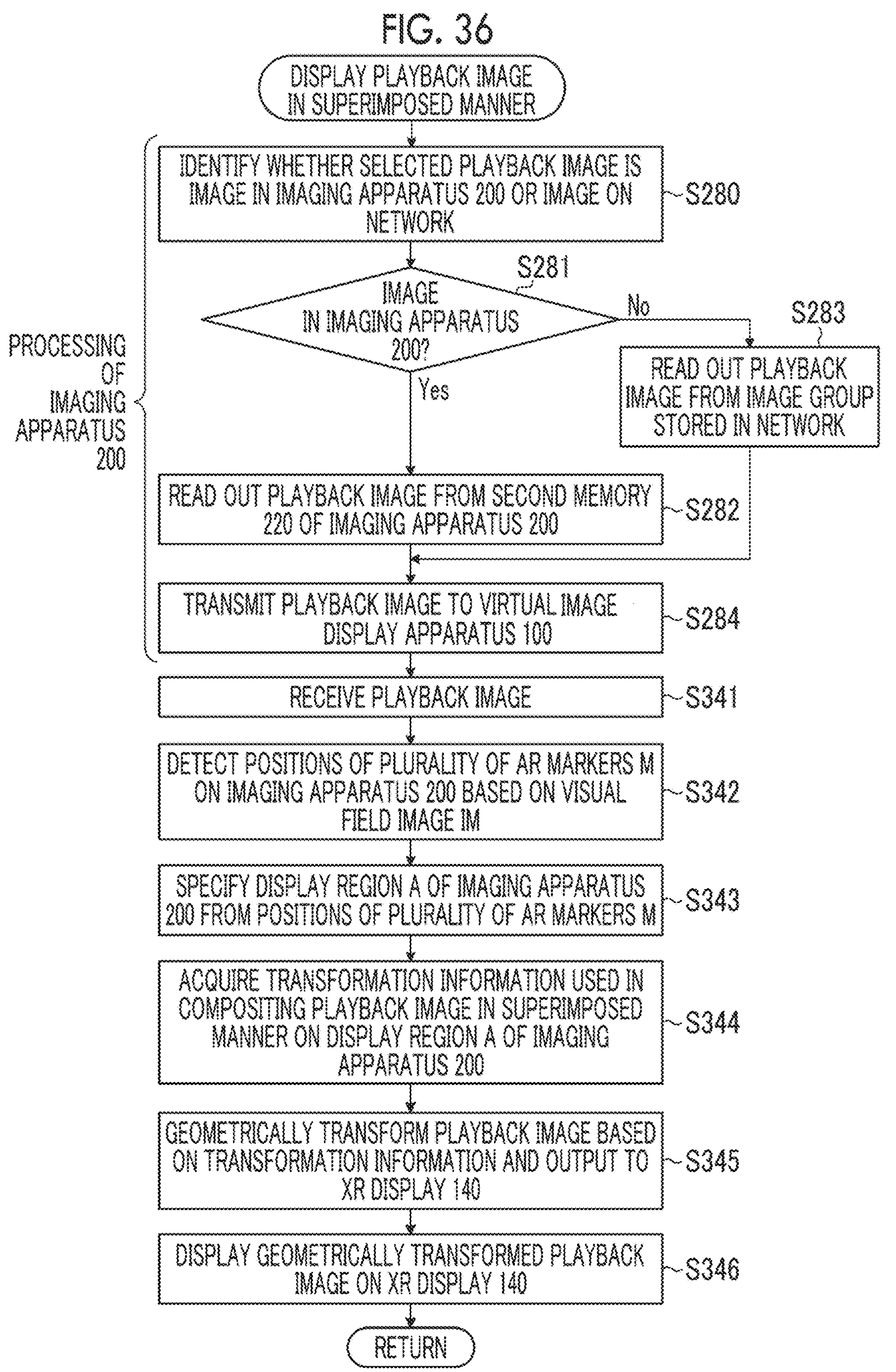
FIG. 36
DISPLAY PLAYBACK IMAGE IN SUPERIMPOSED MANNER
PROCESSING OF IMAGING APPARATUS 200
IDENTIFY WHETHER SELECTED PLAYBACK IMAGE IS IMAGE IN IMAGING APPARATUS 200 OR IMAGE ON NETWORK
S280
S281
IMAGE IN IMAGING APPARATUS 200?
No
Yes
S283
READ OUT PLAYBACK IMAGE FROM IMAGE GROUP STORED IN NETWORK
READ OUT PLAYBACK IMAGE FROM SECOND MEMORY 220 OF IMAGING APPARATUS 200
S282
TRANSMIT PLAYBACK IMAGE TO VIRTUAL IMAGE DISPLAY APPARATUS 100
S284
RECEIVE PLAYBACK IMAGE
S341
DETECT POSITIONS OF PLURALITY OF AR MARKERS M ON IMAGING APPARATUS 200 BASED ON VISUAL FIELD IMAGE IM
S342
SPECIFY DISPLAY REGION A OF IMAGING APPARATUS 200 FROM POSITIONS OF PLURALITY OF AR MARKERS M
S343
ACQUIRE TRANSFORMATION INFORMATION USED IN COMPOSITING PLAYBACK IMAGE IN SUPERIMPOSED MANNER ON DISPLAY REGION A OF IMAGING APPARATUS 200
S344
GEOMETRICALLY TRANSFORM PLAYBACK IMAGE BASED ON TRANSFORMATION INFORMATION AND OUTPUT TO XR DISPLAY 140
S345
DISPLAY GEOMETRICALLY TRANSFORMED PLAYBACK IMAGE ON XR DISPLAY 140
S346
RETURN

VIRTUAL IMAGE DISPLAY APPARATUS, IMAGING APPARATUS, VIRTUAL IMAGE DISPLAY SYSTEM, AND METHOD

CROSS-REFERENCE TO RELATED APPLICATIONS

The present application is a Continuation of PCT International Application No. PCT/JP2023/012414 filed on Mar. 28, 2023 claiming priority under 35 U.S.C § 119(a) to Japanese Patent Application No. 2022-060129 filed on Mar. 31, 2022. Each of the above applications is hereby expressly incorporated by reference, in its entirety, into the present application.

BACKGROUND OF THE INVENTION

1. Field of the Invention

The present invention relates to a virtual image display apparatus, an imaging apparatus, a virtual image display system, and a method, and particularly to a technology for displaying a virtual image in a superimposed manner on a real world.

2. Description of the Related Art

In the related art, a method of executing imaging in a virtual space and enabling a photograph (image) generated by the imaging to be easily checked has been suggested (JP2019-21236A).

The method according to JP2019-21236A includes disposing a virtual camera at a center of the virtual space provided using a head-mounted device (HMD), generating an image corresponding to an imaging range of the virtual camera from a position and a posture of the virtual camera, and displaying the generated image on a preview screen of the virtual camera. In a case where the imaging in the virtual space is performed in accordance with an imaging instruction from a user, a photographic image is generated and stored in a memory. The generated photographic image is disposed at a predetermined position in the virtual space, and the user wearing the HMD is notified of a position at which the photographic image is disposed.

The virtual camera according to JP2019-21236A is a camera object that is generated based on object information stored in a memory module and that is disposed in the virtual space. In a case where a button provided on the camera object is pushed by a hand object corresponding to a hand part of an avatar object, the virtual camera executes the imaging in the virtual space. The hand object corresponding to the hand part of the avatar object moves in conjunction with a position of a hand of the user. While a captured video of the virtual camera is provided using an HMD device in JP2019-21236A, a method of transmissive smart glasses, retinal projection, or the like can also be considered.

JP2015-41126A suggests an information processing apparatus that effectively uses augmented reality (AR) technology of combining a real world with a virtual world in a game or the like.

The information processing apparatus according to JP2015-41126A acquires a captured image from a rear surface camera that captures a real space. In a case where a marker included in the captured image is detected, the information processing apparatus starts information processing (a game) corresponding to the marker, draws virtual objects of a character and an icon corresponding to the marker on the captured image by disposing the virtual objects in a three-dimensional coordinate system corresponding to a subject space, and displays the captured image on a display device on an outer surface. The icon is represented as being placed on a plane on which the marker is placed, and can be operated based on any one of contact with a touch pad on a display screen or an instruction that is provided by a finger and that indicates a corresponding position in the subject space.

SUMMARY OF THE INVENTION

An embodiment according to the disclosed technology provides a virtual image display apparatus, an imaging apparatus, a virtual image display system, and a method for displaying an image that cannot be displayed by an imaging apparatus of the related art alone, by superimposing a virtual image on a real world.

According to a first aspect of the invention, there is provided a virtual image display apparatus comprising a processor, and a first display, in which the virtual image display apparatus receives a live view image from a first imaging apparatus, the processor is configured to acquire information used in superimposing the live view image on a display region of the first imaging apparatus, and transform the live view image based on the information, and the first display displays the transformed live view image.

According to a second aspect of the present invention, in the virtual image display apparatus, it is preferable that the first display is a wearable device having an eyewear type or goggles type virtual image display function.

According to a third aspect of the present invention, the virtual image display apparatus further comprises a second imaging apparatus that images a visual field range of a user, in which the processor is configured to specify the display region by analyzing a captured image captured by the second imaging apparatus and acquire the information.

According to a fourth aspect of the present invention, in the virtual image display apparatus, the processor is configured to acquire the information based on a position of a marker of the first imaging apparatus imaged by the second imaging apparatus.

According to a fifth aspect of the present invention, in the virtual image display apparatus, the processor is configured to acquire information indicating a three-dimensional position and a posture of the first imaging apparatus with reference to the first display and acquire the information based on the information indicating the three-dimensional position and the posture.

According to a sixth aspect of the present invention, in the virtual image display apparatus, it is preferable that the first imaging apparatus includes a second display that displays the live view image, and the display region is a display region of the second display.

According to a seventh aspect of the present invention, in the virtual image display apparatus, it is preferable that the second display includes a rotational moving mechanism capable of changing a relative posture relationship with an apparatus body of the first imaging apparatus by rotationally moving the second display, and the display region is a display region of the rotationally moved second display.

According to an eighth aspect of the present invention, in the virtual image display apparatus, it is preferable that the first imaging apparatus includes a view finder, and the display region is a display region of the view finder.

According to a ninth aspect of the present invention, in the virtual image display apparatus, it is preferable that the first display is a display through which a visual field is seen, and displays the transformed live view image in a visual field in a real world.

According to a tenth aspect of the present invention, it is preferable that the virtual image display apparatus further comprises a second imaging apparatus that images a visual field range of a user, in which the first display is an immersive type display covering a visual field, and displays a composite image obtained by superimposing the transformed live view image on a captured image captured by the second imaging apparatus.

According to an eleventh aspect of the present invention, in the virtual image display apparatus, it is preferable that the processor is configured to composite a virtual object image in the live view image.

According to a twelfth aspect of the present invention, there is provided a virtual image display apparatus comprising a processor, a first display, and a second imaging apparatus that images a visual field range of a user, in which the processor is configured to cut out an image corresponding to an angle of view of a virtual camera including at least a grip portion from an image captured by the second imaging apparatus and acquire the cut image as a live view image, acquire information used in superimposing the live view image on a display region of the virtual camera, and transform the live view image based on the information, and the first display displays the transformed live view image.

According to a thirteenth aspect of the present invention, in the virtual image display apparatus, it is preferable that the transformation is geometric transformation.

According to a fourteenth aspect of the invention, there is provided an imaging apparatus comprising an imaging unit that captures a live view image, a mode switching unit that switches between a first mode and a second mode, a second display or a view finder that displays the live view image in a case where the imaging apparatus is switched to the first mode, and a communication unit that transmits the live view image to the virtual image display apparatus according to any one of the first to eleventh aspects in a case where the imaging apparatus is switched to the second mode.

According to a fifteenth aspect of the present invention, in the imaging apparatus, it is preferable that in a case where the imaging apparatus is switched to the second mode, a marker is displayed on the second display or the view finder.

According to a sixteenth aspect of the invention, there is provided a virtual image display system comprising the virtual image display apparatus according to any one of the first to thirteenth aspects, and the imaging apparatus according to the fourteenth or fifteenth aspect.

According to a seventeenth aspect of the present invention, in the virtual image display system, it is preferable that the processor of the virtual image display apparatus is configured to composite a virtual object image in the live view image, and in a case where imaging for recording is performed in a state where the imaging apparatus is switched to the second mode, transmit the virtual object image to the imaging apparatus, and in a case of performing the imaging for recording in a state where the imaging apparatus is switched to the second mode, the imaging apparatus records the captured image and the virtual object image received from the virtual image display apparatus in association with each other or records the captured image and the virtual object image by compositing the virtual object image in the captured image.

According to an eighteenth aspect of the invention, there is provided a virtual image display system comprising the virtual image display apparatus according to any one of the first to eleventh aspects, and a server that communicates with the virtual image display apparatus, in which the server manages a three-dimensional image having three-dimensional information of a real space, and the processor is configured to cut out a three-dimensional image corresponding to an imaging region of the first imaging apparatus from the three-dimensional image managed by the server based on first information indicating a three-dimensional position and a posture of the first imaging apparatus, and transform the cut three-dimensional image into a two-dimensional image and use the two-dimensional image as the live view image.

According to a nineteenth aspect of the invention, there is provided a virtual image display system comprising the virtual image display apparatus according to the twelfth aspect, and a server that communicates with the virtual image display apparatus, in which the server manages a three-dimensional image having three-dimensional information of a real space, and the processor is configured to cut out a three-dimensional image corresponding to an imaging region of the virtual camera from the three-dimensional image managed by the server based on first information indicating a three-dimensional position and a posture of the virtual camera, and transform the cut three-dimensional image into a two-dimensional image and use the two-dimensional image as the live view image.

According to a twentieth aspect of the present invention, in the virtual image display system, it is preferable that the server generates and manages the latest three-dimensional image from images captured by a large number of cameras including a multi-view camera, a surveillance camera, a driving recorder, a drone camera, or a portable terminal camera disposed in a real space.

According to a twenty-first aspect of the present invention, in the virtual image display system, it is preferable that the server composites a virtual object image in the three-dimensional image.

According to a twenty-second aspect of the invention, there is provided a virtual image display method executed by a virtual image display apparatus including a processor and a first display, the method comprising a step of receiving a live view image from a first imaging apparatus via the processor, a step of acquiring information used in superimposing the live view image on a display region of the first imaging apparatus via the processor, a step of transforming the live view image based on the information via the processor, and a step of displaying the transformed live view image via the first display.

BRIEF DESCRIPTION OF THE DRAWINGS

FIG. 31 is a flowchart illustrating a display method performed by the imaging apparatus according to the embodiment of the present invention.

FIG. 36 is a subroutine illustrating an embodiment of processing of step S340 illustrated in FIG. 32 in which a playback image is displayed in a superimposed manner.

DESCRIPTION OF THE PREFERRED EMBODIMENTS

Hereinafter, preferred embodiments of a virtual image display apparatus, an imaging apparatus, a virtual image display system, and a method according to an embodiment of the present invention will be described with reference to the accompanying drawings.

[Summary of Virtual Image Display System]

Figure 1:
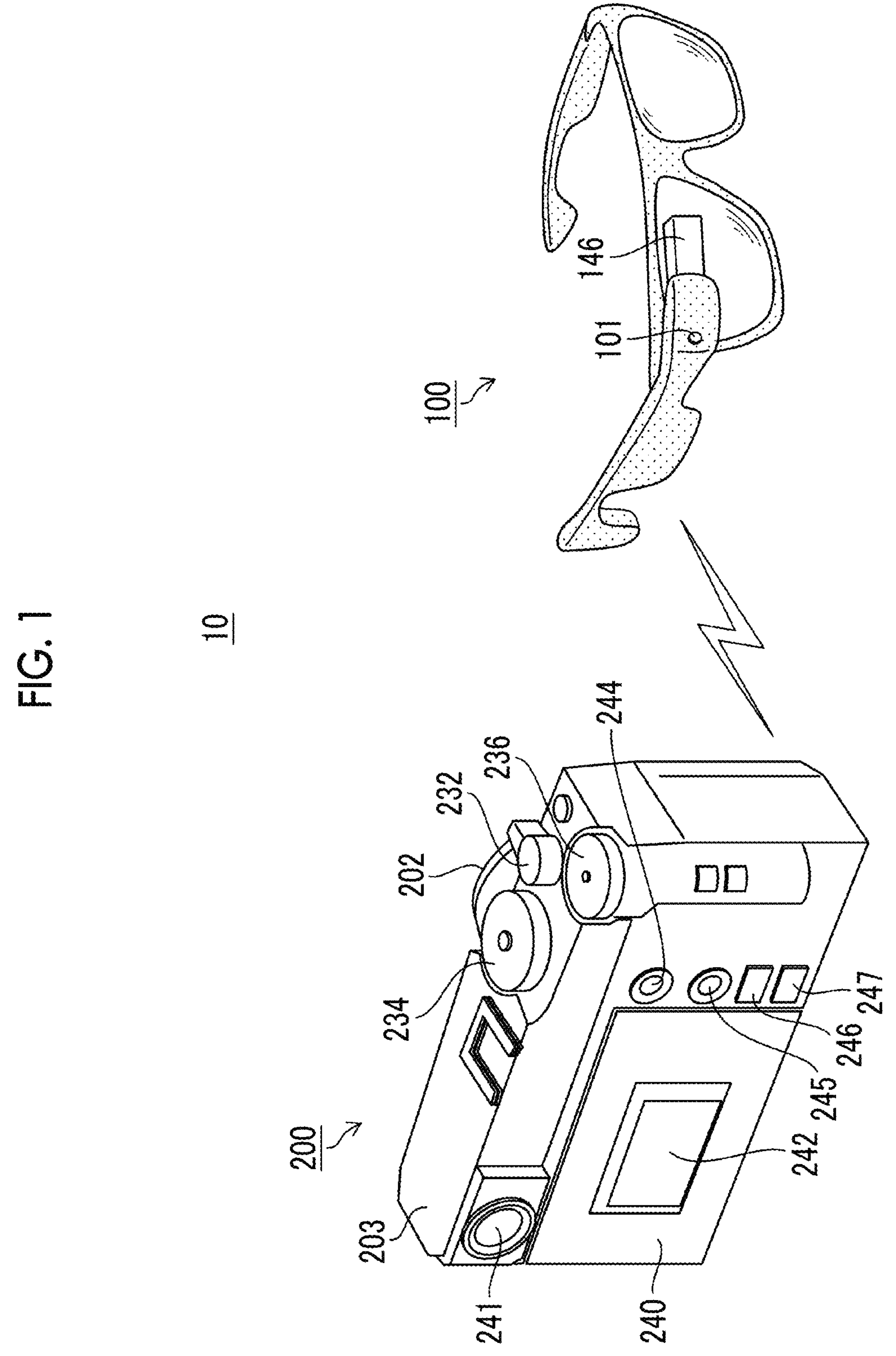
FIG. 1 is a diagram illustrating a system configuration of a virtual image display system according to an embodiment of the present invention.

FIG. 1 is a diagram illustrating a system configuration of the virtual image display system according to the embodiment of the present invention.

A virtual image display system 10 illustrated in FIG. 1 is composed of a virtual image display apparatus 100 and a first imaging apparatus (hereinafter, simply referred to as an "imaging apparatus") 200. The virtual image display apparatus 100 and the imaging apparatus 200 communicate with each other. The communication is preferably short range wireless communication of a standard such as Bluetooth (registered trademark) or Wireless Fidelity (Wi-Fi) (registered trademark) but may also be wired.

The virtual image display apparatus 100 of this embodiment is a wearable device having an eyewear type virtual image display function and comprises a processor and a first display (not illustrated), and a second imaging apparatus (hereinafter, referred to as an "incorporated camera").

The first display is a display for implementing augmented reality (AR), virtual reality (VR), mixed reality (MR), or cross reality (X reality (XR)) which is a generic term for AR, VR, and MR.

AR is a technology for "virtually expanding" a real world in front of eyes by superimposing a virtual world (a virtual image or the like) on the real world seen through eyewear. VR has a feature that enables deep immersion in an unreal world by displaying a video or the like captured by a camera on VR goggles or a VR headset and blocking the real world via the VR goggles or the like. MR is a technology for displaying a virtual object or information in a superimposed manner on the real world. While this is similar to AR, MR is a technology further developed from AR and enables displaying digital information in accordance with a position or a motion of a user or allowing the user to operate the digital information by directly touching the digital information.

The first display (hereinafter, referred to as an "XR display") of the virtual image display apparatus 100 illustrated in FIG. 1 has an AR or MR display function of superimposing the virtual world on the real world seen through glasses (eyewear).

In FIG. 1, 146 denotes an optical system including a half mirror of the virtual image display apparatus 100 (hereinafter, also referred to as "smart glasses"). A video (virtual image) displayed on a display element of the smart glasses is superimposed on the real world through the optical system 146. Details of the smart glasses will be described later.

Figure 2:
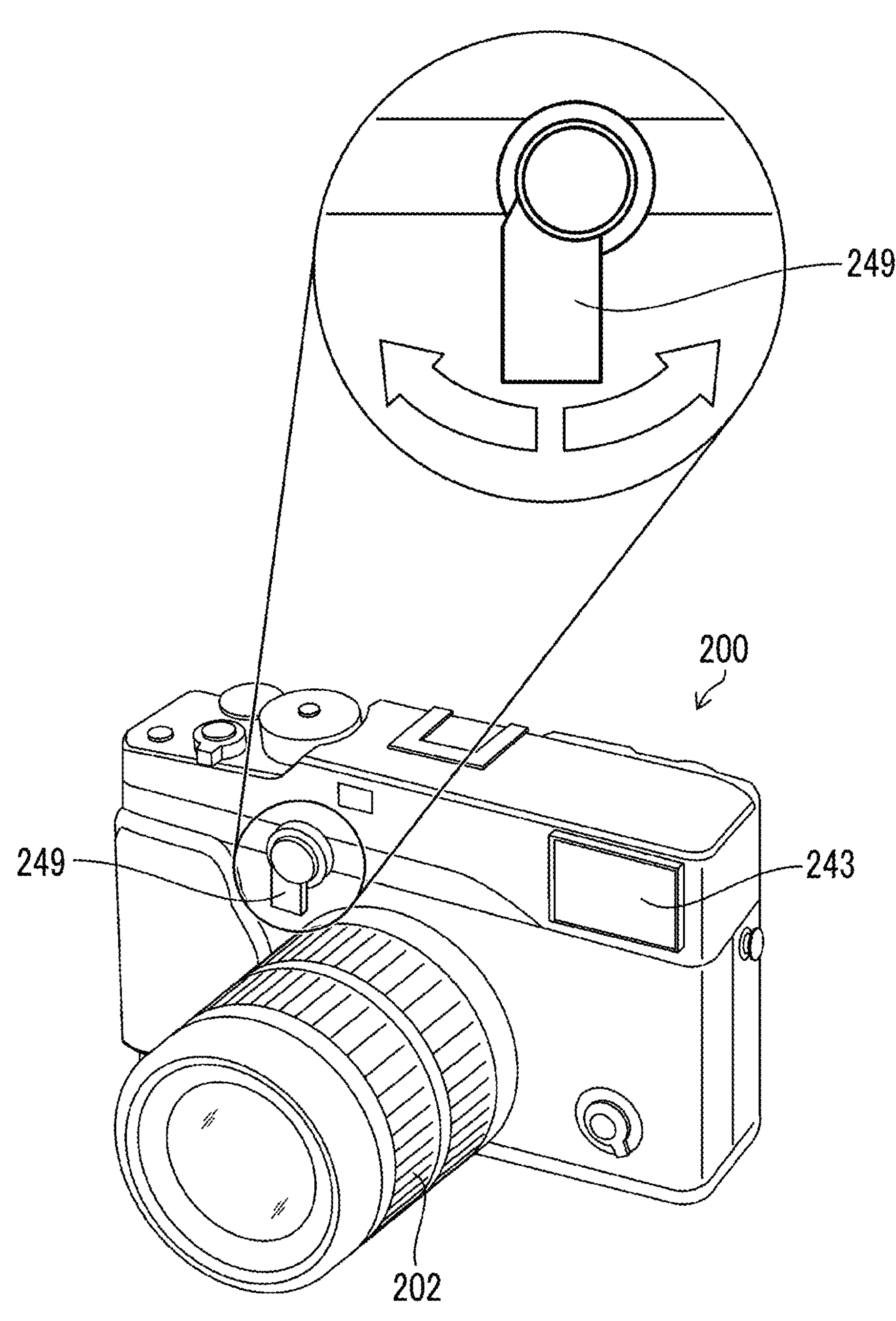
FIG. 2 is a perspective view of an imaging apparatus illustrated in FIG. 1 seen from its front side.

FIG. 2 is a perspective view of the imaging apparatus illustrated in FIG. 1 seen from its front side.

The imaging apparatus 200 illustrated in FIGS. 1 and 2 is a mirrorless single-lens digital camera composed of an interchangeable lens 202 and a camera body (apparatus body) 203 to and from which the interchangeable lens 202 is attachable and detachable. The imaging apparatus 200 is not limited to a mirrorless single-lens digital camera and may be a single-lens reflex digital camera, a lens-integrated digital camera in which a lens is not interchangeable, a smartphone having a camera function, or a personal digital assistant (PDA).

In FIG. 1, a shutter button 232, a shutter speed/sensitivity dial 234, an exposure correction dial 236, and the like are provided on an upper surface of the camera body 203.

A monitor panel 240 is disposed on a rear surface that is one wall surface of the camera body 203, in a rotationally movable manner through a rotational moving mechanism (not illustrated).

Figures 3A, 3B, 3C:
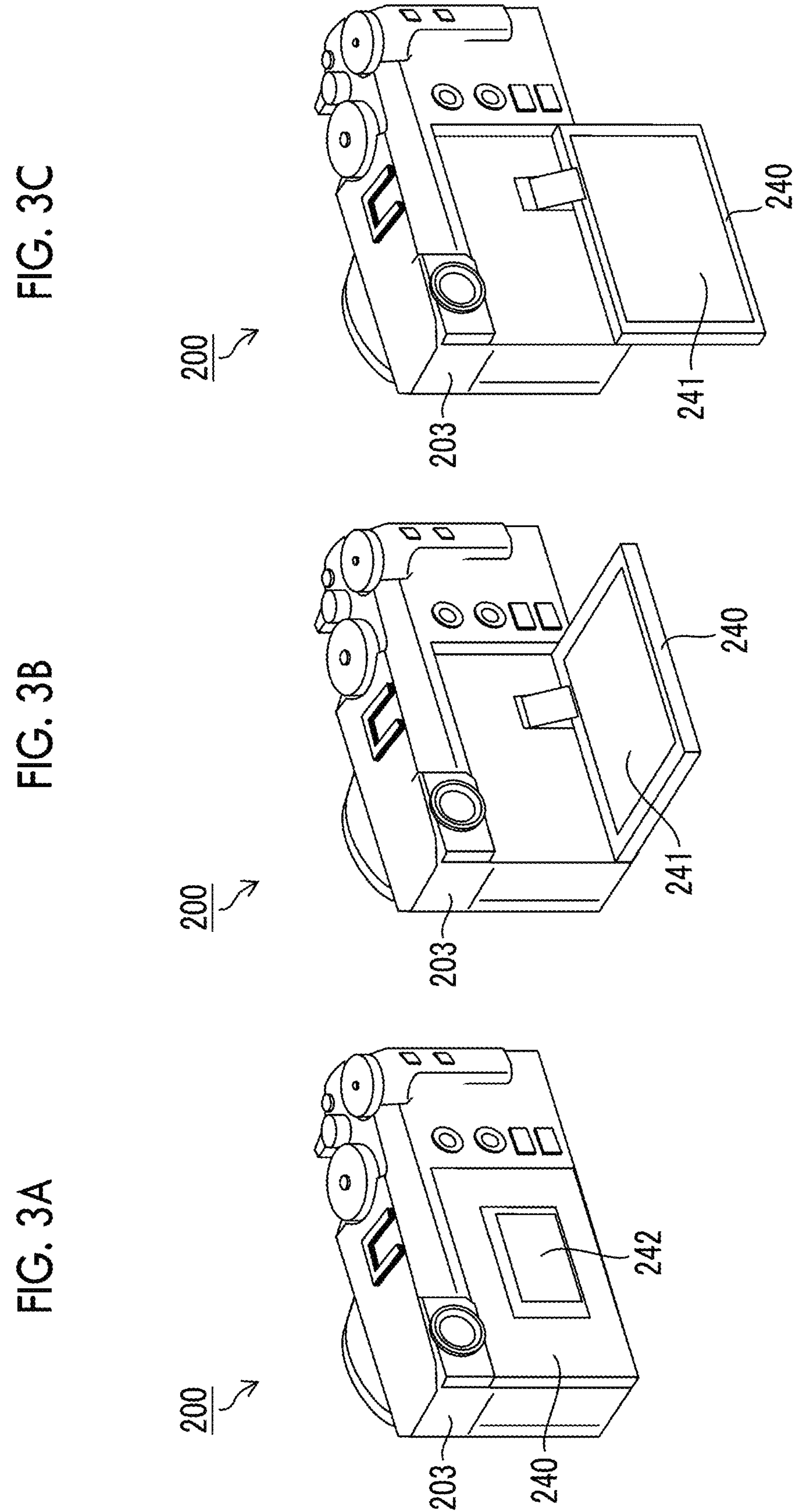
FIGS. 3A to 3C are diagrams illustrating three opening and closing states of a monitor panel of the imaging apparatus.

FIGS. 3A to 3C are diagrams illustrating three opening and closing states of the monitor panel of the imaging apparatus.

As illustrated in FIGS. 3A to 3C, the monitor panel 240 is a tilt type panel of which a relative posture relationship with the camera body 203 can be changed by rotational movement.

FIG. 3A illustrates the imaging apparatus 200 in a state where the monitor panel 240 is closed, and FIGS. 3B and 3C illustrate the imaging apparatus 200 in a state where the monitor panel 240 is rotationally moved by 90° and 180°.

A main monitor (second display) 241 is disposed on a surface (inner surface) that is on an inner side of the monitor panel 240 and that is hidden in a case where the monitor panel 240 is closed, and a submonitor 242 is disposed on a surface (outer surface) that is substantially flush with a camera exterior in a case where the monitor panel 240 is closed.

The main monitor 241 can be operated in a case where the monitor panel 240 is open as illustrated in FIGS. 3B and 3C, and displays a live view image, a recorded image (playback image), or the like. The submonitor 242 can be operated in a case where the monitor panel 240 is closed as illustrated in FIGS. 1 and 3A, and displays a shutter speed, an F number, an ISO sensitivity, and other types of information related to imaging (imaging information).

As illustrated in FIG. 1, an eyepiece portion of a view finder 243 is disposed on the rear surface of the camera body 203. The view finder 243 is a hybrid finder that can switch between an electronic view finder (EVF) and an optical view finder (OVF).

During OVF display, displaying or not displaying an electronic range finder (ERF) (a small window for displaying the EVF) on a part of the OVF can be selected. The ERF can perform three types of display including a visual field ratio of 100%, 2.5-fold enlargement, and 6-fold enlargement and enables checking focus and monitoring an angle of view, exposure, and white balance during imaging using the OVF.

As illustrated in FIG. 2, a finder switching lever 249 for switching between the EVF and the OVF of the view finder 243 is provided on a camera front surface.

In a case where the finder switching lever 249 is rotationally moved in a clockwise direction on FIG. 2, the EVF and the OVF can be switched between each other. In a case where the finder switching lever 249 is rotationally moved in a counterclockwise direction on FIG. 2 during the OVF display, displaying and not displaying the ERF can be switched between each other.

A toggle switch 244 for providing an instruction indicating a plurality of directions such as upward, downward, leftward, and rightward directions, a menu/execution button 245, a play button 246, a display/return button 247, and the like are provided on the rear surface of the camera body 203.

A plurality of function buttons to which various functions can be assigned are also provided.

[Summary of Virtual Image Display System]

Figure 4:
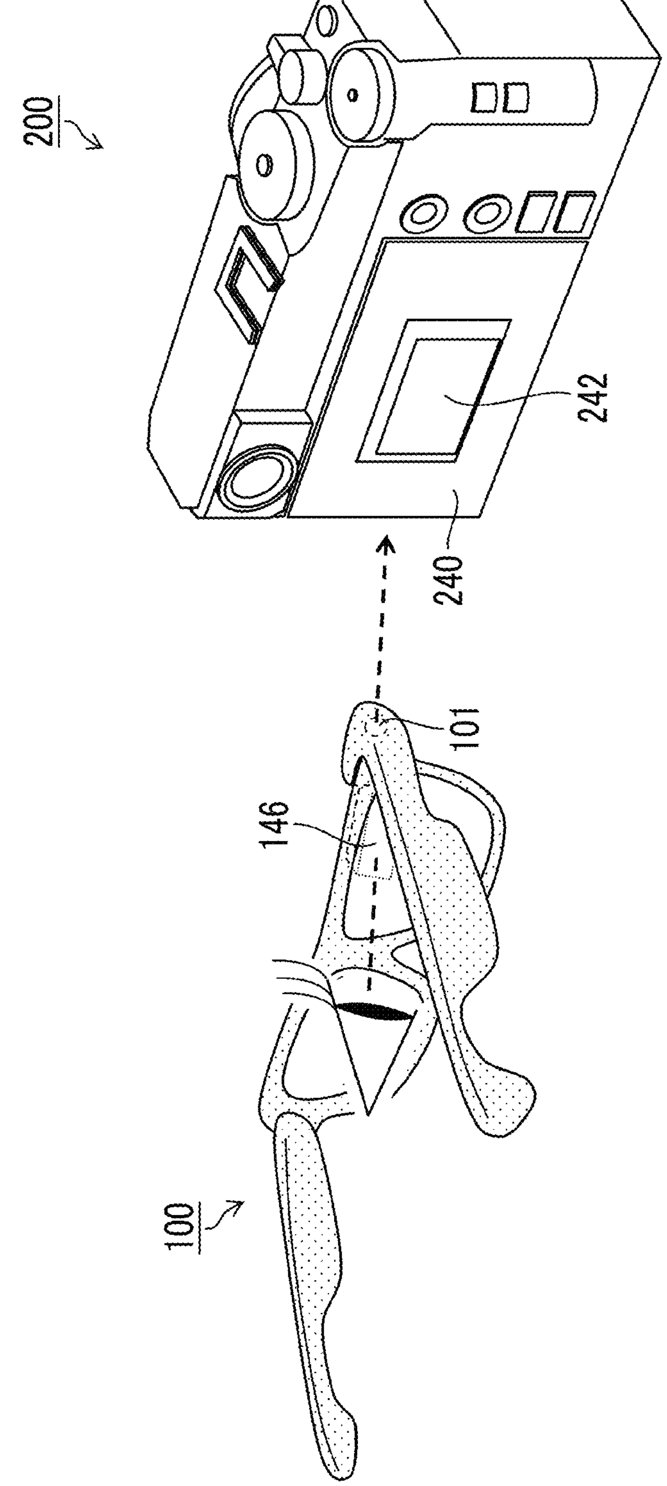
FIG. 4 is a diagram illustrating a state where a visual field image including the imaging apparatus is captured by a second imaging apparatus of a virtual image display apparatus.

FIG. 4 is a diagram illustrating a state where a visual field image including the imaging apparatus is captured by the second imaging apparatus of the virtual image display apparatus.

In FIG. 4, the incorporated camera 101 of the virtual image display apparatus 100 captures the visual field image corresponding to a visual field of the user including the imaging apparatus 200. The incorporated camera 101 captures the visual field image corresponding to the visual field of the user in a case where the user is wearing the smart glasses with pupils of the user facing the front.

The user performs various operations such as framing by holding the imaging apparatus 200 in a hand.

In a case where the imaging apparatus 200 is being used in an XR environment, a live view image generated by operating the imaging apparatus 200 is transmitted to the virtual image display apparatus 100 as continuous data.

The processor of the virtual image display apparatus 100 specifies a display region of the imaging apparatus 200 based on an image (camera image) of the imaging apparatus 200 present in the visual field image. This display region is not limited to a display region in which an image can be displayed in reality, such as the main monitor 241 or the submonitor 242 of the imaging apparatus 200 illustrated in FIGS. 3A to 3C. For example, the display region may be a region set in advance on the rear surface which is one wall surface of the camera body 203.

While the user can visually recognize the imaging apparatus 200 in the real world through the smart glasses, the processor displays the live view image (virtual image) received from the imaging apparatus 200 in a superimposed manner on a specific display region of the real imaging apparatus 200 through the optical system 146 of the smart glasses, by transforming (geometrically transforming) the live view image and displaying the transformed live view image on the smart glasses.

Figure 5:
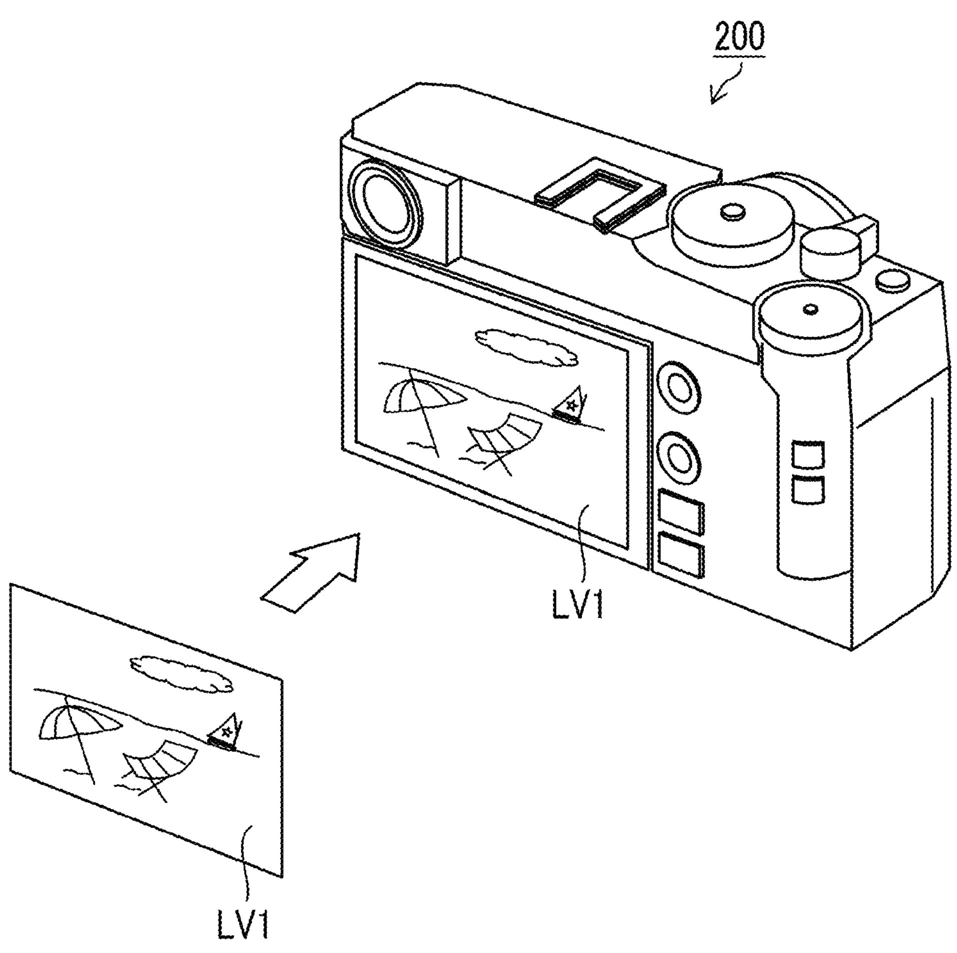
FIG. 5 is a diagram illustrating a state where a live view image is superimposed on a specific display region of the imaging apparatus.

FIG. 5 is a diagram illustrating a state where the live view image is superimposed on the specific display region of the imaging apparatus.

A live view image LV1 that is geometrically transformed is displayed at a display position in front of eyes of the user wearing the smart glasses through the optical system 146. Accordingly, the user can visually recognize the real imaging apparatus 200 through the smart glasses as illustrated in FIG. 5 and can observe the live view image LV1 such that an image (live view image LV1) that is composited (pasted) in the specific display region of the imaging apparatus 200 and that is on the XR environment not existing in actuality is displayed on the imaging apparatus 200.

While the imaging apparatus 200 illustrated in FIGS. 1 and 3A to 3C does not comprise a real monitor that displays the live view image LV1 of a size illustrated in FIG. 5, the user is enabled to visually recognize the imaging apparatus 200 as comprising a display that displays the live view image LV1 illustrated in FIG. 5 by displaying the live view image LV1 on the virtual image display apparatus 100.

According to the virtual image display system 10, the user observes the live view image LV1 composited in the specific display region using the smart glasses instead of seeing the specific display region (real world) on a rear surface of the imaging apparatus 200. Thus, even in a case where it is difficult to see the real specific display region because of irradiation with direct sunlight, the live view image LV1 can be favorably observed.

The imaging apparatus 200 is a camera product in the real world. Thus, good operability is provided in performing an imaging operation for artwork purposes, and high quality of an imaging experience can be maintained. Even in a case where the imaging apparatus 200 is used with its position and its angle moved for framing or the like, the live view image LV1 can be displayed to follow the imaging apparatus 200 on the smart glasses, and an opportunity to push the shutter button can be secured even in imaging with a sudden motion (such as in imaging sports, panning, or imaging a child or a pet) that requires a quick operation of the imaging apparatus 200.

The visual field image captured by the incorporated camera 101 of the smart glasses is used for acquiring information (transformation information) used in obtaining a specific display region (coordinates) of the camera image in the visual field image and superimposing the live view image on the specific display region of the imaging apparatus 200. In a case where an immersive type display (VR goggles) that covers the visual field (field of view) is used instead of the smart glasses, the visual field image is also used as a visual field image displayed on the VR goggles.

<Embodiment of Virtual Image Display Apparatus>

Figure 6:
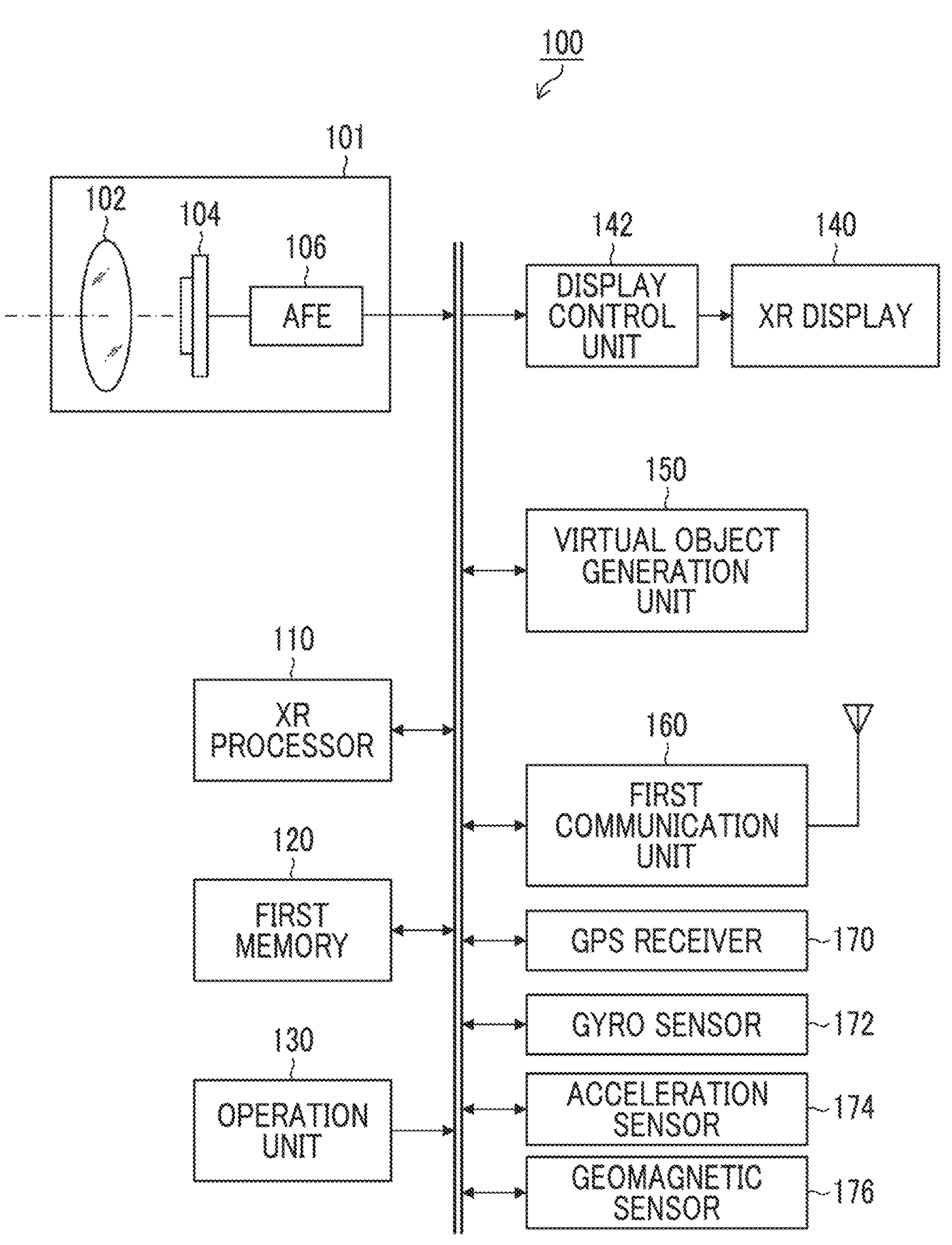
FIG. 6 is a block diagram illustrating an embodiment of the virtual image display apparatus constituting the virtual image display system according to the embodiment of the present invention.

FIG. 6 is a block diagram illustrating an embodiment of the virtual image display apparatus constituting the virtual image display system according to the embodiment of the present invention.

The virtual image display apparatus 100 illustrated in FIG. 6 is a block diagram illustrating an internal configuration of the virtual image display apparatus 100 having an exterior shape illustrated in FIG. 1.

The virtual image display apparatus 100 comprises the incorporated camera 101, a processor (XR processor) 110, a first memory 120, an operation unit 130, an XR display 140 that is the first display having a virtual image display function, a display control unit 142, a virtual object generation unit 150, a first communication unit 160, a global positioning system (GPS) receiver 170, a gyro sensor 172, an acceleration sensor 174, a geomagnetic sensor 176, and the like.

The incorporated camera 101 includes an imaging lens 102, an image sensor 104, and an analog front end (AFE) 106.

In a case of performing imaging by holding the imaging apparatus 200 in a hand, the incorporated camera 101 captures the visual field image including the imaging apparatus 200 (camera image). Thus, the imaging lens 102 preferably has an angle of view larger than or equal to a visual angle of a person.

The image sensor 104 can be composed of a complementary metal-oxide semiconductor (CMOS) type color image sensor. The image sensor 104 is not limited to a CMOS type and may be a charge coupled device (CCD) type image sensor.

An optical image of a subject formed on a light-receiving surface of the image sensor 104 by the imaging lens 102 is converted into an electrical signal by the image sensor 104. Charges corresponding to a quantity of incident light is accumulated in each pixel of the image sensor 104. An electrical signal corresponding to an amount of charges (signal charges) accumulated in each pixel is read out from the image sensor 104 as an image signal.

The AFE 106 performs various types of analog signal processing on an analog image signal output from the image sensor 104. The AFE 106 includes a correlated double sampling circuit, an automatic gain control (AGC) circuit, and an analog-digital conversion circuit (A/D conversion circuit) (none illustrated). The correlated double sampling circuit removes noise caused by resetting the signal charges by performing correlated double sampling processing on the analog signal from the image sensor 104. The AGC circuit amplifies the analog signal in which noise is removed by the correlated double sampling circuit, so that a signal level of the analog signal falls within an appropriate range. The A/D conversion circuit converts the image signal having a gain adjusted by the AGC circuit into a digital signal.

In a case where the image sensor 104 is a CMOS type image sensor, the AFE 106 is generally incorporated in the image sensor 104.

The XR processor 110 is composed of a central processing unit (CPU) or the like, controls each unit in an integrated manner, and performs various types of processing such as processing of acquiring information (transformation information) used in superimposing the live view image received from the imaging apparatus 200 through the first communication unit 160 on the specific display region of the imaging apparatus 200 and processing of transforming (geometrically transforming) the live view image based on the information and outputting the transformed live view image to the XR display 140. Details of the processing performed by the XR processor 110 will be described later.

The first memory 120 includes a flash memory, a read-only memory (ROM), a random access memory (RAM), and the like. The flash memory and the ROM are non-volatile memories storing various programs including firmware, parameters, images (virtual object images) indicating various virtual objects including an avatar, and the like.

The RAM functions as a work region of the processing performed by the XR processor 110 and temporarily stores the firmware and the like stored in the non-volatile memories. The XR processor 110 may incorporate a part (RAM) of the first memory 120.

The operation unit 130 is, for example, a part for providing various operation instructions, setting the parameters, selecting a virtual object including the avatar, and controlling the avatar and comprises a microphone. The operation unit 130 is considered to be not only a voice input device for performing an operation input by voice but also a gesture input unit that reads a motion of a body such as a hand or a finger from an image captured by the incorporated camera 101 as an operation input, a touch panel provided on a frame of the smart glasses, a graphical user interface (GUI) screen displayed on the XR display 140, a dedicated controller that moves a cursor or the like on the GUI screen, and the like.

A shake, a vibration, or a ray angle of the imaging apparatus 200 can be detected by the gyro sensor 272, the acceleration sensor 274, the geomagnetic sensor 276, and the like of the imaging apparatus 200, and detected information can be used as various operation instructions and the like.

Since both hands are used during the imaging operation of the imaging apparatus 200, a voice input device is preferred.

In a case where the live view image, the playback image, the imaging information, or the like is input from the XR processor 110, the display control unit 142 converts the input into a signal format for display and outputs the converted input to the XR display 140.

The XR display 140 includes a display element (not illustrated) and displays the live view image or the like on the display element that is driven by a signal for display from the display control unit 142. The live view image displayed on the display element is superimposed on the real world beyond the glasses through the optical system 146 (refer to FIG. 1) of the smart glasses.

The XR display 140 displays the live view image or the like geometrically transformed to be superimposed on the specific display region of the imaging apparatus 200, at the display position in front of the eyes of the user. The user can observe the live view image or the like superimposed on the real world.

The virtual object generation unit 150 reads out a desired virtual object image indicated by an instruction provided by the user from various virtual object images including the avatar stored in the first memory 120 and generates a virtual object image that is processed to be composited in the live view image. For example, in a case where the avatar representing the user is selected and where a hairstyle or a costume is selected, an avatar having the selected hairstyle or the selected costume is generated. In a case where a position, a direction, or the like of the avatar is further indicated by an instruction provided using the operation unit 130, processing of moving the avatar to the position or the like is performed.

The virtual object generation unit 150 receives a selection instruction for a virtual object indicating a component (an exterior component, switches, or the like) of the imaging apparatus 200 and generates a virtual object image obtained by processing an image (a component image) of the selected component to be composited in the imaging apparatus 200. By compositing the component image in the imaging apparatus 200, an exterior of the imaging apparatus 200 observed through the XR display 140 can be changed.

The first communication unit 160 is a part that transmits and receives necessary information to and from the imaging apparatus 200, and receives the live view image from the imaging apparatus 200 in a case where the imaging apparatus 200 captures the live view image in the XR environment. In a case where the shutter button 232 (refer to FIG. 1) is pushed to perform imaging for recording while the imaging apparatus 200 is in the XR environment, the first communication unit 160 receives a shutter release signal. In a case where an image of the avatar is composited in the live view image at a time of receiving the shutter release signal, the first communication unit 160 transmits the image of the avatar to the imaging apparatus 200.

The GPS receiver 170, the gyro sensor 172, the acceleration sensor 174, and the geomagnetic sensor 176 are sensors for detecting information indicating a three-dimensional position and a posture of the XR display 140 (incorporated camera 101). The information indicating the three-dimensional position and the posture of the XR display 140 is used for acquiring information indicating a three-dimensional position and a posture of the imaging apparatus 200 with reference to the XR display 140. The information indicating the three-dimensional position and the posture of the imaging apparatus 200 with reference to the XR display 140 can be used for calculating the transformation information for geometrically transforming the live view image.

<Embodiment of Imaging Apparatus>

Figure 7:
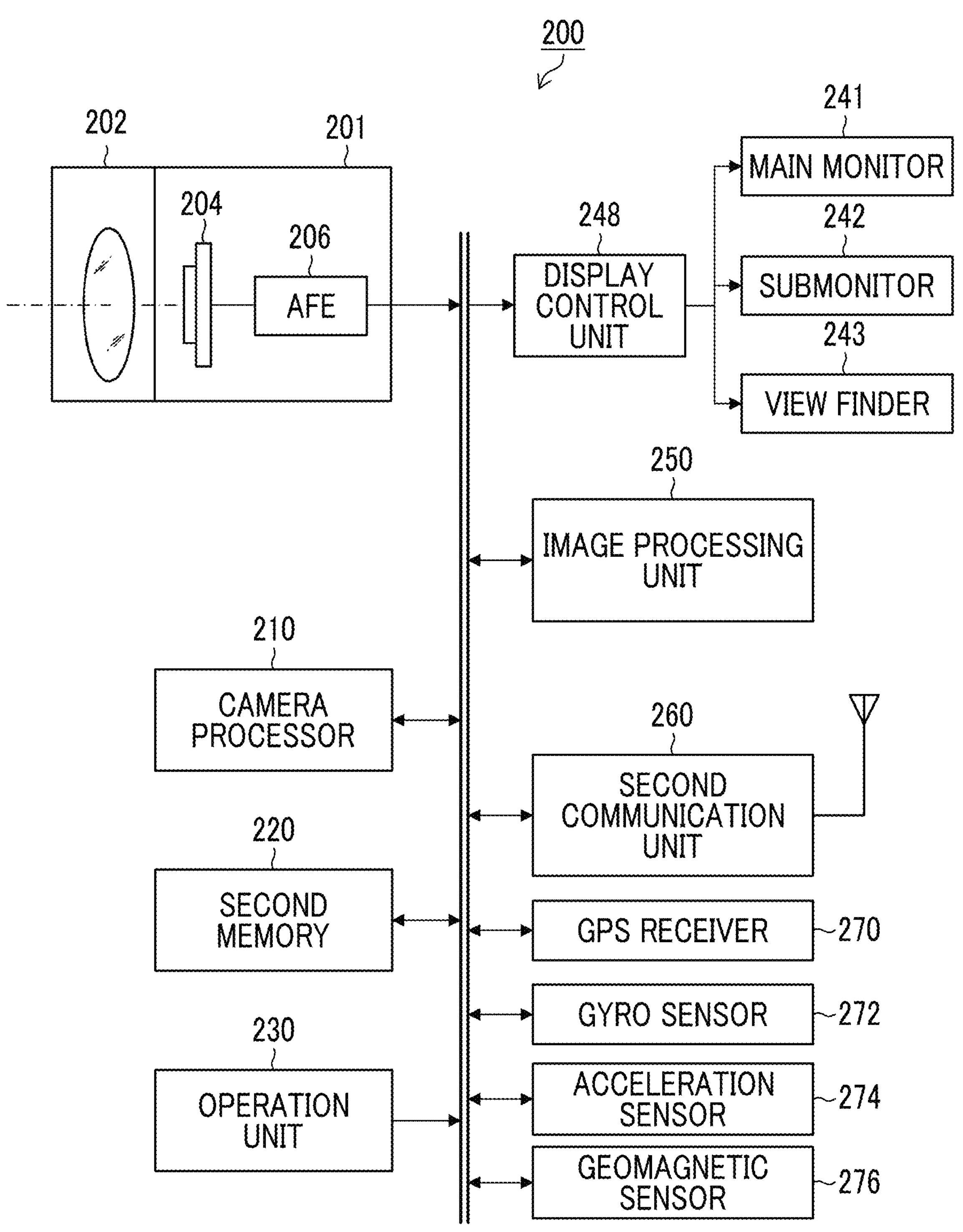
FIG. 7 is a block diagram illustrating an embodiment of the imaging apparatus according to the embodiment of the present invention.

FIG. 7 is a block diagram illustrating an embodiment of the imaging apparatus according to the embodiment of the present invention.

The imaging apparatus 200 illustrated in FIG. 7 is a block diagram illustrating an internal configuration of the imaging apparatus 200 constituting the virtual image display system 10 illustrated in FIG. 1.

The imaging apparatus 200 comprises an imaging unit 201, a camera processor 210, a second memory 220, an operation unit 230, a display control unit 248, the main monitor 241, the submonitor 242, the view finder 243, an image processing unit 250, a second communication unit (communication unit) 260, a GPS receiver 270, a gyro sensor 272, the acceleration sensor 274, the geomagnetic sensor 276, and the like.

The imaging unit 201 includes the interchangeable lens 202, an image sensor 204, and an AFE 206.

The interchangeable lens 202 is mounted on the camera body 203 and can perform bidirectional communication with the camera body 203 through a plurality of signal terminals provided in a lens mount of the camera body 203. For example, lens information (information such as a focal length, a focus position, and an F number) of the interchangeable lens 202 is transmitted to the camera body 203 in accordance with a request signal from the camera body 203, and a focus lens, a stop, and the like are driven in accordance with an instruction from the camera body 203.

The image sensor 204 is composed of a CMOS type color image sensor. However, the present invention is not limited to a CMOS type. The image sensor 204 may be a CCD type image sensor.

The AFE 206 performs various types of analog signal processing on an analog image signal output from the image sensor 204, converts the analog image signal into a digital image signal, and outputs the digital image signal as RAW data.

The camera processor 210 is composed of a CPU and the like and controls each unit in an integrated manner. The camera processor 210 controls each unit in an integrated manner in accordance with a user operation performed using the operation unit 230 and performs various types of processing including an auto focus (AF) control and an automatic exposure (AE) control.

In a case where an auto mode is set using the operation unit 230, each of the AF control and the AE control is automatically performed. In a case where a manual mode is set, the AF control and the AE control are not performed.

As illustrated in FIG. 1, the operation unit 230 includes not only the shutter button 232, the shutter speed/sensitivity dial 234, and the exposure correction dial 236 but also the toggle switch 244, the menu/execution button 245, the play button 246, the display/return button 247, and the like. Various instructions and settings can be provided by operating these buttons, dials, and the like.

The operation unit 230 of the imaging apparatus 200 of the present example is different from an operation unit of an imaging apparatus of the related art in terms of including a mode switching unit that switches between a first mode (non-XR mode) in which the imaging apparatus 200 is used in a non-XR environment (normal environment) and a second mode (XR mode) in which the imaging apparatus 200 is used in the XR environment.

While a function button to which the setting/release of the XR mode is assigned can be used as the mode switching unit for the XR mode/non-XR mode, a dedicated mode switching lever may be provided. Setting/release of the XR mode may be performed on a menu screen using the toggle switch 244 and the menu/execution button 245.

For example, a mode switching lever having the same configuration as the finder switching lever 249 illustrated in FIG. 2 can be provided on the front surface, the rear surface, or the upper surface of the camera body 203 as the dedicated mode switching lever.

Details of an operation of the imaging apparatus 200 in a case where the XR mode is set and where the imaging apparatus 200 is used in the XR environment will be described later.

The second memory 220 includes a flash memory, a ROM, a RAM, and the like. The flash memory and the ROM are non-volatile memories storing various programs including firmware, parameters, captured images (static images and videos), and the like.

The RAM functions as a work region of the processing performed by the camera processor 210 and temporarily stores the firmware and the like stored in the non-volatile memories. The camera processor 210 may incorporate a part (RAM) of the second memory 220.

In a case where the live view image, the playback image, the imaging information, or the like is input from the camera processor 210 or the image processing unit 250, the display control unit 248 converts the input into the signal format for display and outputs the converted input to the main monitor 241, the submonitor 242, and the view finder 243 (EVF).

The main monitor 241 can be operated in a case where the monitor panel 240 is open as illustrated in FIGS. 3B and 3C, and displays the live view image, the recorded image (playback image), or the like in accordance with an instruction from the camera processor 210 in a case where the non-XR mode is set.

The submonitor 242 can be operated in a case where the monitor panel 240 is closed as illustrated in FIG. 3A, and displays the imaging information indicating the shutter speed, the F number, the ISO sensitivity, and the like in accordance with an instruction from the camera processor 210 in a case where the non-XR mode is set.

The view finder 243 can be switched between the EVF and the OVF by operating the finder switching lever, and displays the live view image in accordance with an instruction from the camera processor 210 in a case where the non-XR mode is set and where the view finder 243 is switched to the EVF.

Accordingly, in a case where the monitor panel 240 is closed and where the non-XR mode is set, the user can perform framing while checking an imaging range via the view finder 243.

Even in a case where the non-XR mode is set and where the monitor panel 240 is open, an eye sensor (not illustrated) can operate to automatically switch to display of the view finder 243 in a case where the eyes are brought close to the view finder 243, and switch to display of the main monitor 241 in a case where the eyes are taken away from the view finder 243.

In a case where the XR mode is set, the main monitor 241 and the submonitor 242, for example, can display a marker (for example, an AR marker) for specifying a display region of the main monitor 241 or the submonitor 242 in accordance with an instruction from the camera processor 210 without displaying the live view image and the imaging information, respectively.

The image processing unit 250 performs RAW development treatment such as offset processing, gain control processing including white balance correction and sensitivity correction, gamma correction processing, and demosaicing (demosaicing processing) on the RAW data output from the imaging unit 201. For the RAW data acquired based on a push of the shutter button 232, the image processing unit 250 performs compression processing after the RAW development treatment and records the compressed RAW data on the second memory 220 or a memory card (not illustrated) as an image file.

Continuous data obtained by performing the RAW development treatment on continuous RAW data output from the imaging unit 201 via the image processing unit 250 is output to the main monitor 241 or the second communication unit 260 through the display control unit 248 as a live view image LV.

The second communication unit 260 is a part that transmits and receives necessary information to and from the virtual image display apparatus 100. In a case where the imaging apparatus 200 is set to the XR mode and captures the live view image in the XR environment, the second communication unit 260 transmits the live view image LV to the virtual image display apparatus 100.

In a case where the imaging apparatus 200 is in the XR environment and where the shutter button 232 (refer to FIG. 1) is pushed to perform imaging for recording, the second communication unit 260 transmits the shutter release signal to the virtual image display apparatus 100. The virtual image display apparatus 100 receives the shutter release signal through the first communication unit 160. In a case where the image of the avatar is composited in the live view image at the time of receiving the shutter release signal, the virtual image display apparatus 100 transmits the image of the avatar to the imaging apparatus 200 from the first communication unit 160 of the virtual image display apparatus 100.

The GPS receiver 270, the gyro sensor 272, the acceleration sensor 274, and the geomagnetic sensor 276 are sensors for detecting the information indicating the three-dimensional position and the posture of the imaging apparatus 200. The information indicating the three-dimensional position and the posture of the imaging apparatus 200 is used for acquiring the information indicating the three-dimensional position and the posture of the imaging apparatus 200 with reference to the XR display 140. The information indicating the three-dimensional position and the posture of the imaging apparatus 200 with reference to the XR display 140 can be used for calculating the transformation information for geometrically transforming the live view image LV.

[First Embodiment of Virtual Image Display System]

Figure 8:
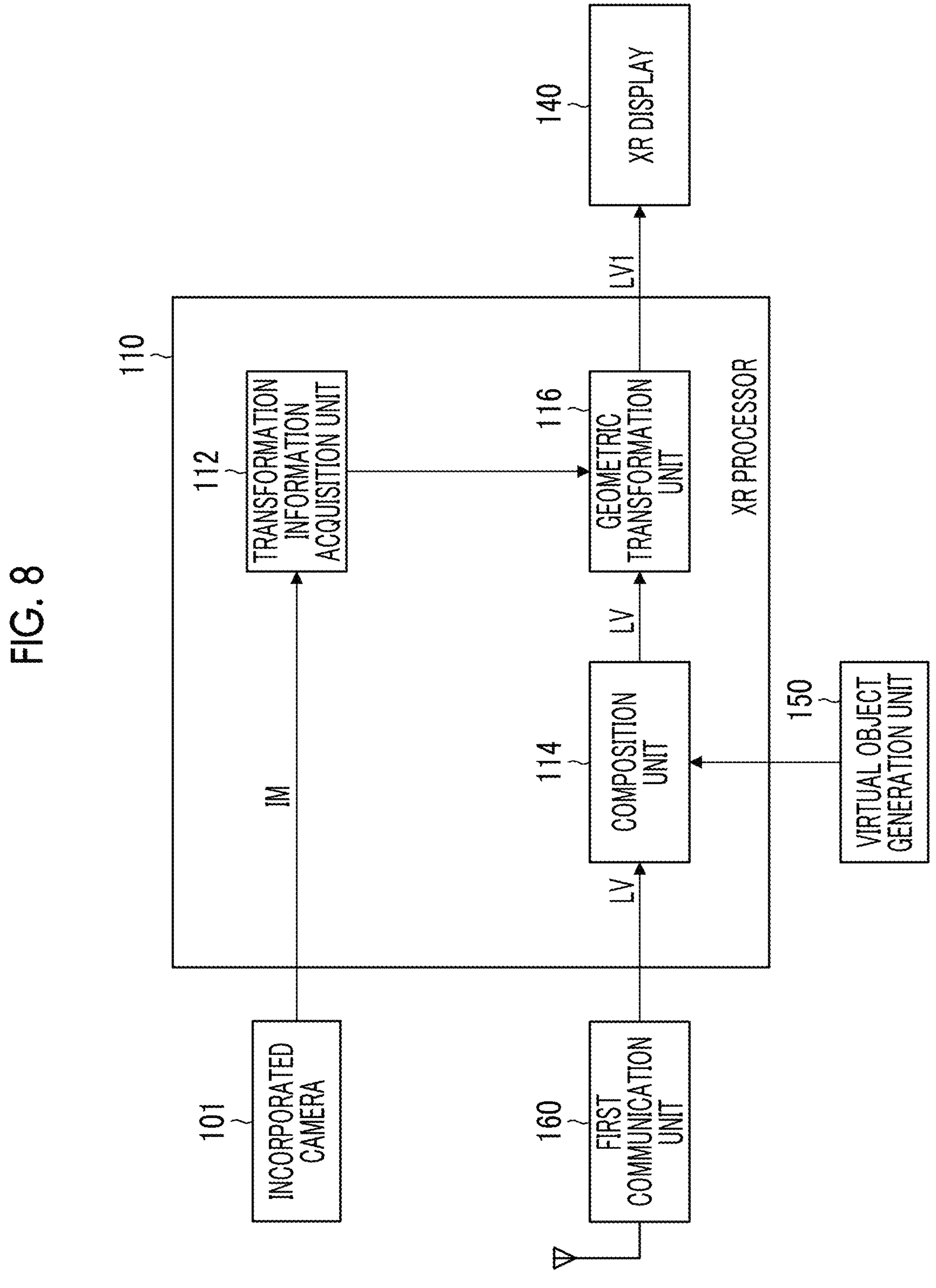
FIG. 8 is a main block diagram illustrating a first embodiment of the virtual image display system according to the embodiment of the present invention.

FIG. 8 is a main block diagram illustrating a first embodiment of the virtual image display system according to the embodiment of the present invention and is a functional block diagram illustrating functions of the XR processor 110 of the virtual image display apparatus 100 illustrated in FIG. 6.

In FIG. 8, the XR processor 110 functions as a transformation information acquisition unit 112, a composition unit 114, and a geometric transformation unit 116.

The incorporated camera 101 of the smart glasses captures a visual field image IM corresponding to the visual field of the user including the imaging apparatus 200 and outputs the captured visual field image IM to the transformation information acquisition unit 112.

In a case where the imaging apparatus 200 is being used in the XR environment, the imaging apparatus 200 transmits the live view image LV generated by operating the imaging apparatus 200 as continuous data, and the first communication unit 160 receives the live view image LV from the imaging apparatus 200.

The transformation information acquisition unit 112 is a part that acquires the transformation information used in superimposing the live view image LV on the display region of the imaging apparatus 200. The captured image (visual field image IM) is input into the transformation information acquisition unit 112 from the incorporated camera 101.

The transformation information acquisition unit 112 acquires region information indicating the display region of the imaging apparatus 200 by analyzing the input visual field image IM and acquires the transformation information based on the region information.

Figure 9:
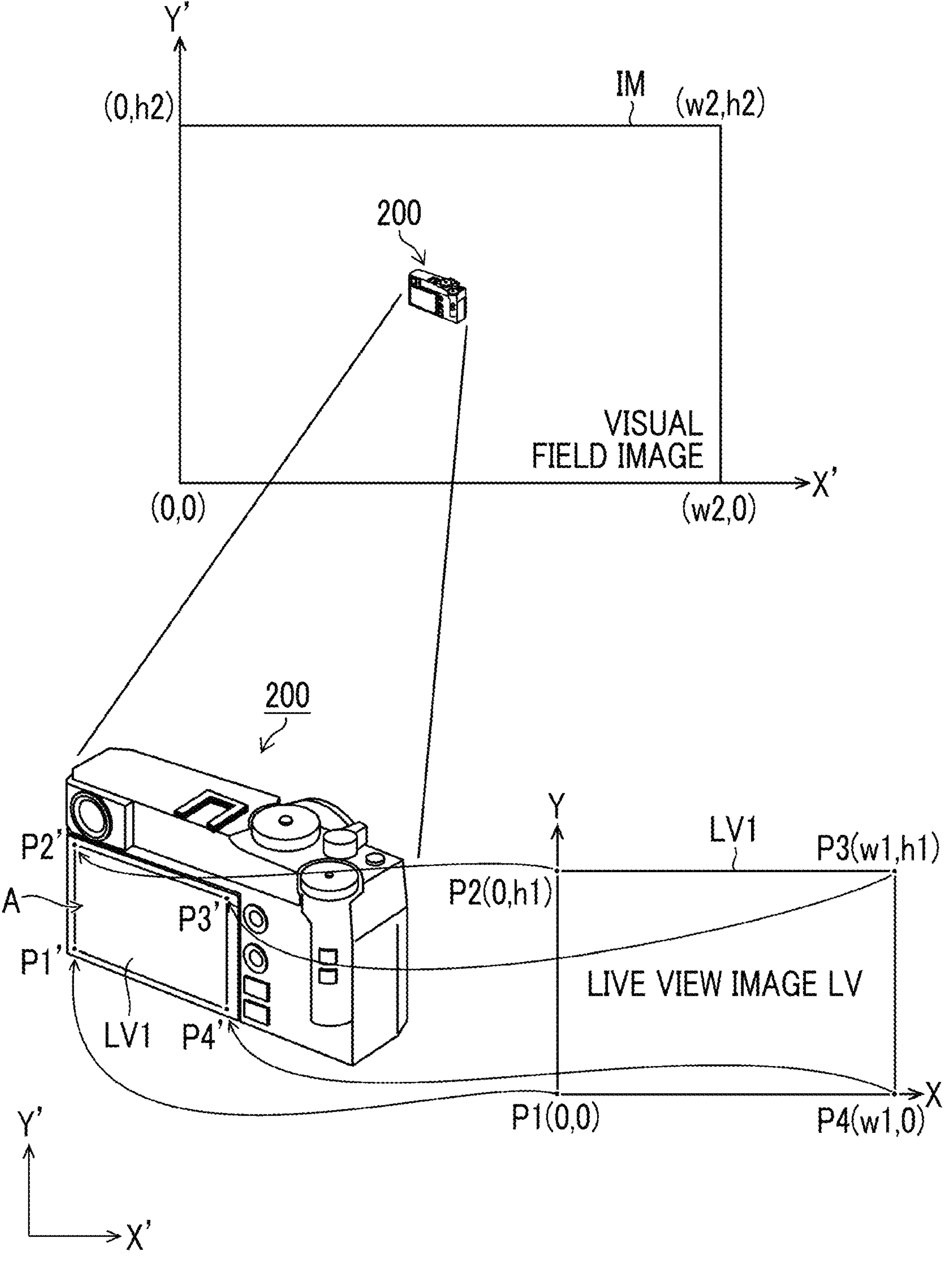
FIG. 9 is a diagram illustrating a geometric relationship among the live view image, the visual field image, and a display region of the imaging apparatus.

FIG. 9 is a diagram illustrating a geometric relationship among the live view image, the visual field image, and the display region of the imaging apparatus.

In FIG. 9, an image coordinate system of the live view image LV is set as an XY coordinate system, and an image coordinate system of the visual field image IM is set as an X'Y' coordinate system. Image sizes of the live view image LV in vertical and horizontal directions are denoted by h1 and w1, and image sizes of the visual field image IM in the vertical and horizontal directions are denoted by h2 and w2. Coordinates of points (feature points) P1 to P4 at four corners of the live view image LV in the XY coordinate system are already known from the image sizes of the live view image LV.

As illustrated in FIG. 9, the visual field image IM includes the camera image indicating the imaging apparatus 200.

For example, the transformation information acquisition unit 112 acquires coordinates of points (corresponding points P1' to P4' corresponding to the feature points P1 to P4) at four corners of the display region as the region information indicating the specific display region of the imaging apparatus 200 in the visual field image IM.

For the corresponding points P1' to P4' corresponding to the feature points P1 to P4 at the four corners of the live view image LV, the transformation information acquisition unit 112 of the first embodiment can detect a quadrangular contour of the monitor panel 240 (refer to FIG. 1) by analyzing the visual field image IM and set points at four corners of the contour as the corresponding points P1' to P4'. While a region surrounded by the quadrangular contour of the closed monitor panel 240 is set as the display region, the display region can be appropriately defined.

Next, the transformation information acquisition unit 112 acquires the transformation information used in superimposing the live view image LV on the display region (a region of the monitor panel 240 specified by the corresponding points P1' to P4') on the camera image of the visual field image IM.

In a case of geometrically transforming the live view image LV using affine transformation and superimposing the live view image LV on the display region on the camera image, it is necessary to acquire parameters (transformation information) of the affine transformation.

The affine transformation can be performed using the following expression.

$$\begin{pmatrix} x' \\ y' \\ 1 \end{pmatrix} = \begin{pmatrix} a & b & t_x \\ c & d & t_y \\ 0 & 0 & 1 \end{pmatrix} \begin{pmatrix} x \\ y \\ 1 \end{pmatrix} \quad \text{[Expression 1]}$$

In [Expression 1], (x, y) denotes coordinates (coordinates in the XY coordinate system) of the live view image LV, and (x', y') denotes coordinates (coordinates in the X'Y' coordinate system of the visual field image IM) after the affine transformation.

In [Example 1], parameters a to d are parameters indicating enlargement, reduction, rotation, and skewing (shearing) of the image, and parameters $t_x$ and $t_y$ are parameters indicating translation.

In the affine transformation, it is necessary to provide three or more sets of matching points (feature points and corresponding points) between two images (in the present example, the live view image LV and the visual field image IM) for estimating the parameters. Since four sets of matching points of the feature points P1 to P4 of the live view image LV and the corresponding points P1' to P4' of the visual field image IM are obtained, the parameters a to d, $t_x$, and $t_y$ of the affine transformation illustrated in [Expression 1] can be obtained.

As described above, the transformation information acquisition unit 112 can acquire the parameters a to d, $t_x$, and $t_y$ of the affine transformation as the transformation information.

For example, projective transformation is also considered as another method of performing geometric transformation between two images.

The projective transformation can be performed using the following expression.

$$\begin{pmatrix} x' \\ y' \\ 1 \end{pmatrix} = \begin{pmatrix} h_{11} & h_{12} & h_{13} \\ h_{21} & h_{22} & h_{23} \\ h_{31} & h_{32} & h_{33} \end{pmatrix} \begin{pmatrix} x \\ y \\ 1 \end{pmatrix} \quad \text{[Expression 2]}$$

In the projective transformation, it is necessary to obtain all of nine parameters ($h_{11}$ to $h_{33}$) represented by a 3×3 transformation matrix, and it is also necessary to obtain a larger number of matching points between two images than that in the affine transformation. However, geometric transformation can be performed with higher accuracy than the affine transformation.

With reference to FIG. 8 again, the live view image LV is supplied to the composition unit 114 through the first communication unit 160. The composition unit 114 is a part that composites the virtual object in the live view image LV. The image of the virtual object generated by the virtual object generation unit 150 is supplied as another input of the composition unit 114.

The virtual object generation unit 150 reads out an image of a desired virtual object (for example, the avatar) from the first memory 120 in accordance with a user instruction and generates and outputs the image of the avatar processed to be composited in the live view image LV.

The user can register the image of the avatar indicating the user in the first memory 120. The image of the avatar indicating the user may be an image obtained by imaging the user or an image of an animation character, a robot, a pet, or the like.

The user can appropriately select a hairstyle or a costume by operating the operation unit 130, and the virtual object generation unit 150 can generate the image of the avatar having the hairstyle or the costume indicated by a selection instruction provided by the user. In a case where an instruction indicating the position, the direction, or the like of the avatar is provided by the user, the virtual object generation unit 150 performs processing of moving the image of the avatar to the position or the like indicated by the instruction like an avatar in a role-playing game.

In a case of generating a more realistic image of the avatar, the virtual object generation unit 150 may adjust brightness and a tint of the image of the avatar in accordance with brightness and a tint obtained from the live view image LV or the like.

The composition unit 114 composites the image of the virtual object including the avatar generated by the virtual object generation unit 150 in the live view image LV supplied through the first communication unit 160 and outputs the composited live view image LV to the geometric transformation unit 116.

In a case where a virtual object is not generated by the virtual object generation unit 150, the composition unit 114 outputs the input live view image LV to the geometric transformation unit 116 as the live view image LV.

The geometric transformation unit 116 is a part that geometrically transforms the live view image LV supplied through the composition unit 114 based on the transformation information acquired by the transformation information acquisition unit 112. For example, in a case where the geometric transformation performed by the geometric transformation unit 116 is the affine transformation, the transformation information acquisition unit 112 acquires the parameters (a to d, $t_x$, and $t_y$) of the affine transformation illustrated in [Expression 1] as the transformation information. The geometric transformation unit 116 transforms a pixel at the coordinates (x, y) of the live view image LV into a pixel at the coordinates (x', y') of the visual field image IM by performing the affine transformation based on the transformation information. In a case where the geometric transformation performed by the geometric transformation unit 116 is the projective transformation, the parameters ($h_{11}$ to $h_{33}$) of the projective transformation illustrated in [Expression 2] are acquired as the transformation information. The geometric transformation unit 116 converts the pixel at the coordinates (x, y) of the live view image LV into the pixel at the coordinates (x', y') of the visual field image IM by performing the projective transformation based on the transformation information.

The live view image LV geometrically transformed by the geometric transformation unit 116 (hereinafter, referred to as the "live view image LV1") is output to the XR display 140.

The XR display 140 displays the geometrically transformed live view image LV1 at a corresponding pixel position of the XR display 140 (a pixel position corresponding to the visual field image IM of the incorporated camera 101). In the example illustrated in FIG. 9, coordinates of the live view image LV represented by the four coordinates P1 to P4 in the XY coordinate system of the live view image LV are transformed into coordinates in the X'Y' coordinate system of the visual field image IM, and the live view image LV is displayed as the live view image LV1 represented by the four coordinates P1' to P4'.

There is parallax between a visual field range of the user in a case where the user is wearing the smart glasses and the visual field image IM captured by the incorporated camera 101. Thus, the XR display 140 preferably corrects the parallax in accordance with a size (corresponding to a distance) of the camera image and a position of the camera image in the visual field image IM.

<Second Embodiment of Transformation Information Acquisition Unit>

The transformation information acquisition unit 112 of the first embodiment illustrated in FIG. 8 detects the quadrangular contour of the monitor panel 240 by analyzing the visual field image IM, sets the quadrangular region surrounded by the points (P1' to P4' in FIG. 9) at the four corners of the contour as a display region A of the imaging apparatus 200, and acquires the transformation information. However, the present invention is not limited to this. The transformation information acquisition unit 112 may acquire the transformation information based on a position of the marker (hereinafter, referred to as the "AR marker") of the imaging apparatus 200 imaged by the incorporated camera 101.

Figure 10:
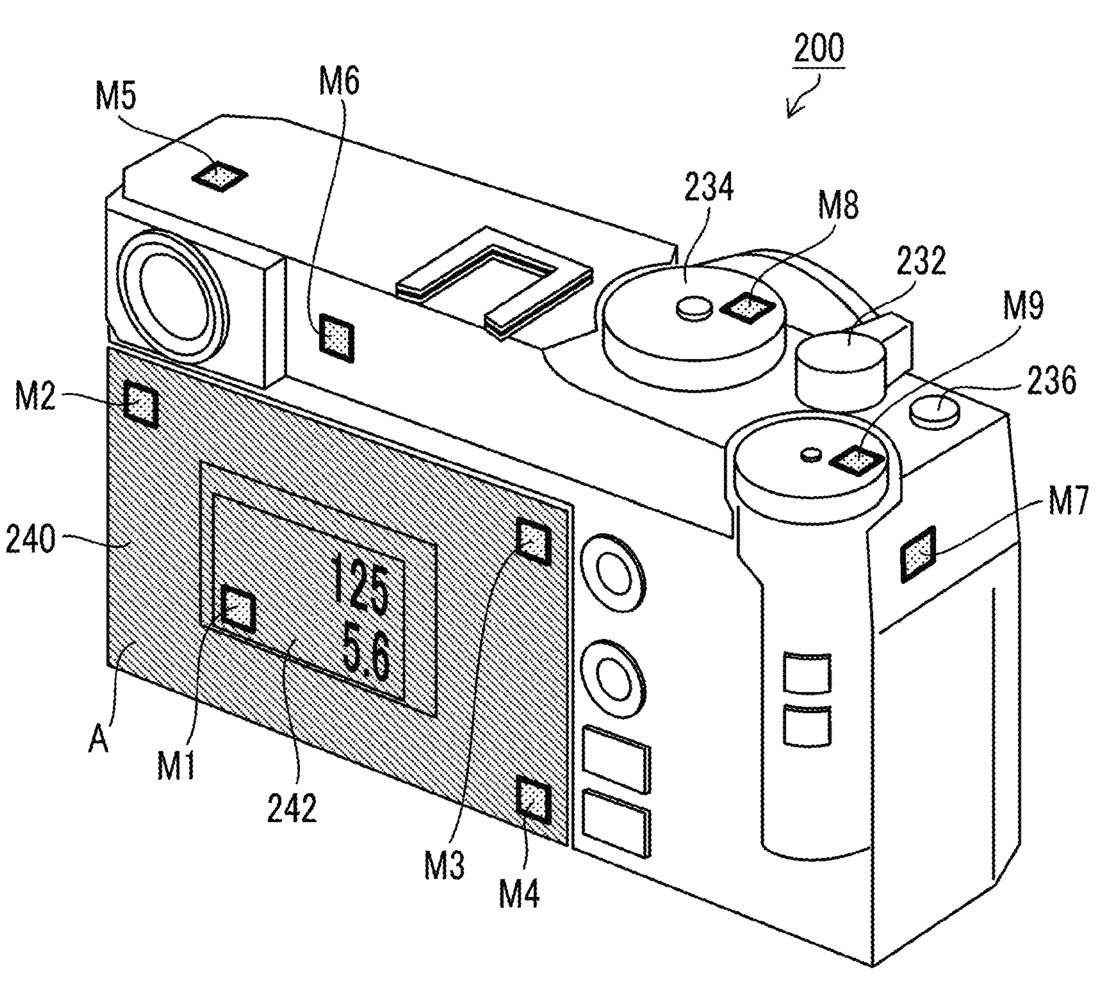
FIG. 10 is a diagram illustrating an exterior of the imaging apparatus provided with an AR marker.

FIG. 10 is a diagram illustrating an exterior of the imaging apparatus provided with the AR marker.

The imaging apparatus 200 illustrated in FIG. 10 is provided with nine AR markers M1 to M9.

The AR marker is a marker indicating an illustration, an image, or the like registered in advance and can be associated with positional information. Accordingly, the transformation information acquisition unit 112 can acquire the positional information of positions at which the AR markers M1 to M9 are displayed, by reading the AR markers M1 to M9 from the visual field image IM and acquire information such as an inclination, a position, a size, and center coordinates of each surface of the imaging apparatus 200.

The AR marker M1 among the AR markers M1 to M9 is an AR marker displayed on the submonitor 242, and the AR markers M2 to M9 are AR markers provided in advance on the camera body 203.

The AR markers M2 to M4 are AR markers indicating positions of three locations among four corners of the monitor panel 240 and are AR markers M for specifying the display region A of the live view image LV1 of the imaging apparatus 200 in a case where the region of the monitor panel 240 is set as the display region A of the live view image LV1.

In a case where the imaging apparatus 200 is used in the XR environment, an AR marker M1 can be displayed as a marker for specifying the display region A of the live view image LV1. In a case where the AR markers M are displayed on the submonitor 242, the number of AR markers M is not limited to one, and a plurality of AR markers M can be displayed. In a case where the main monitor 241 (refer to FIGS. 3B and 3C) is set as the display region of the live view image LV1, a plurality of AR markers M for specifying the region of the main monitor 241 can be displayed.

An AR marker M5 is a marker provided on the upper surface of the camera body 203. An AR marker M6 is a marker provided in an upper portion of the rear surface of the camera body 203. An AR marker M7 is a marker provided on a side surface of the camera body 203. The AR markers M5 to M7 are markers provided for specifying each surface of the camera body 203.

An AR marker M8 is a marker provided on an upper surface of the shutter speed/sensitivity dial 234. An AR marker M9 is a marker provided on an upper surface of the exposure correction dial 236. The AR markers M8 and M9 are markers provided for specifying positions (including rotationally moving positions) of the dials.

The AR markers M4 to M9 can be used for specifying a region for pasting a virtual object (a skin that changes the exterior) to the camera body 203.

Markers may be composed of two-dimensional barcodes (for example, "QR codes" (registered trademark)) instead of the AR markers M1 to M9. In a case of displaying the two-dimensional barcodes, information about what is displayed by the imaging apparatus 200 and data or an indicator (numerical value information such as the shutter speed, the F number, and a histogram) displayed in the live view image can be coded as the two-dimensional barcodes. The two-dimensional barcodes may also include information incorporating disposition information of data display.

Instead of the AR markers M1 to M9, markers having other shapes suitable for specifying the positions may also be used, or the AR markers M and the two-dimensional barcodes may be used together. Types, positions, and the number of markers are not limited to the embodiment illustrated in FIG. 10.

<Third Embodiment of Transformation Information Acquisition Unit>

The transformation information acquisition unit that acquires the transformation information used in superimposing the live view image LV on the display region A of the imaging apparatus 200 is not limited to a case where the visual field image IM captured by the incorporated camera 101 is used. The transformation information acquisition unit can acquire the transformation information by acquiring the information indicating the three-dimensional position and the posture of the imaging apparatus 200 and the information indicating the three-dimensional position and the posture of the XR display 140 and acquiring information indicating a relative three-dimensional position and a relative posture of the imaging apparatus 200 with reference to the XR display 140 (first display).

The transformation information acquisition unit can acquire the information indicating the three-dimensional position and the posture of the XR display 140 based on sensor outputs of the GPS receiver 170, the gyro sensor 172, the acceleration sensor 174, and the geomagnetic sensor 176 of the virtual image display apparatus 100 and can also acquire the information indicating the three-dimensional position and the posture of the XR display 140 based on sensor outputs of the GPS receiver 270, the gyro sensor 272, the acceleration sensor 274, and the geomagnetic sensor 276 of the imaging apparatus 200.

In a case where the virtual image display apparatus 100 (XR display 140) is represented in a global coordinate system and where the imaging apparatus 200 is represented in a camera coordinate system (local coordinate system), a three-dimensional position of each unit of the imaging apparatus 200 in the local coordinate system can be set in advance because a size and a shape of the imaging apparatus 200 are already known.

For example, the global coordinate system of the XR display 140 can be defined as a three-axis orthogonal coordinate system of XYZ in which a center of the display element of the XR display 140 is set as an origin, in-plane directions of the display element that pass through the origin of the display element and that are orthogonal to each other are set as an X axis and a Y axis, and a normal direction passing through the origin of the display element is set as a Z axis.

As described above, by acquiring the information indicating the three-dimensional position and the posture of the XR display 140 and the information indicating the three-dimensional position and the posture of the imaging apparatus 200 (that is, by acquiring the information indicating the three-dimensional position and the posture of the imaging apparatus 200 with reference to the XR display 140), the transformation information used in superimposing the live view image LV on the display region A of the imaging apparatus 200 can be acquired based on the information.

For example, a three-dimensional position in the local coordinate system of the display region A of the imaging apparatus 200 (that is, a three-dimensional position of the live view image LV) is transformed into coordinates in the global coordinate system that is a coordinate system of the XR display 140, based on the information indicating the three-dimensional position and the posture of the imaging apparatus 200 with reference to the XR display 140. Next, the live view image LV1 after the transformation can be obtained by performing perspective projective transformation of the three-dimensional position of the display region A of the imaging apparatus 200 (that is, the three-dimensional position of the live view image LV) having the transformed coordinates in the global coordinate system onto a display surface of the display element of the XR display 140 based on known parameters such as a size of the display element of the XR display 140 and the focal length of the optical system.

The information indicating the relative three-dimensional position and the relative posture of the imaging apparatus 200 with reference to the XR display 140 is not limited to that obtained based on the sensor outputs of the GPS receiver 170, the gyro sensor 172, the acceleration sensor 174, and the geomagnetic sensor 176 of the virtual image display apparatus 100 and on the sensor outputs of the GPS receiver 270, the gyro sensor 272, the acceleration sensor 274, and the geomagnetic sensor 276 of the imaging apparatus 200, and may be obtained using measurement data measured by an optical sensing measurement device (for example, light detection and ranging (LiDAR)) provided in the virtual image display apparatus 100 (smart glasses), a distance image acquired by a time-of-flight (TOF) camera, a stereo image acquired by left and right incorporated cameras provided in the smart glasses, or the like.

<First Embodiment of XR Display>

Figure 11:
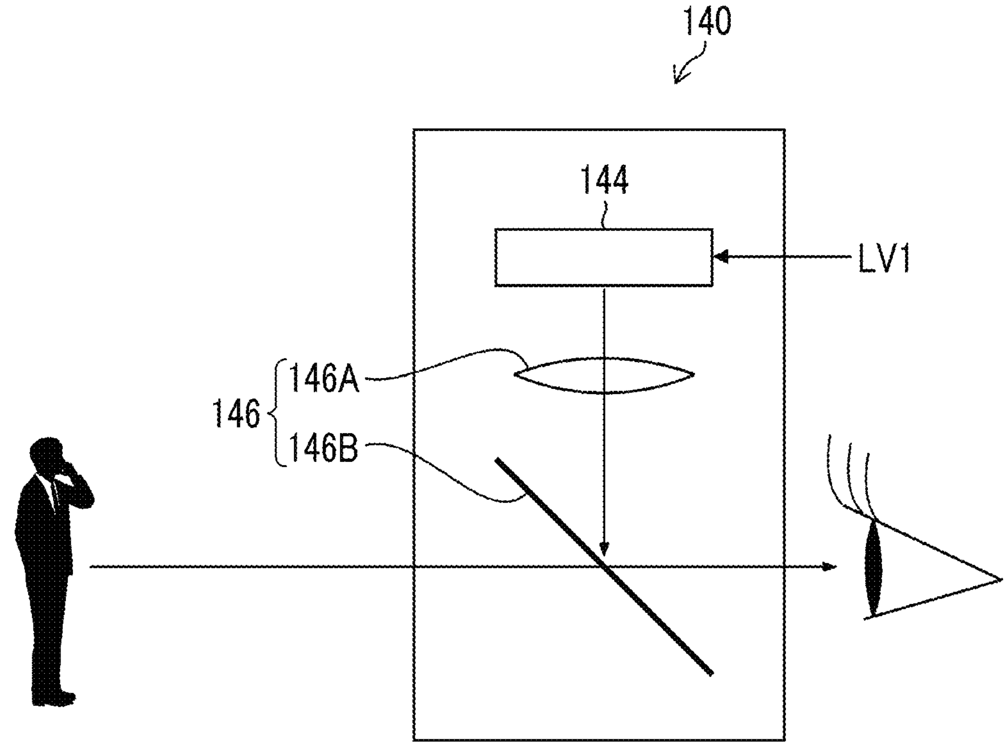
FIG. 11 is a diagram illustrating a first embodiment of an XR display of the virtual image display apparatus.

FIG. 11 is a diagram illustrating a first embodiment of the XR display of the virtual image display apparatus.

The XR display 140 illustrated in FIG. 11 is a display through which a visual field is seen, and is an eyewear type wearable device (smart glasses) that displays the live view image LV1 geometrically transformed into the visual field in the real world.

The XR display 140 comprises a display element 144 and the optical system 146 including a lens 146A and a half mirror 146B. The geometrically transformed live view image LV1 displayed on the display element 144 is displayed as a virtual image at the display position in front of the eyes of the user by the optical system 146.

The user can visually recognize the real world seen through the half mirror 146B and visually recognize the live view image LV1 that is reflected by the half mirror 146B and superimposed on the real world. The live view image LV1 is an image superimposed on the display region A of the imaging apparatus 200 in the real world and is not a reflected ray from the imaging apparatus 200. Thus, the live view image LV1 is a virtual image.

The display element 144 illustrated in FIG. 11 is a surface light emitting element such as an organic electro-luminescence (EL) panel or a liquid crystal panel. However, the present invention is not limited to this. The display element 144 may be a display element composed of a digital micromirror device (DMD) in which a large number of movable micromirror surfaces (micromirrors) are arranged in a planar shape on an integrated circuit, and a light source that causes light of red, green, and blue to be incident on the DMD.

<First Display Example in XR Mode>

Figure 12A:
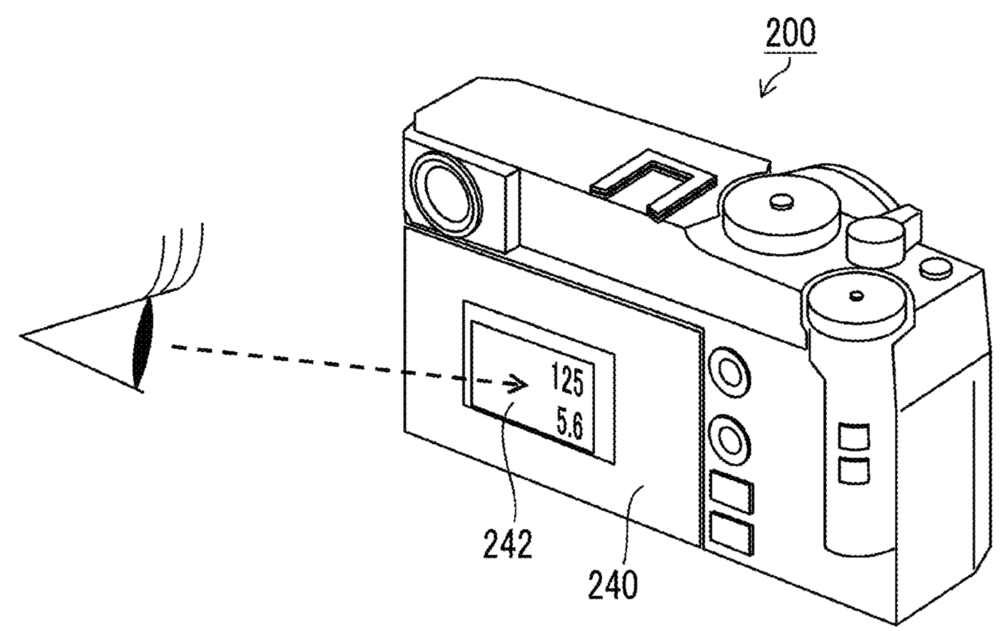
FIGS. 12A and 12B are diagrams illustrating a first display example of the live view image or the like in a case where the imaging apparatus is set to an XR mode.
Figure 12B:
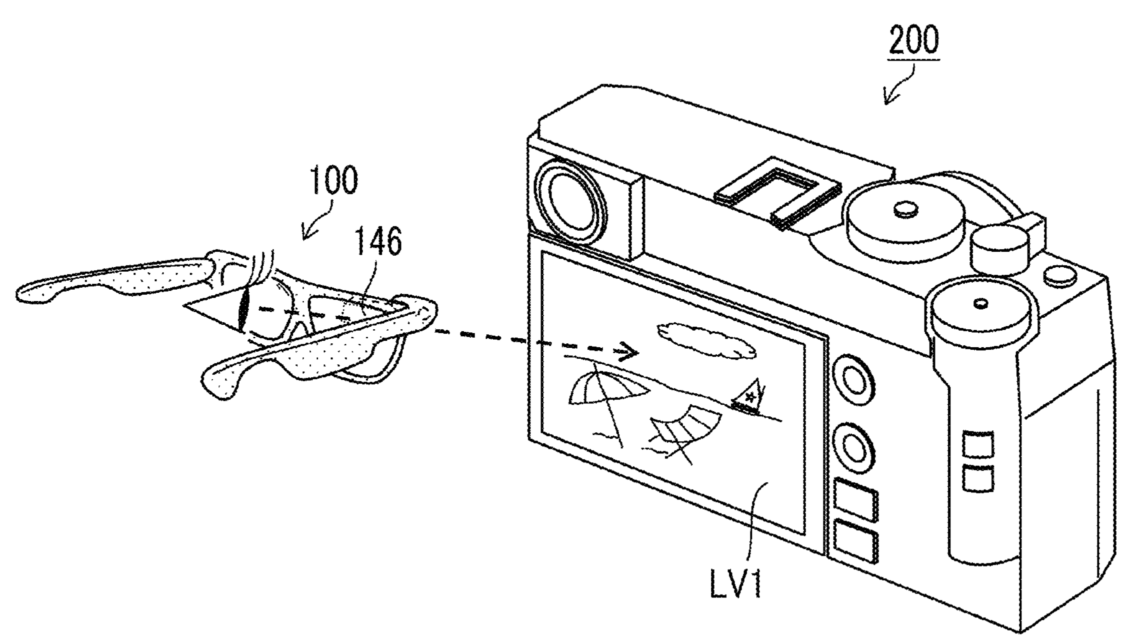

FIGS. 12A and 12B are diagrams illustrating a first display example of the live view image or the like in a case where the imaging apparatus is set to the XR mode.

FIG. 12A is a diagram illustrating an image in a case where the imaging apparatus 200 is seen with the naked eye. In FIG. 12A, the monitor panel 240 is closed, and the imaging information is displayed on the submonitor 242. In a case where the XR mode is set, the user cannot observe the live view image LV1 unless the user is wearing the virtual image display apparatus 100 (smart glasses).

FIG. 12B is a diagram illustrating an image in a case where the imaging apparatus 200 is seen by wearing the virtual image display apparatus 100. The first display example illustrated in FIG. 12B illustrates a case where the live view image LV1 is displayed in a superimposed manner on the region of the closed monitor panel 240 of the imaging apparatus 200.

In this case, the user sees the live view image LV1 as being displayed on the region of the monitor panel 240 by wearing the virtual image display apparatus 100 and seeing the imaging apparatus 200.

The image to be composited in the real world can be switched from the live view image LV1 and changed to another display form based on a setting.

<Second Display Example in XR Mode>

Figure 13:
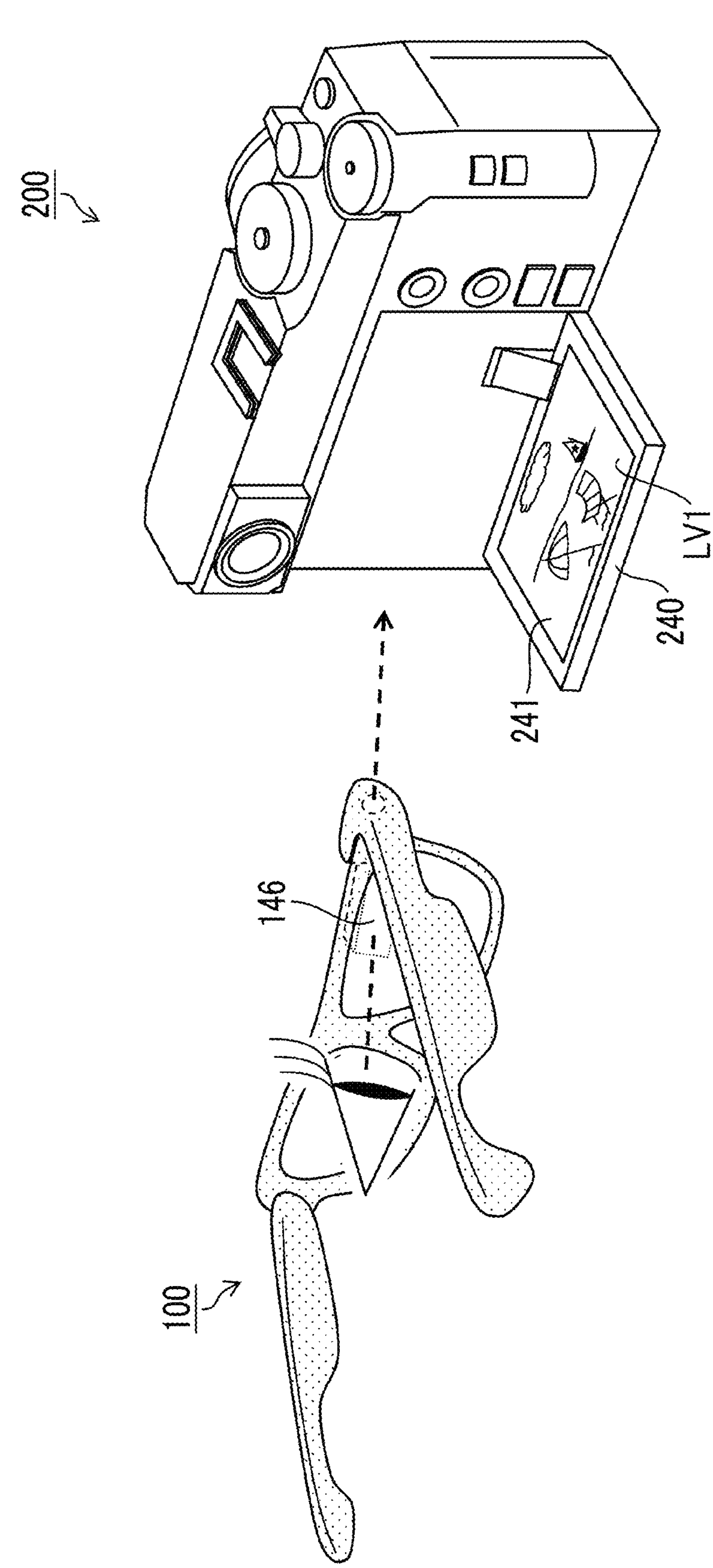
FIG. 13 is a diagram illustrating a second display example of the live view image or the like in a case where the imaging apparatus is set to the XR mode.

FIG. 13 is a diagram illustrating a second display example of the live view image or the like in a case where the imaging apparatus is set to the XR mode.

The second display example illustrated in FIG. 13 illustrates a case where the live view image LV1 is displayed in a superimposed manner on the region of the main monitor 241 of the imaging apparatus 200. FIG. 13 also illustrates the imaging apparatus 200 in a state where the monitor panel 240 is rotationally moved by 90°. In this case, the main monitor 241 on the inner side of the monitor panel 240 can be visually recognized from a position above the main monitor 241, which is suitable for low-angle imaging.

In a case where the imaging apparatus 200 is set to the XR mode, the live view image is not displayed on the main monitor 241, and the user sees the live view image as being displayed on the region of the main monitor 241 by wearing the virtual image display apparatus 100.

According to the second display example illustrated in FIG. 13, the generated live view image LV1 is restricted in accordance with a movable range of the main monitor 241 of the imaging apparatus 200. However, since the main monitor 241 cannot be freely rotated, a direction or the like of display of the live view image LV1 is clearly perceived, and a method of operating the live view image LV1 is the same as that of the actual imaging apparatus 200. Accordingly, an advantage of good operability without confusion is achieved.

Instead of the actual monitor panel 240, a dummy monitor panel can be displayed, and the live view image LV1 can be displayed on the dummy monitor panel. In this case, a movable range of the dummy monitor panel can be set to be larger (for example, larger by +10 degrees) than the movable range of the actual monitor panel 240. It is preferable to switch the movable range of the dummy monitor panel (freely, stepwise, . . . ) based on a selection or change a color or a shape (real camera-like, a transparent frame shape, or the like) of a frame of the monitor panel so that the switching can be perceived.

<Third Display Example in XR Mode>

Figure 14:
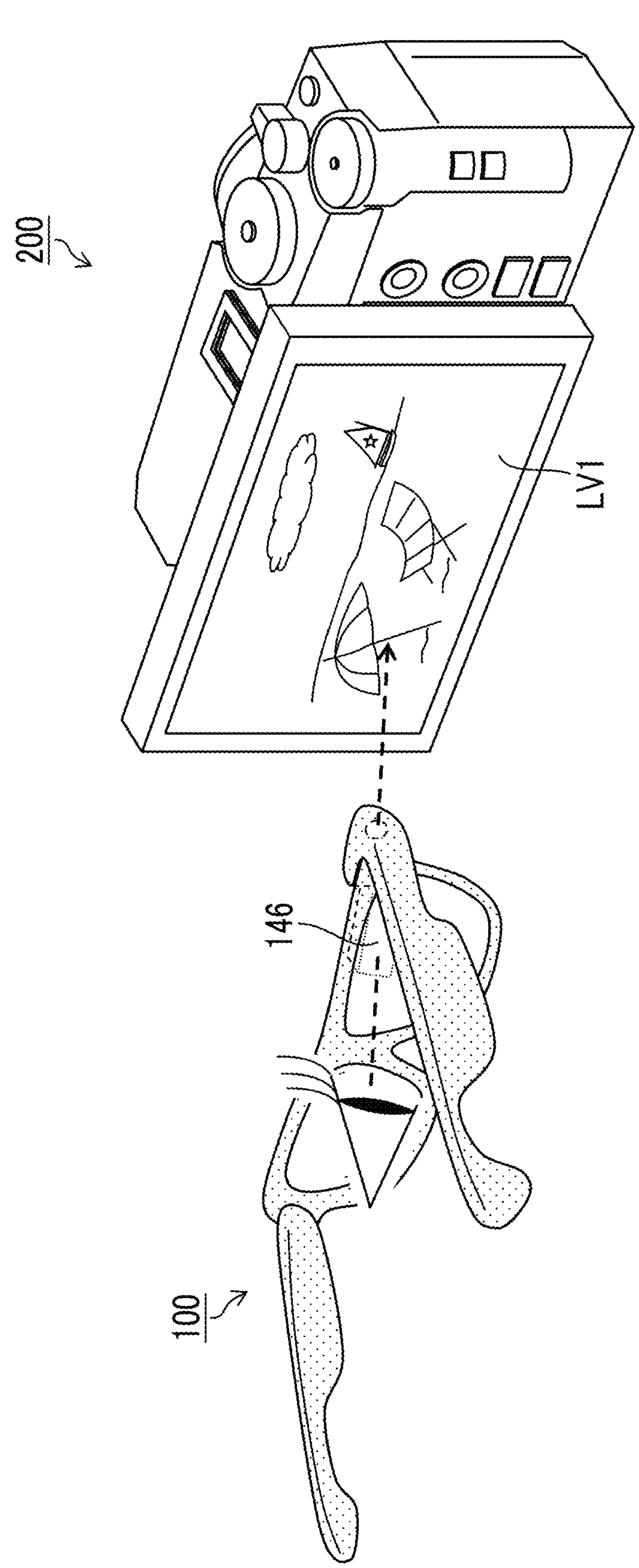
FIG. 14 is a diagram illustrating a third display example of the live view image or the like in a case where the imaging apparatus is set to the XR mode.

FIG. 14 is a diagram illustrating a third display example of the live view image or the like in a case where the imaging apparatus is set to the XR mode.

The third display example illustrated in FIG. 14 is a modification example of the first display example illustrated in FIG. 12B and illustrates a case where the live view image LV1 is displayed in a superimposed manner on the dummy monitor panel that is larger than the closed monitor panel 240 of the imaging apparatus 200.

A size of the geometrically transformed live view image LV1 displayed in a superimposed manner can be freely set. In the third display example illustrated in FIG. 14, the user sees the live view image LV1 as being displayed on the dummy monitor panel having a non-existent size larger than a size of the monitor panel 240 by wearing the virtual image display apparatus 100.

The size of the dummy monitor panel is not limited to a certain size and may be enlarged or reduced in conjunction with an enlargement operation such as stretching a corner of the monitor panel 240. In this case, it is preferable to provide the monitor panel 240 with a tactile member that provides a sense of touch of actually stretching an image frame.

In this case, as a method of detecting the enlargement operation such as stretching the corner of the monitor panel 240, the size of the dummy monitor panel may be enlarged or reduced in accordance with an enlargement or reduction operation using a gesture control principle through image recognition of the incorporated camera 101 of the virtual image display apparatus 100, or other methods such as detecting the enlargement operation in conjunction with a pinch operation performed on a touch panel provided in the monitor panel 240 of the imaging apparatus 200 may be used.

In a case where the corner of the monitor panel 240 is stretched, the dummy monitor panel may be enlarged in a stretching direction and an upward direction, enlarged in the stretching direction and equally in upward and downward directions, or enlarged in the downward direction, while an aspect ratio of the dummy monitor panel is fixed.

<Fourth Display Example in XR Mode>

Figure 15:
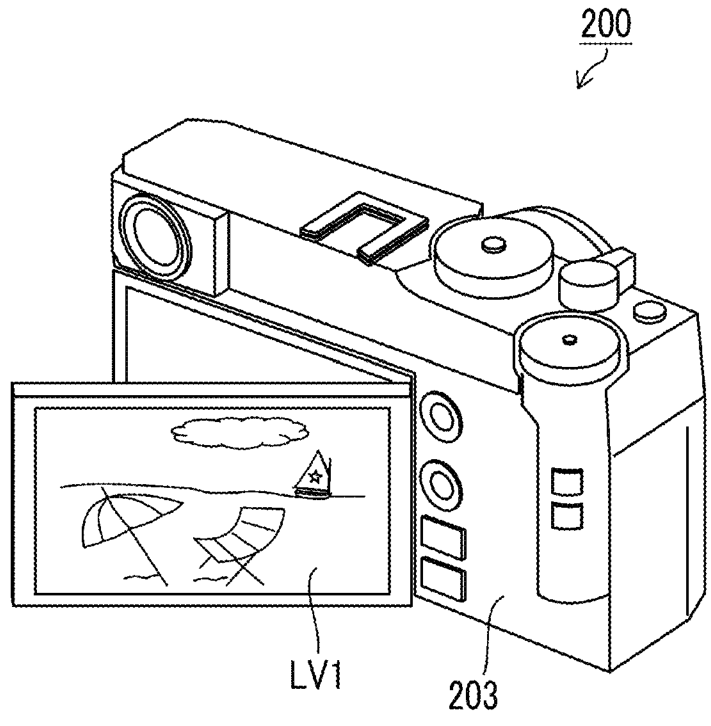
FIG. 15 is a diagram illustrating a fourth display example of the live view image or the like in a case where the imaging apparatus is set to the XR mode.

FIG. 15 is a diagram illustrating a fourth display example of the live view image or the like in a case where the imaging apparatus is set to the XR mode.

The fourth display example illustrated in FIG. 15 illustrates a case where the live view image LV1 is displayed in a superimposed manner on a region of a non-existent monitor panel.

While the monitor panel 240 comprises the rotational moving mechanism that can tilt with respect to the camera body 203 as illustrated in FIGS. 3B and 3C, the monitor panel 240 does not comprise a rotational moving mechanism that rotationally moves the live view image LV1 as illustrated in FIG. 15.

In the fourth display example illustrated in FIG. 15, the monitor panel is appropriately rotationally moved by providing a virtual rotational moving mechanism on a right side of the rear surface of the camera body 203. Accordingly, the live view image LV1 is displayed as having substantially the same size as the size of the monitor panel 240 with one end of the live view image LV1 fixed to the imaging apparatus 200 and is displayed as facing in a visual line direction as in a state where the monitor panel is directed in a direction of the user by performing a tilt operation.

While the live view image LV1 is displayed as being tilted in the horizontal direction about its one side in the leftward and rightward directions as an axis in FIG. 15, this is merely an example. The live view image LV1 may be displayed as being tilted in the upward and downward directions about its one side in the upward and downward directions as a fixed axis. The live view image LV1 may also be displayed in an undefined form obtained by combining tilting in two different directions. In this case, the monitor panel may be represented by a virtual image such that the monitor panel is not seen as being fixed to the imaging apparatus 200 on any of its sides and is connected by a hinge mechanism.

<Fifth Display Example in XR Mode>

Figure 16:
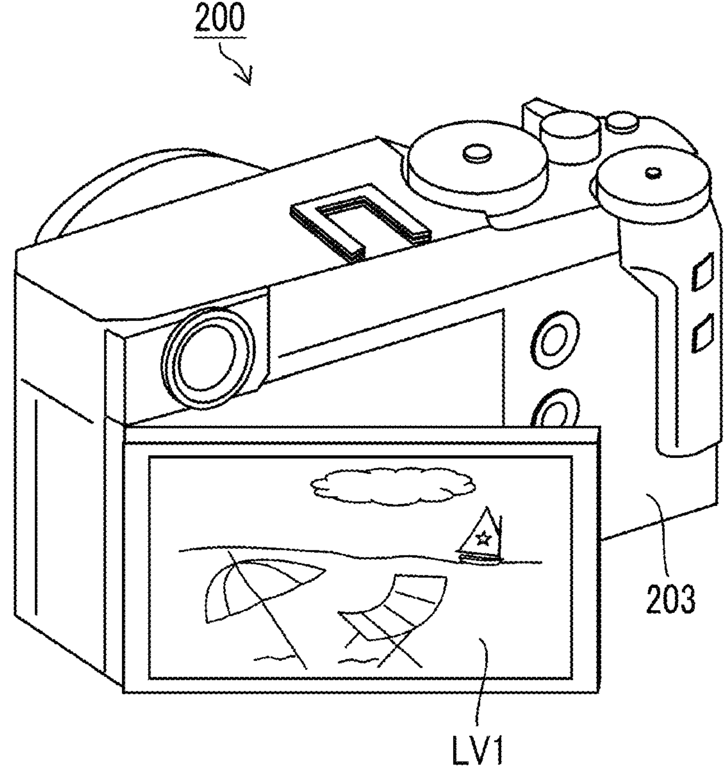
FIG. 16 is a diagram illustrating a fifth display example of the live view image or the like in a case where the imaging apparatus is set to the XR mode.

FIG. 16 is a diagram illustrating a fifth display example of the live view image or the like in a case where the imaging apparatus is set to the XR mode.

The fifth display example illustrated in FIG. 16 is a modification example of the fourth display example illustrated in FIG. 15 and illustrates a case where the camera body 203 is in the opposite direction. That is, in the fifth display example illustrated in FIG. 16, the monitor panel is appropriately rotationally moved by providing a virtual rotational moving mechanism on a left side of the rear surface of the camera body 203. Accordingly, the live view image LV1 is displayed as having substantially the same size as the size of the monitor panel 240 and being directly seen in the visual line direction.

As described above, it is preferable to provide a virtual two-axis or three-axis hinge that rotationally moves the monitor panel, and automatically rotationally move the monitor panel with respect to the camera body so that the live view image LV1 is always directly seen. Accordingly, operability close to usability of a real camera is provided without confusion. Since imaging with a more realistic feel is performed without having an unnatural composite image such as the live view image LV1 floating in the air, quality of an imaging action is improved.

Figure 17:
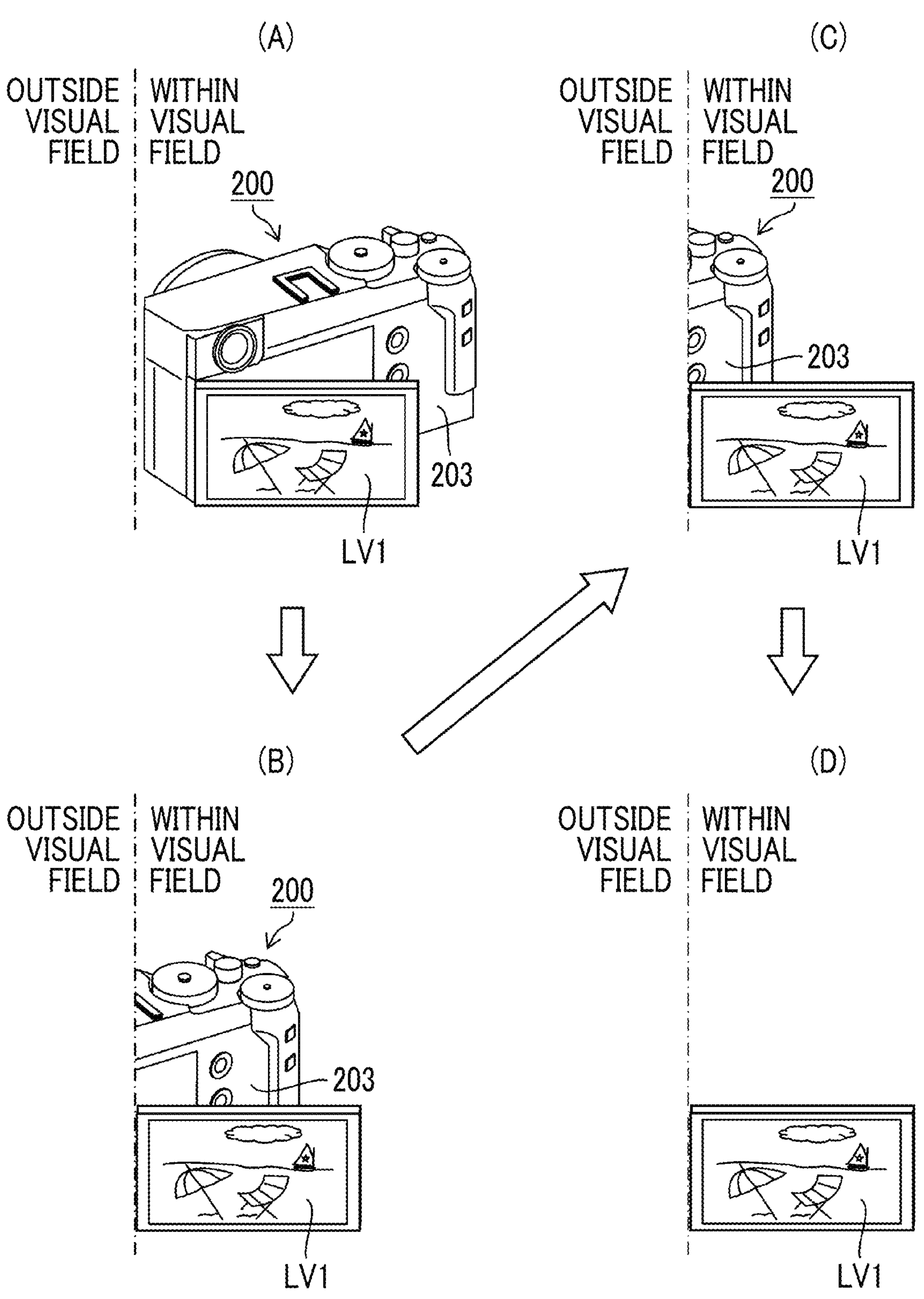
FIG. 17 is a diagram illustrating the fifth display example of the live view image or the like in a case where the imaging apparatus is set to the XR mode.

FIG. 17 is a diagram illustrating a modification example of the fifth display example of the live view image or the like illustrated in FIG. 16.

(A) of FIG. 17 is a diagram illustrating the same display state as the fifth display example of the live view image or the like illustrated in FIG. 16. As illustrated in (A) of FIG. 17, the imaging apparatus 200 is illustrated in a case where the entire imaging apparatus 200 falls within a visual field of the XR display 140.

(B) of FIG. 17 illustrates a case where the imaging apparatus 200 illustrated in (A) of FIG. 17 is moved to a left side with respect to the visual field of the XR display 140, and a left half of the imaging apparatus 200 falls outside the visual field.

Even in this case, the virtual image display apparatus 100 can receive the live view image LV from the imaging apparatus 200. Thus, the live view image LV1 can be displayed on the XR display 140 as illustrated in (B) of FIG. 17. That is, the virtual image display apparatus 100 displays the entire live view image LV1 by moving the live view image LV1 to a right side on (B) of FIG. 17 from its default display position with respect to the imaging apparatus 200.

(C) of FIG. 17 illustrates a case where the imaging apparatus 200 illustrated in (B) of FIG. 17 is further moved to the left side, and ⅔ of the imaging apparatus 200 on its left side falls outside the visual field of the XR display 140. In this case, the virtual image display apparatus 100 displays the entire live view image LV1 by further moving the live view image LV1 to the right side on (C) of FIG. 17 from its display position illustrated in (B) of FIG. 17 with respect to the imaging apparatus 200.

(D) of FIG. 17 illustrates a case where the imaging apparatus 200 illustrated in (C) of FIG. 17 is further moved to the left side, and the entire imaging apparatus 200 falls outside the visual field of the XR display 140. In this case, the virtual image display apparatus 100 displays the entire live view image LV1 by further moving the live view image LV1 to the right side on (D) of FIG. 17 from its display position illustrated in (C) of FIG. 17 with respect to the imaging apparatus 200. In this case, a left end of the live view image LV1 matches a left end of the visual field.

While a case where the imaging apparatus 200 moves to the left side and falls outside the visual field is illustrated in the display example illustrated in FIG. 17, the present invention is not limited to this. Even in a case where the imaging apparatus 200 moves to the right side and falls outside the visual field, in a case where the imaging apparatus 200 moves in the upward direction and falls outside the visual field, or in a case where the imaging apparatus 200 moves in the downward direction and falls outside the visual field, the entire live view image LV1 can be displayed by moving the live view image LV1 as described above.

Even in other display examples including the fourth display example of the live view image or the like illustrated in FIG. 15, the live view image LV1 can be moved with respect to the imaging apparatus 200 in a case where the imaging apparatus 200 falls outside the visual field as described above.

Accordingly, even in a case where the imaging apparatus 200 falls outside the visual field, a live view can be continuously seen by continuing display of the live view image LV1 around a position at which the imaging apparatus 200 falls outside the visual field.

In the first display example to the fifth display example illustrated in FIGS. 12A and 12B to 17, the imaging information can be displayed in a lower end part of the live view image LV1 together with the live view image LV1 that is composited and displayed.

<Sixth Display Example in XR Mode>

Figure 18:
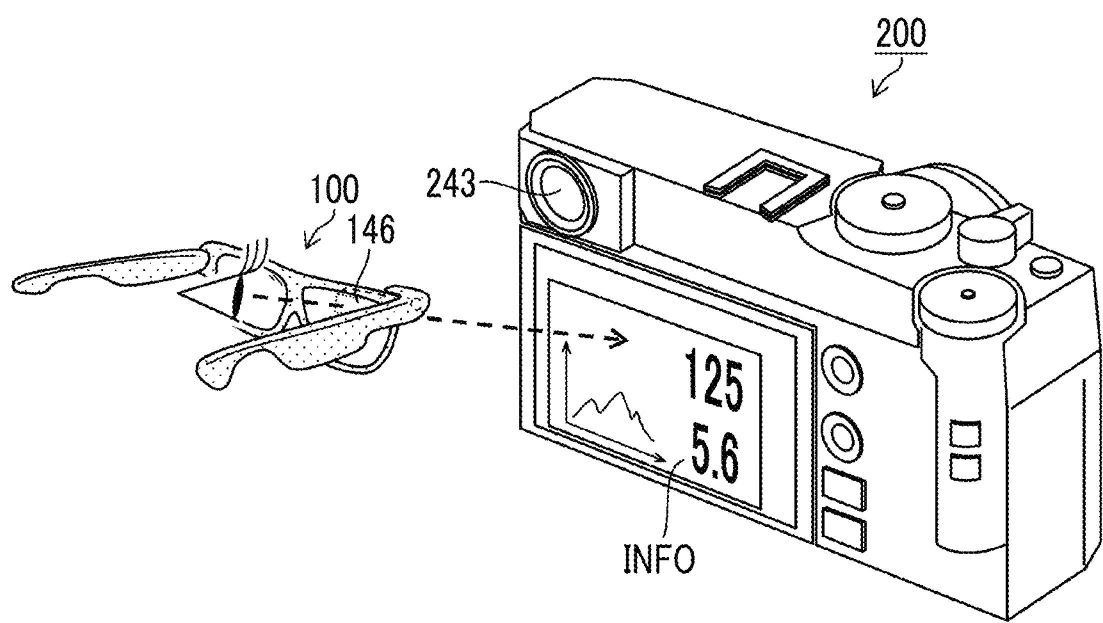
FIG. 18 is a diagram illustrating a sixth display example of the live view image or the like in a case where the imaging apparatus is set to the XR mode.

FIG. 18 is a diagram illustrating a sixth display example of the live view image or the like in a case where the imaging apparatus is set to the XR mode.

The sixth display example illustrated in FIG. 18 illustrates a case where imaging information INFO is displayed in a superimposed manner on a region wider than the submonitor 242 (refer to FIG. 1) of the closed monitor panel 240 of the imaging apparatus 200.

The imaging information INFO includes a histogram in addition to the imaging information normally displayed on the submonitor 242 (refer to FIG. 12A). This histogram is a brightness histogram indicating a distribution of brightness of the live view image being currently captured. The histogram is not limited to a brightness histogram and may be an RGB histogram for each color of R (red), G (green), and B (blue).

The imaging information INFO is not limited to information indicating an imaging condition such as the shutter speed, the F number, and an exposure value (EV) and includes various types of imaging information. For example, metadata representing subject information, the ISO sensitivity, and detection area information such as a face recognition frame and an AF frame can be included in the imaging information INFO.

The virtual image display apparatus 100 can receive text data or an image indicating the imaging information INFO from the imaging apparatus 200. In a case where the imaging information INFO is displayed on the submonitor 242, the virtual image display apparatus 100 can also acquire the imaging information INFO by performing image recognition to read the imaging information INFO.

While the imaging information INFO preferably includes camera identification information for distinction from data of other imaging apparatuses, the camera identification information is not displayed in displaying the imaging information INFO.

In a case where the imaging information INFO is composited and displayed, the virtual image display apparatus 100 preferably displays the live view image LV in a superimposed manner on a region of the view finder 243.

Accordingly, in a case where the user wearing the virtual image display apparatus 100 brings the eyes close to the view finder 243, the user can visually recognize the live view image LV from the eyepiece portion of the view finder 243.

<First Exterior Example of Imaging Apparatus>

Figure 19:
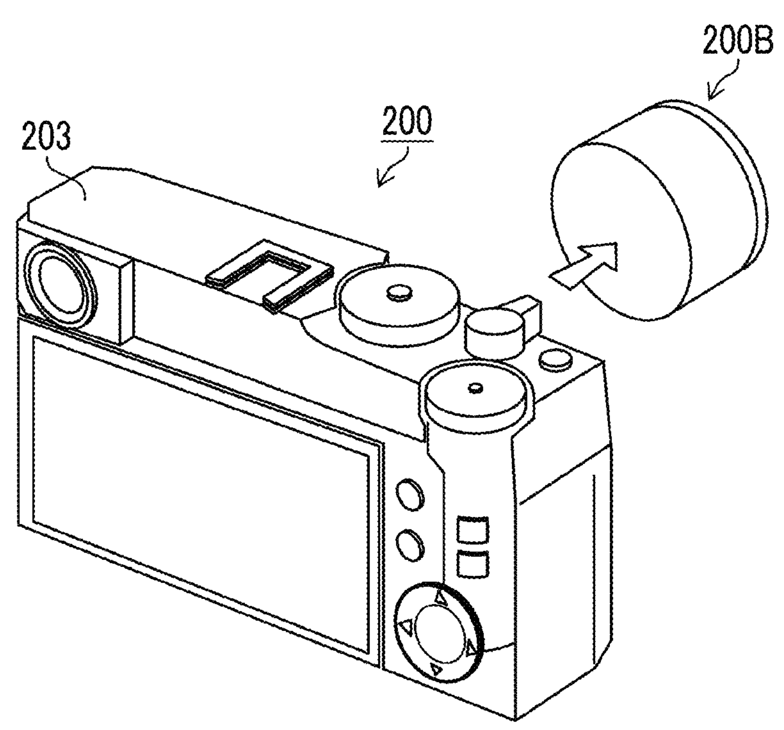
FIG. 19 is a diagram illustrating a first exterior example of the imaging apparatus in a case where the imaging apparatus is set to the XR mode.

FIG. 19 is a diagram illustrating a first exterior example of the imaging apparatus in a case where the imaging apparatus is set to the XR mode.

As illustrated in FIG. 10, the imaging apparatus 200 is provided with the AR markers M1 to M9, and the virtual image display apparatus 100 can specify each surface of the imaging apparatus 200 or a polygon indicating an exterior shape of the imaging apparatus 200 by detecting positions of the AR markers M1 to M9 from the visual field image IM.

The virtual image display apparatus 100 can display the imaging apparatus 200 as having an exterior different from its default exterior by pasting and compositing the virtual object image (skin) indicating the exterior of the imaging apparatus 200 in accordance with the AR markers M1 to M9.

In the above example, a method of pasting and compositing the virtual object image (skin) indicating the exterior of the imaging apparatus 200 has been described as a method of having the exterior different from the exterior of the imaging apparatus 200. However, the virtual object image (skin) may not be planarly pasted on a surface to which the virtual object image is pasted. For example, the virtual object image may have a shape of a separate member that is seen as protruding or a separate member that is attached, like a lens 200B attached to a front surface of the imaging apparatus 200 in FIG. 19.

A plurality of virtual object images (skins) may be provided for one AR marker.

A part corresponding to the lens 200B may be configured to be attachable and detachable. An operation such as holding and separating the part corresponding to the lens 200B (for example, a gesture such as twisting off that resembles lens replacement) may be detected through image recognition, and the lens 200B may be attached or detached in conjunction with the operation.

In the first exterior example of the imaging apparatus 200 illustrated in FIG. 19, the size of the monitor on the rear surface of the camera body 203 is increased, and the switches on the rear surface are changed.

<Second Exterior Example of Imaging Apparatus>

Figure 20:
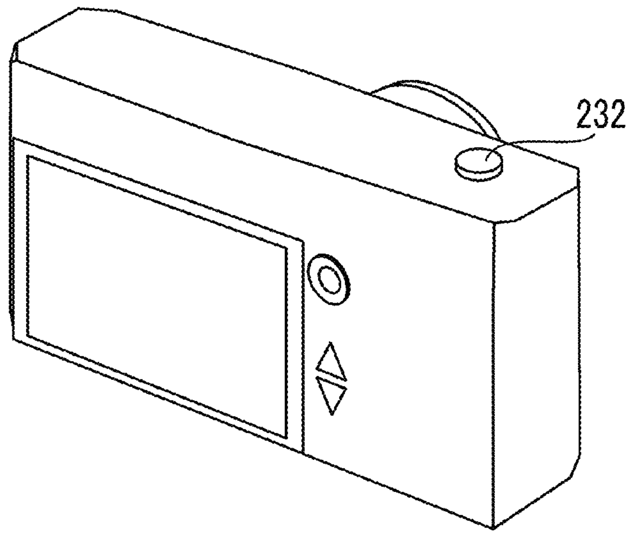
FIG. 20 is a diagram illustrating a second exterior example of the imaging apparatus in a case where the imaging apparatus is set to the XR mode.

FIG. 20 is a diagram illustrating a second exterior example of the imaging apparatus in a case where the imaging apparatus is set to the XR mode.

The virtual image display apparatus 100 changes the exterior of the imaging apparatus 200 by pasting and compositing the virtual object image (skin) indicating the exterior of the imaging apparatus 200, in the same manner as that in the first exterior example illustrated in FIG. 19.

In the second exterior example of the imaging apparatus 200 illustrated in FIG. 20, the upper surface of the camera body 203 is changed to a simple shape having only the shutter button 232. In the second exterior example illustrated in FIG. 20, the shutter speed/sensitivity dial 234 and the exposure correction dial 236 illustrated in FIG. 1 and the like are not seen.

In a case where the imaging apparatus 200 is set to the XR mode and where a part of an operation system of the imaging apparatus 200 is not seen because of a change in the exterior, the imaging apparatus 200 preferably disables an operation of the operation system that is not seen (the actual shutter speed/sensitivity dial 234, the actual exposure correction dial 236, and the like).

<Third Exterior Example of Imaging Apparatus>

Figure 21:
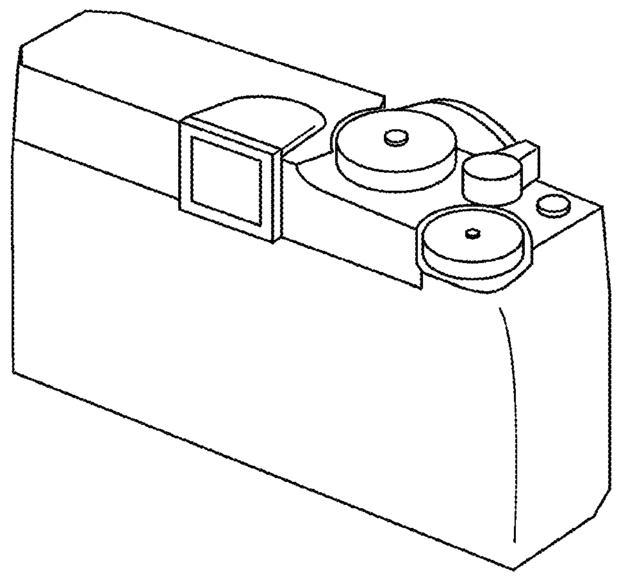
FIG. 21 is a diagram illustrating a third exterior example of the imaging apparatus in a case where the imaging apparatus is set to the XR mode.

FIG. 21 is a diagram illustrating a third exterior example of the imaging apparatus in a case where the imaging apparatus is set to the XR mode.

The virtual image display apparatus 100 changes the exterior of the imaging apparatus 200 by pasting and compositing the virtual object image (skin) indicating the exterior of the imaging apparatus 200, in the same manner as that in the first exterior example illustrated in FIG. 19.

In the third external example of the imaging apparatus 200 illustrated in FIG. 21, a position of the view finder is changed from a left end to a center portion, and the monitor and the operation system on the rear surface of the camera body 203 are removed.

Figure 22:
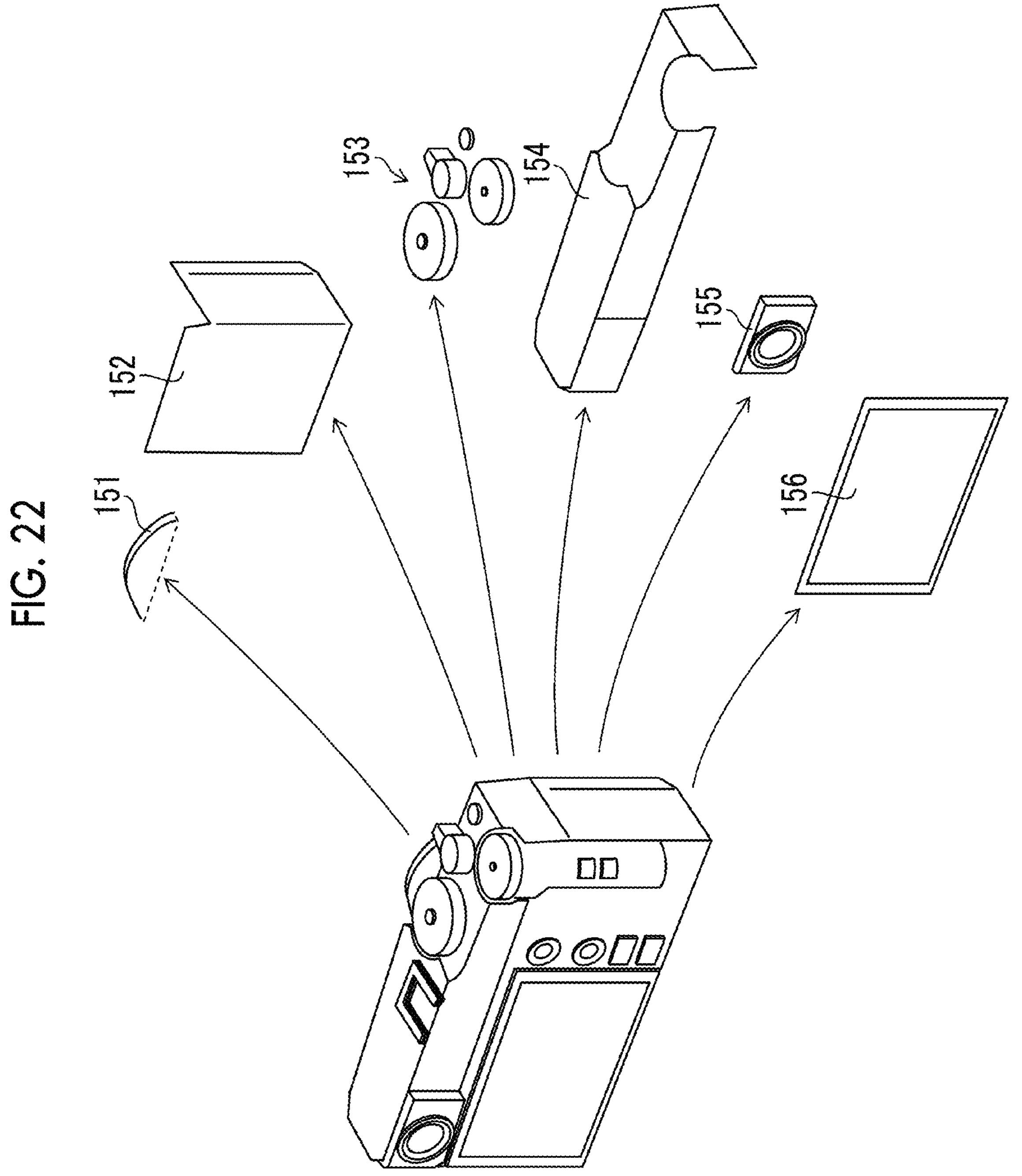
FIG. 22 is a conceptual diagram illustrating a case of changing the exterior of the imaging apparatus by dividing the exterior into a plurality of regions.

FIG. 22 is a conceptual diagram illustrating a case of changing the exterior of the imaging apparatus by dividing the exterior into a plurality of regions.

The first memory 120 of the virtual image display apparatus 100 stores virtual object images indicating the exterior for each divided region obtained by dividing the exterior of the imaging apparatus 200 into a plurality of regions.

In the example illustrated in FIG. 22, an interchangeable lens portion 151, a leather exterior portion 152, an operation dial portion 153, an upper exterior portion 154, a finder portion 155, and a monitor portion 156 are stored in the first memory 120 as the virtual object images.

The interchangeable lens portion 151 includes a plurality of interchangeable lens portions of different types such as a wide angle lens and a telephoto lens. The leather exterior portion 152 includes black leather, brown leather, red leather, a crocodile pattern, and the like. The upper exterior portion 154 includes exteriors having textures and colors of silver, black, gold, two-tone, and the like. The finder portion 155 and the monitor portion 156 also include various shapes and sizes.

The user can set the exterior of the imaging apparatus 200 to an original exterior by operating the operation unit 230 to select and combine the virtual object images indicating the exterior for each divided region.

That is, the XR processor 110 receives one or a plurality of virtual object images indicating the exterior through a user operation performed on the operation unit 230, appropriately geometrically transforms the virtual object image based on the three-dimensional position and the posture of the imaging apparatus 200, and outputs the transformed virtual object image to the XR display 140. Accordingly, the user can recognize the imaging apparatus that is visually recognized through the XR display 140, as having the exterior of the virtual object image selected by the user.

In a case of combining a plurality of types of virtual object images, a plurality of effective combinations may be prepared in advance, and the user may select a combination from the plurality of combinations. In this case, the XR processor 110 receives virtual object images of the combination selected from the plurality of combinations, appropriately geometrically transforms the virtual object images based on the three-dimensional position and the posture of the imaging apparatus 200, and outputs the transformed virtual object images to the XR display 140.

The effective combination of the plurality of types of virtual object images may be registered or updated by determining (determining using an artificial intelligence (AI)) the effective combination based on a past learning result.

By changing operability of the GUI or the exterior using past combination data (not limited to an AI), an effective combination of the virtual object images corresponding to preference of the user or operability of the user obtained using the past data can be provided. By performing this learning using the AI, the virtual object images that provide higher operability and that correspond to preference can be obtained.

In a case where preference of a large number of users are stored on a data server by collecting the past combination data for a large number of users, the above technology can be further customized to improve the exterior or operability for usability of an unspecified number of users or a specific user group (left-handed users, female users, children users, elderly users, and the like), as necessary. A method of performing this selectively using a menu screen or a setting screen or automatically using the AI in accordance with the user may also be used.

Not only the virtual object images may be interchanged, but also disposition may be configured to be changed such that, for example, the shutter speed/sensitivity dial 234 and the exposure correction dial 236 illustrated in FIG. 1 and the like are rearranged.

While the user has been described as being able to perform an operation of setting the exterior of the imaging apparatus 200 to an original exterior by operating the operation unit 230 to select and composite the virtual object images indicating the exterior for each divided region, the operation may be performed through a gesture control using an image recognition technology in order to intuitively perform the operation of setting an original exterior. That is, the virtual exterior may be changed by performing image recognition to recognize that the user has performed a gesture for changing the virtual object image indicating the exterior from the visual field image IM of the incorporated camera 101 provided in the virtual image display apparatus 100, and controlling display such as moving or interchanging the virtual object image indicating the exterior corresponding to the gesture.

The image of the imaging apparatus 200 used within an image visual field may be set to be seen as shining by, for example, increasing brightness of the displayed image of the imaging apparatus 200 and displaying the image on the XR display 140 or displaying a representation of light streaks representing that an inner side part is shining around the image of the imaging apparatus 200, so that a divided region to which the virtual object image (skin) is pasted is intuitively perceived.

The virtual object images are appropriately geometrically transformed and composited based on the three-dimensional position and the posture of the imaging apparatus 200.

For example, the virtual image display apparatus 100 can also enlarge and display the live view image LV1 as being captured by a telephoto lens, by interchanging the interchangeable lens portion 151 with a virtual telephoto lens from the actual wide angle lens.

<Imaging Apparatus Corresponding to Its Use in XR Environment>

Figure 23:
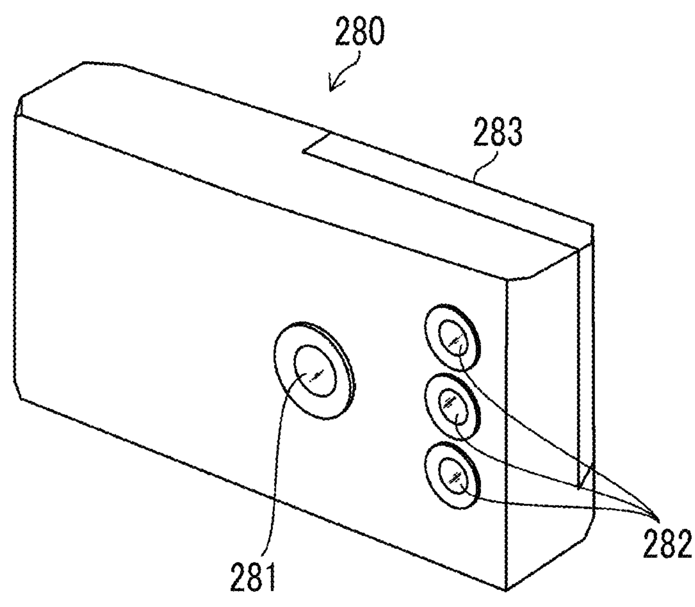
FIG. 23 is a perspective view of the imaging apparatus corresponding to its use in an XR environment.

FIG. 23 is a perspective view of the imaging apparatus corresponding to its use in the XR environment.

An imaging apparatus 280 illustrated in FIG. 23 comprises a dummy lens 281, three real lenses 282, and a dummy monitor 283.

The dummy lens 281 is a lens constituting only an exterior and does not have an imaging function.

The three real lenses 282 are lenses having different focal lengths from each other. The user can appropriately select and use the real lenses 282. Live view images captured by the real lenses 282 are transmitted to the virtual image display apparatus 100.

The dummy monitor 283 is a variable dummy monitor that does not have a display function and that can be rotationally moved with respect to a camera body.

In a case where the imaging apparatus 200 described above is used in the XR environment, the live view image is not displayed on the main monitor 241 or the like, and the virtual image display apparatus 100 displays the live view image LV1 in a superimposed manner on the display region of the imaging apparatus 200. However, in a case where the imaging apparatus 280 of the present example is used, the virtual image display apparatus 100 displays the live view image in a superimposed manner on the dummy monitor 283 of the imaging apparatus 280.

In a case where the dummy monitor 283 is rotationally moved, the virtual image display apparatus 100 can display the live view image in a superimposed manner on the rotationally moved dummy monitor 283. Accordingly, the same live view image LV1 as that in the cases illustrated in FIGS. 13, 15, and 17 can be displayed.

<Virtual Camera>

Figure 24:
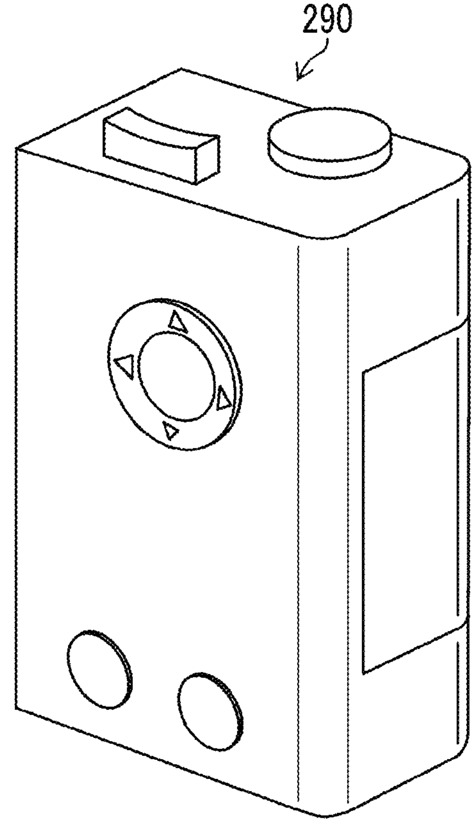
FIG. 24 is a perspective view from a rear surface side illustrating an embodiment of a virtual camera constituting the virtual image display system according to the embodiment of the present invention.

FIG. 24 is a perspective view from a rear surface side illustrating an embodiment of a virtual camera constituting the virtual image display system according to the embodiment of the present invention.

A virtual camera 290 illustrated in FIG. 24 is a virtual camera comprising a grip portion that can be held in at least a hand, and is provided with operation switches. In this case, while the term "virtual camera" is used, the grip portion is a physical entity, and the term does not mean a virtually displayed camera.

The virtual camera 290 does not comprise an imaging unit such as a lens or an imaging element and is a dummy camera without a camera function. The virtual camera 290 of the present example has an exterior shape of only the grip portion.

The grip portion of the virtual camera 290 is provided with an operation member including at least a shutter button. The operation member is a dummy switch that is operated through a user operation but does not generate an operation signal.

In the virtual camera 290, a lens or an imaging element is not necessary, and a communication unit can be significantly simplified. Thus, weight reduction can be achieved, and size reduction is also easily achieved by applying folding or the like. Even in a case where the virtual camera 290 does not have a camera function, the user is provided with the same operability of framing or the operation member as that in a normal camera.

The operation member of the virtual camera 290 of the present embodiment is a dummy switch that is operated through a user operation but does not generate an operation signal. However, as another embodiment, in a case where each operation member of the virtual camera 290 can be operated to provide the actual operability and includes an operation detection unit that detects a user operation, and a communication unit that transmits an operation signal (not including transmission of the live view image), an operation performed by the user can be reflected in real time by transmitting content of the operation performed on each operation member of the virtual camera 290 by the user to the virtual image display apparatus 100 (or the virtual image display system 10 or an XR server 300, described later).

A method of reflecting the operation performed by the user in real time is not limited to this method. As another variation, even in a case where each operation member of the virtual camera 290 can be operated to provide the actual operability but does not include the operation detection unit that detects the operation, or the communication unit, quality of operability can be improved. In this case, the operation performed by the user can be reflected in real time by performing image recognition to detect a motion of a finger of the user or an operation status of the operation member using the virtual image display apparatus 100, the imaging apparatus 200 included in the virtual image display system 10, or a camera eye for image recognition. In this case, performance in terms of an amount of time required for the reflection or an error ratio in the reflection generally deteriorates compared to that in a case where the operation detection unit and the communication unit are included. However, the deteriorating performance is practically acceptable depending on performance of the image recognition.

Figures 25A, 25B, 25C:
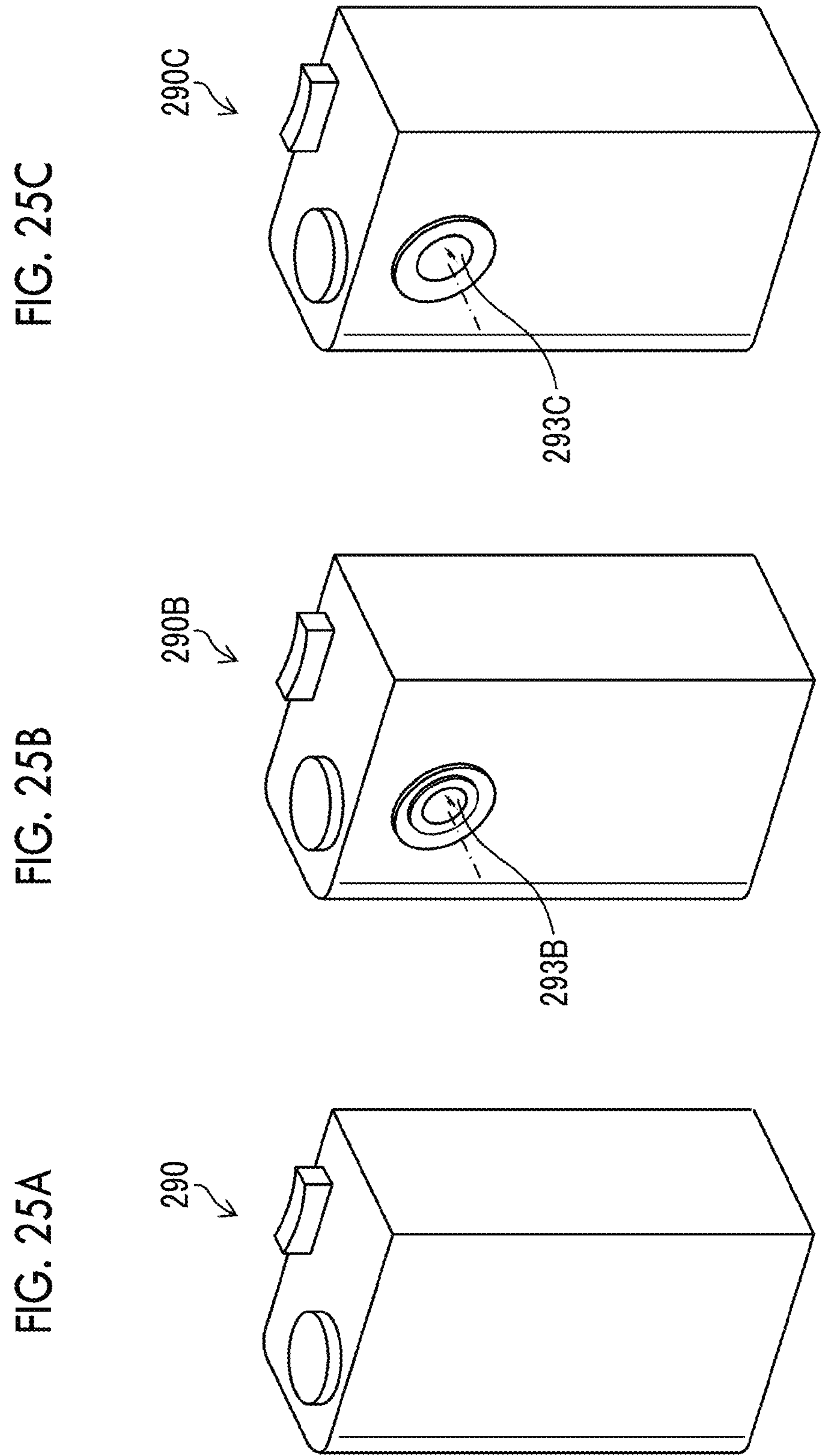
FIGS. 25A to 25C are perspective views from a front surface side illustrating the embodiment of the virtual camera constituting the virtual image display system according to the embodiment of the present invention.

FIGS. 25A to 25C are perspective views from a front surface side illustrating the embodiment of the virtual camera constituting the virtual image display system according to the embodiment of the present invention.

The virtual camera 290 illustrated in FIG. 25A is a perspective view in which the virtual camera 290 from the rear surface side illustrated in FIG. 24 is seen from the front side.

As described above, the virtual camera 290 is a dummy camera that does not comprise an imaging unit such as an imaging lens or an imaging element and that does not have a camera function.

In a virtual camera 290B illustrated in FIG. 25B, a small camera 293B such as one mounted on a smartphone is incorporated in a part that is on a front surface of a grip and that is not hidden by a hand holding the grip.

In this case, by including a communication unit including image transmission in addition to an operation detection unit that detects a user operation, content of an operation performed for each operation member of the virtual camera 290B by the user and a live view image or the like acquired by the small camera 293B can be transmitted to the virtual image display apparatus 100 (or the virtual image display system 10 or the XR server 300, described later) through the communication unit. The subsequent flow is the same as that in an embodiment described later in which a smartphone is used together.

The virtual camera 290B can also be used as a real imaging apparatus that uses a camera function comprised in a camera-equipped grip portion. In a case where the camera function of the camera-equipped grip portion is used, the virtual image display apparatus 100, as in the embodiment described later in which a smartphone is used, may obtain the final image by performing complementation, resolution enhancement, wash out and darkening correction, or the like on a live view image captured by the camera-equipped grip portion using the visual field image IM of the incorporated camera 101 of the virtual image display apparatus 100 or a live view image acquired from the XR server 300.

In a virtual camera 290C illustrated in FIG. 25C, a small camera 293C for image recognition is incorporated in a part that is on a front surface of a grip and that is not hidden by a hand holding the grip. The small camera 293C may have a lower resolution than the small camera 293B illustrated in FIG. 25B.

While the virtual camera 290C includes a communication unit in addition to an operation detection unit that detects an operation, the communication unit in this case may not perform image transmission. In a case where the communication unit does not include image transmission, information about a subject at which the virtual camera 290C is directed, range information of a set angle of view, or the like can be converted into a numerical value or a text from image data acquired by the small camera 293 using image recognition or the like and be transmitted to the virtual image display apparatus 100 (or the virtual image display system 10 or the XR server 300) through the communication unit together with content of an operation performed on each operation member, instead of transmitting the content of an operation performed on each operation member of the virtual camera 290C by the user and image data acquired by the small camera 293C. Accordingly, a small size and low cost configuration can be provided compared to the communication unit including image transmission. The subsequent flow of processing can be implemented by a combination of processing of the embodiment using a dummy camera not having a camera function and the embodiment described later using a smartphone described later. Thus, description of the flow will be omitted.

Figure 26:
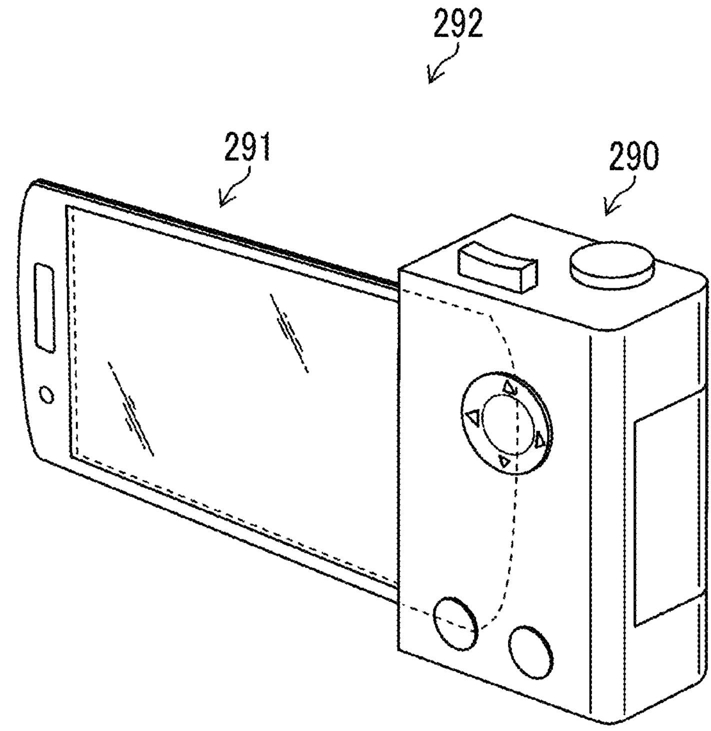
FIG. 26 is a perspective view illustrating another embodiment of the virtual camera constituting the virtual image display system according to the embodiment of the present invention.

FIG. 26 is a perspective view illustrating another embodiment of the virtual camera constituting the virtual image display system according to the embodiment of the present invention.

A virtual camera 292 illustrated in FIG. 26 is obtained by integrating the virtual camera 290 illustrated in FIG. 24 with a smartphone 291.

The virtual camera 292 can be used as a virtual camera not comprising a camera function or a real imaging apparatus using a camera function comprised in the smartphone 291. In a case where the camera function of the smartphone 291 is used, the final image may be obtained by performing complementation, resolution enhancement, wash out and darkening correction, or the like on a live view image captured by the smartphone 291 using the visual field image IM of the incorporated camera 101 of the virtual image display apparatus 100 or the live view image acquired from the XR server 300, as will be described later.

The virtual camera 290 illustrated in FIG. 24 and the virtual camera 292 in a case where the camera function of the smartphone 291 is not used cannot capture the live view image. However, an image (live view image) corresponding to angles of view of the virtual cameras 290 and 292 can be acquired by setting a virtual imaging unit.

Figure 27:
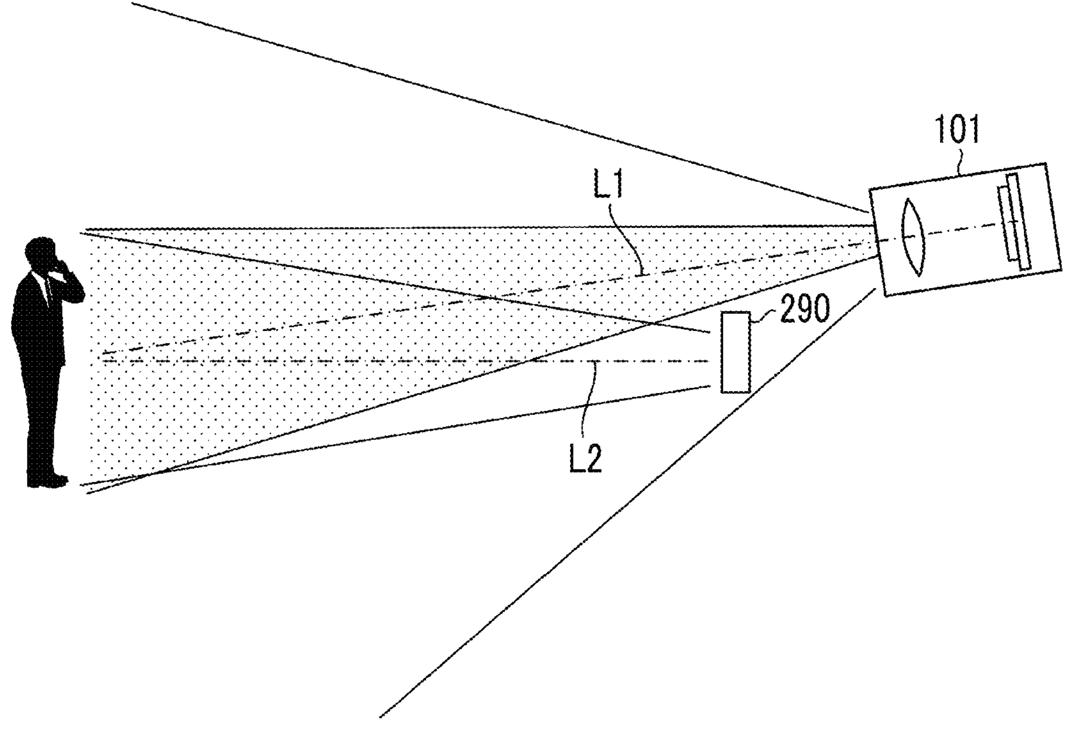
FIG. 27 is a diagram illustrating an embodiment of a method of acquiring a live view image captured by the virtual camera.

FIG. 27 is a diagram illustrating an embodiment of a method of acquiring the live view image captured by the virtual camera.

As described above, the incorporated camera 101 of the virtual image display apparatus 100 captures the visual field image IM corresponding to the visual field of the user including the virtual camera 290 and acquires the captured visual field image IM. In FIG. 27, L1 denotes an optical axis of the incorporated camera 101.

The live view image captured in a case where the virtual camera 290 has a camera function can be specified by a three-dimensional position, a posture (imaging direction), and the angle of view of the virtual camera 290. In FIG. 27, L2 denotes an optical axis assumed in the virtual camera 290 and can be obtained from the three-dimensional position and the posture of the virtual camera 290.

The virtual image display apparatus 100 can acquire information indicating the three-dimensional position and the posture of the virtual camera 290 with reference to the XR display 140, like that of the imaging apparatus 200.

Accordingly, in a case where the angle of view of the virtual camera 290 is set, a range of the visual field image IM captured by the incorporated camera 101 to which the live view image captured based on the three-dimensional position, the posture, and the angle of view of the virtual camera 290 corresponds can be obtained.

That is, the virtual image display apparatus 100 can cut out an image corresponding to the angle of view of the virtual camera 290 from the visual field image IM captured by the incorporated camera 101 and acquire the cut image as the live view image. An angle of view of the incorporated camera 101 is wider than the angle of view set for the virtual camera 290, and the visual field image IM includes the live view image captured by the virtual camera 290.

As described above, the virtual image display apparatus 100 can acquire a live view image that can be captured in a case where the virtual camera 290 includes an imaging unit, from the visual field image IM captured by the incorporated camera 101.

The virtual image display apparatus 100 can geometrically transform the acquired live view image and display the transformed live view image on a display region set for the virtual camera 290 (for example, a region adjacent to the grip portion that is the virtual camera 290).

In a case where the virtual camera 292 illustrated in FIG. 26 is used, the virtual image display apparatus 100 can geometrically transform the acquired live view image and display the transformed live view image in a superimposed manner on a display region of the smartphone 291 of the virtual camera 292.

The virtual image display apparatus 100 can detect a user operation (gesture) performed on the switches in the virtual camera 290 by analyzing the visual field image IM captured by the incorporated camera 101 and perform imaging for recording, storage, and other types of processing based on the user operation performed on the switches.

The virtual camera is not limited to a virtual camera having only the grip portion and is considered to be various virtual cameras having different exterior shapes, sizes, or disposition and presence or absence of switches.

While the virtual camera 290 of the present example does not comprise a camera function, the virtual camera 290 may comprise real switches and a real communication unit or the like, and operation information of the switches may be transmitted to the virtual image display apparatus 100 through the simple communication unit comprised in the virtual camera 290.

<Second Embodiment of XR Display>

Figure 28:
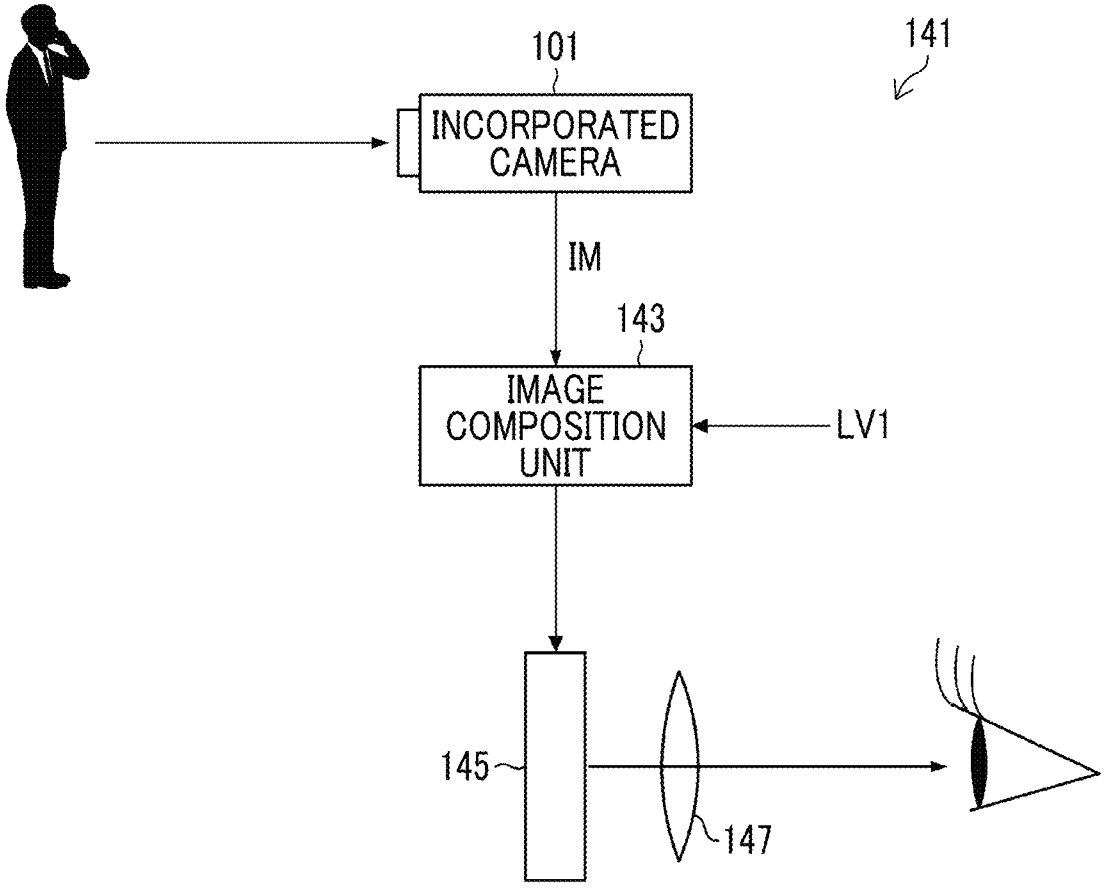
FIG. 28 is a diagram illustrating a second embodiment of the XR display of the virtual image display apparatus.

FIG. 28 is a diagram illustrating a second embodiment of the XR display of the virtual image display apparatus.

An XR display 141 illustrated in FIG. 28 is an immersive type display that covers a visual field, and is a wearable device having a goggles type virtual image display function. The XR display 141 is composed of the incorporated camera 101, an image composition unit 143, a display element 145, and an optical system 147.

The captured image (visual field image IM) captured by the incorporated camera 101 is output to the image composition unit 143.

The geometrically transformed live view image LV1 is supplied as another input of the image composition unit 143. The image composition unit 143 composites (pastes) the live view image LV1 in a display region of the camera image included in the visual field image IM and outputs the composited image to the display element 145.

The display element 145 displays the visual field image IM in which the live view image LV1 is composited. The visual field image IM is displayed as a virtual image at the display position in front of the eyes of the user by the optical system 147.

The user wearing the goggles type XR display 141 can visually recognize the virtual image of the visual field image IM displayed on the display element 145 through the optical system 147. Since the visual field of the user is covered by the goggles type XR display 141, the user can see only the visual field image IM and be deeply immersed in the unreal world.

In FIG. 28, only one XR display 141 is illustrated in FIG. 28. However, in a case where a goggles type is used, a pair of left and right XR displays 141 corresponding to both eyes are comprised. Accordingly, the incorporated camera 101 or the like is also provided on each of the left and right sides, and the live view image LV1 is also generated as live view images for the left and right sides.

[Second Embodiment of Virtual Image Display System]

Figure 29:
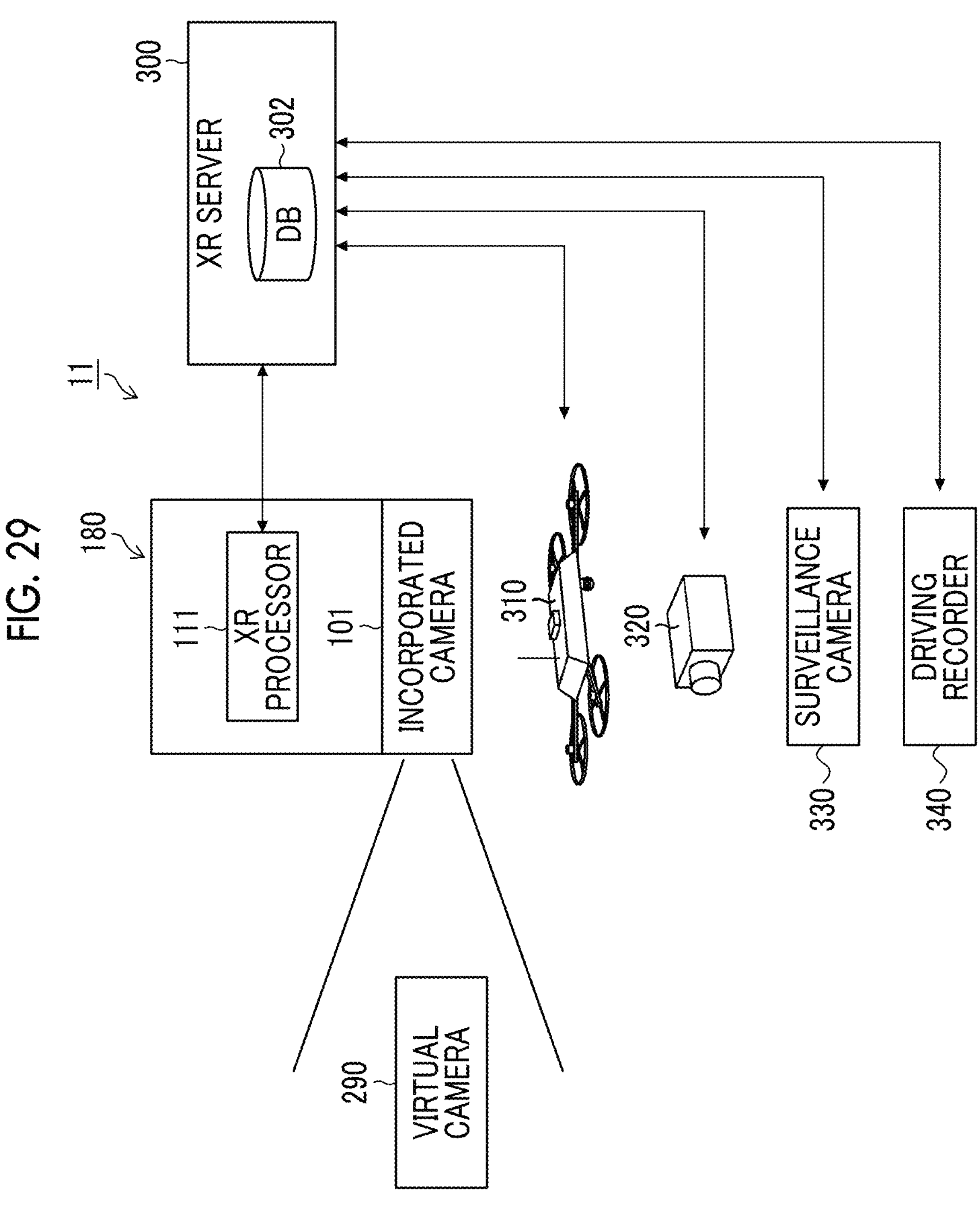
FIG. 29 is a block diagram illustrating a second embodiment of the virtual image display system according to the embodiment of the present invention.

FIG. 29 is a block diagram illustrating a second embodiment of the virtual image display system according to the embodiment of the present invention.

A virtual image display system 11 illustrated in FIG. 29 is composed of a virtual image display apparatus 180, the virtual camera 290, and the server (XR server) 300.

While the virtual image display apparatus 180 is substantially the same as the virtual image display apparatus 100 illustrated in FIG. 6, the virtual image display apparatus 180 is different from the virtual image display apparatus 100 in terms of transmitting and receiving necessary information to and from the XR server 300.

In FIG. 29, the XR server 300 comprises a database (DB) 302 that manages a three-dimensional image (XR space construction data) having three-dimensional information of a real space.

The XR server 300 collects images captured by a large number of cameras including a multi-view camera 320, a surveillance camera 330, a driving recorder 340, a drone camera 310, or a portable terminal camera disposed in the real space, generates the latest XR space construction data, and manages the generated XR space construction data in the database 302.

The database 302 converts a city block, a city, a commercial district, a tourist spot, and the like into digital data and manages the converted data as the XR space construction data. It is preferable to manage the XR space construction data of a wider area via a plurality of XR servers 300 in conjunction with each other.

An XR processor 111 of the virtual image display apparatus 180 has the same function as the XR processor 110 of the virtual image display apparatus 100 illustrated in FIG. 6. However, the XR processor 111 further cuts out the XR space construction data corresponding to an imaging region of the virtual camera 290 from the XR space construction data managed by the XR server 300, converts the cut three-dimensional XR space construction data into a two-dimensional image, and uses the two-dimensional image as a live view image based on the information (first information) indicating the three-dimensional position, the posture, and the angle of view of the virtual camera 290.

The XR processor 111 converts the three-dimensional XR space construction data read out from the database 302 into a two-dimensional image by performing perspective projective transformation based on the three-dimensional position and the posture (imaging direction) of the virtual camera 290 using a camera intrinsic parameter (in the present example, the angle of view or the focal length set in advance) of the virtual camera 290, and obtains the two-dimensional image as the live view image LV.

The XR processor 111 specifies a display region of the virtual camera 290 by analyzing the visual field image IM captured by the incorporated camera 101, acquires the transformation information used in superimposing the live view image LV on the display region of the virtual camera 290, and geometrically transforms the live view image LV based on the acquired transformation information. However, in a case where the transformation information is acquired based on a relative three-dimensional position and a relative posture between the XR display 140 of the virtual image display apparatus 180 and the virtual camera 290 and where the visual field image IM is not used in XR display, the incorporated camera 101 can be omitted. The XR processor 111 may generate a better live view image using image data transmitted from a nearby imaging apparatus of another person.

In generating the latest XR space construction data, the XR server 300 preferably constructs the XR space construction data of higher image quality than that generated using a single image, by compositing not only a current image but also an image recorded in the past as the images of the multi-view camera 320 and the like. The number of pixels of the image can be increased by processing and compositing a plurality of images using a slight deviation between pixels.

In creating a complemented image using the plurality of images, it is preferable to perform mutual complementation of washing out, darkening, and the like, complement a part in which image data is not obtained or a part of poor quality, and in further complementing the part of poor quality, correct brightness of the complemented image so that a hierarchical relationship of brightness and darkness generated by strength and weakness of light is not reversed. In correcting the brightness of the complemented image, it is preferable to correct a gamma curve to fall within the entire display latitude (within printing latitude) or correct a printing parameter curve to fall within the entire printing latitude.

In compositing with a main subject image, it is preferable to correct the brightness, a ray direction, a color temperature, and the gamma curve (printing parameter) in accordance with the images of the multi-view camera 320 and the like. In a case of compositing an image of other than a main subject from the past image and the current image of the multi-view camera 320, it is preferable to detect a changing condition such as the weather and a time point from the current image and convert and composite the past image and the XR space construction data in accordance with the detected changing condition such as the weather and the time point.

The XR server 300 may composite a virtual object image in the XR space construction data. For example, in a case where the XR space construction data includes an image of a person, the XR server 300 can convert the image of the person into an image of an avatar resembling the person and change the image of the person to the image of the avatar. The XR server 300 can also specify the person from the image of the person and, in a case where the specified person has registered the image of the avatar of the person in the XR server 300, change the image of the person to the registered image of the avatar.

Accordingly, the virtual image display apparatus 180 can acquire the live view image LV including the image of the avatar from the XR server 300.

A case where an image including the user is used by another person is considered. In this case, it is preferable to provide a notification or an alert via the virtual image display apparatus 100. Permitting/not permitting the image including the user can be set. In a case where the image is set to be permitted, the notification or the like can be omitted.

In a case where the image including the user is used by another person and where the image is set not to be permitted, a signal for notifying or alerting the other person or locking imaging of the other person can be transmitted, or a signal for mosaicing an image part of the user or a generation prohibition signal for not allowing generation of the image on a side of the other person can be transmitted. In a case where the generation prohibition signal is received, an apparatus on the side of the other person preferably performs image processing such that the image of the prohibited subject is not generated (for example, removed or filled with a background).

While the virtual image display apparatus 180 acquires the live view image LV from the XR server 300 in this embodiment, the present invention is not limited to this. The virtual image display apparatus 180 may transmit information necessary for extracting the live view image LV to the XR server 300. The XR server 300 may acquire the live view image LV and transmit the live view image LV to the virtual image display apparatus 180 or geometrically transform the live view image LV and transmit the geometrically transformed live view image LV1 to the virtual image display apparatus 100.

The XR server 300 may acquire the visual field image IM in the same manner as a method of acquiring the live view image LV by acquiring information indicating a visual field range of the XR display 140, and transmit the visual field image IM to the virtual image display apparatus 180.

While the virtual camera 290 is used in this embodiment, the present invention can also be applied to a case where the imaging apparatus 200 is used. In this case, in a case where the imaging apparatus 200 is used in the XR environment, the imaging apparatus 200 does not capture the live view image and acquires the live view image from the XR server 300.

While the latest XR space construction data is registered in the database 302 of the XR server 300, the latest XR space construction data is not necessarily real time XR space construction data. Thus, the live view image LV generated from the latest XR space construction data is not necessarily a real time image.

Accordingly, for example, the virtual image display apparatus 180 preferably adjusts the brightness and the tint of the live view image LV in accordance with brightness and a tint of the visual field image IM captured by the incorporated camera 101.

While the virtual camera 290 can be operated to any posture by the user by holding the virtual camera 290 in a hand, enabling the three-dimensional position of the virtual camera 290 to be also changed to any position through a user operation instead of a real position enables the user to enjoy imaging the tourist spot or the like while staying at home.

[First Embodiment of Virtual Image Display Method]

Figure 30:
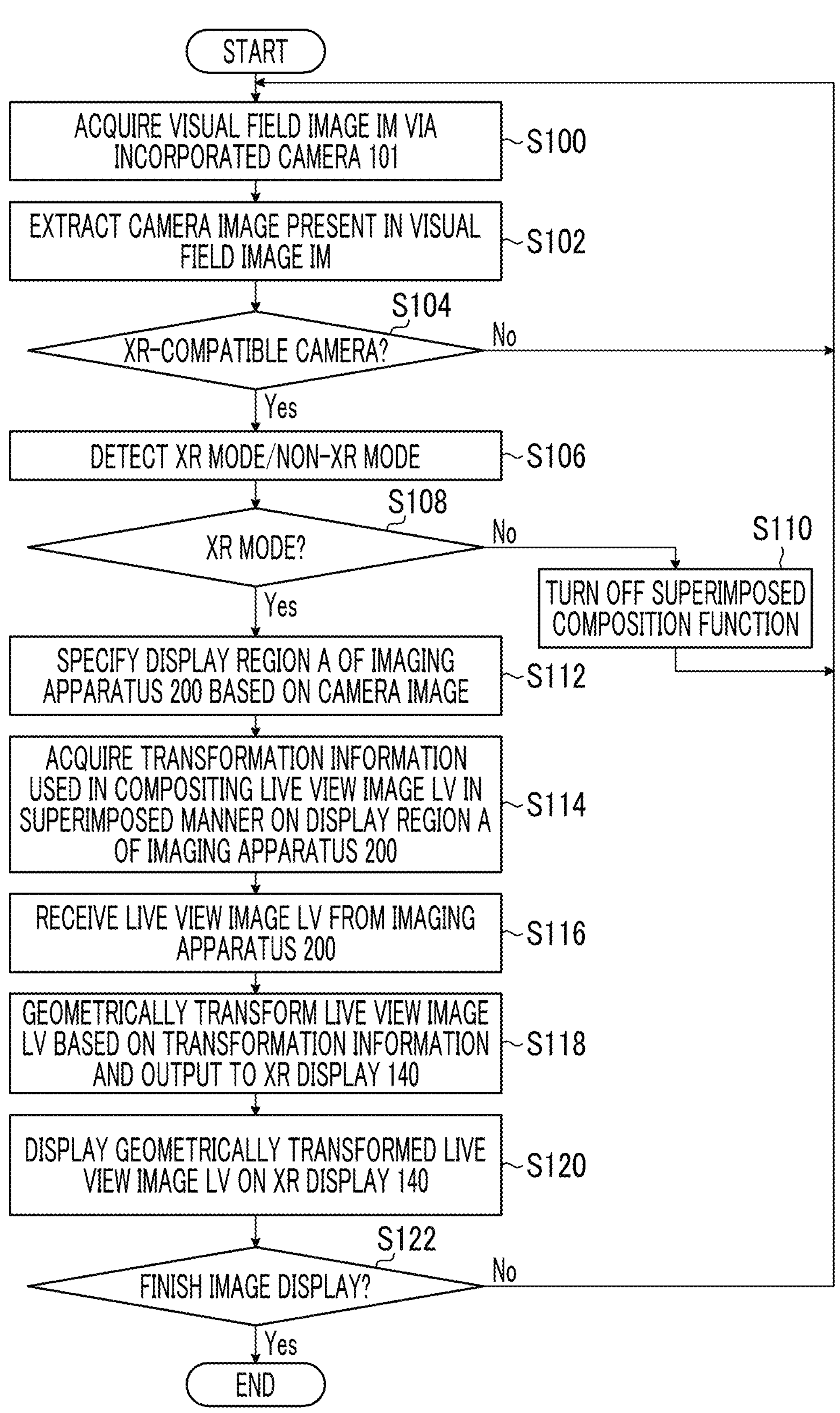
FIG. 30 is a flowchart illustrating a first embodiment of a virtual image display method according to the embodiment of the present invention.

FIG. 30 is a flowchart illustrating a first embodiment of a virtual image display method according to the embodiment of the present invention.

The virtual image display method of the first embodiment illustrated in FIG. 30 is a method performed by the virtual image display apparatus 100 and is mainly performed by the XR processor 110 of the virtual image display apparatus 100 illustrated in FIG. 6.

In FIG. 30, the XR processor 110 acquires the visual field image IM captured by the incorporated camera 101 (step S100).

The XR processor 110 extracts the camera image indicating the imaging apparatus 200 included in the visual field image IM by analyzing the visual field image IM (step S102). In a case of capturing the live view image via the imaging apparatus 200 by holding the imaging apparatus 200 in a hand, the visual field image IM captured by the incorporated camera 101 normally includes the camera image indicating the imaging apparatus 200, as illustrated in FIG. 9.

The XR processor 110 determines whether or not the imaging apparatus 200 is an XR-compatible camera from the extracted camera image (step S104). For example, this determination can be performed by comparing the extracted camera image with exterior data of the XR-compatible camera stored in advance in the first memory 120. The determination can also be performed by determining whether or not the AR markers M provided in the imaging apparatus 200 match the AR markers M registered in advance.

In a case where it is determined that the imaging apparatus 200 imaged by the incorporated camera 101 is the XR-compatible camera ("Yes"), the XR processor 110 then detects whether the imaging apparatus 200 is in the XR mode or the non-XR mode (step S106).

In a case where the imaging apparatus 200 is set to the XR mode and where the AR markers M are displayed on the main monitor 241 or the submonitor 242, the XR mode/non-XR mode can be detected by detecting the AR markers M. In a case where the imaging apparatus 200 includes a dedicated mode switching lever, the detection can also be performed by performing image recognition of a position of the mode switching lever. In a case where the camera image is extracted from the visual field image IM, the XR processor 110 can also automatically wirelessly connect to the imaging apparatus 200 from the virtual image display apparatus 100 and detect the XR mode/non-XR mode based on a communication result with the imaging apparatus 200. For example, in a case where there is no response from the imaging apparatus 200 with respect to a call from the virtual image display apparatus 100, it can be determined that the imaging apparatus 200 is not set to the XR mode.

In step S108, in a case where it is determined that the imaging apparatus 200 is not set to the XR mode from a detection result of the XR mode/non-XR mode ("No"), the XR processor 110 turns OFF a superimposed composition function of the live view image in the virtual image display apparatus 100 (smart glasses) (step S110) and returns to step S100. Accordingly, the user can see only the real world seen through the smart glasses.

In step S108, in a case where it is determined that the imaging apparatus 200 is set to the XR mode from the detection result of the XR mode/non-XR mode ("Yes"), the display region A (refer to FIG. 10) of the imaging apparatus 200 is specified based on the extracted camera image. The display region A can be specified by detecting the quadrangular contour of the monitor panel 240 or detecting the AR markers M2 to M4 provided in the imaging apparatus 200.

Next, the XR processor 110 acquires the transformation information used in superimposing the live view image LV on the display region A of the imaging apparatus 200. In a case of performing the affine transformation of the live view image LV and superimposing the transformed live view image LV on the display region A, the parameters of the affine transformation (transformation matrix) are acquired as the transformation information. In a case of performing the projective transformation of the live view image LV and superimposing the transformed live view image LV on the display region A, the transformation matrix of the projective transformation is acquired as the transformation information. The transformation matrix can be obtained from coordinates of a plurality of feature points of the live view image LV and from coordinates of a plurality of corresponding points in the display region A corresponding to the plurality of feature points.

Next, the XR processor 110 receives the live view image LV from the imaging apparatus 200 (step S116). While the live view image LV is continuous data, image data of one frame is received in step S116.

The XR processor 110 geometrically transforms the live view image LV (image data of one frame) based on the transformation information acquired in step S114 and outputs the geometrically transformed live view image LV1 to the XR display 140 (step S118).

The XR display 140 receives input of the geometrically transformed live view image LV1 and displays the live view image LV1 on the display element 144 as illustrated in FIG. 11 (step S120). The user can visually recognize the live view image LV1 superimposed on the real world (the display region A of the imaging apparatus 200) through the optical system 146 of the XR display 140.

The XR processor 110 determines whether or not to finish image display of the live view image LV1 performed by the XR display 140 (step S122). In a case of not finishing the image display, a transition is made to step S100, and the processing of step S100 to step S122 is repeated for each frame of the live view image LV. In a case of finishing the image display, the processing performed by the virtual image display apparatus 100 is finished.

[Display Method Performed by Imaging Apparatus]

FIG. 31 is a flowchart illustrating a display method performed by the imaging apparatus according to the embodiment of the present invention.

The display method performed by the imaging apparatus illustrated in FIG. 30 is a method mainly performed by the camera processor 210 of the imaging apparatus 200 illustrated in FIG. 7.

In FIG. 31, the camera processor 210 first determines whether or not the XR mode is set by the mode switching unit (step S200).

The user can differently use the imaging apparatus 200 depending on an advantage/disadvantage of the XR mode and the non-XR mode by setting the XR mode in a case where it is difficult to see the main monitor 241 in a bright place or the like, in a case where the live view image LV1 is desired to be displayed on a virtual monitor to be larger than the actual main monitor 241, or in a case where various virtual objects including the avatar are desired to be imaged, and setting the non-XR mode in a case where the live view image or the like displayed on the actual main monitor 241 is desired to be observed by prioritizing more natural usability.

In step S200, in a case where it is determined that the XR mode is set ("Yes"), the camera processor 210 displays the AR markers M on the submonitor 242 of the closed monitor panel 240. The AR markers M can be used as the marker for specifying the display region A of the live view image LV1 and/or be used as the camera identification information for distinction from other imaging apparatuses.

Next, the camera processor 210 transmits the live view image LV that is captured by the imaging unit 201 and that is subjected to the RAW development treatment to the virtual image display apparatus 100 through the second communication unit 260 (step S220).

In step S200, in a case where it is determined that the XR mode is not set (the non-XR mode is used), the camera processor 210 determines whether or not the tiltable monitor panel 240 is open (step S230). In a case where it is determined that the monitor panel 240 is open, the camera processor 210 outputs the live view image LV that is captured by the imaging unit 201 and that is subjected to the RAW development treatment to the main monitor 241 and displays the live view image LV1 on the main monitor 241. Accordingly, the user can check the current imaging range and the like from the live view image LV displayed on the main monitor 241.

In a case where it is determined that the monitor panel 240 is not open ("No"), the camera processor 210 then determines whether the view finder 243 that is a hybrid finder is switched to the EVF or is switched to the OVF (step S250). This determination can be performed based on a user operation performed on the finder switching lever.

In a case where the view finder 243 is switched to the EVF, the camera processor 210 displays the live view image LV1 on the EVF (step S260). In a case where the view finder 243 is switched to the OVF, the optical image (finder image) is displayed on the OVF (step S270). In this case, processing of generating the live view image LV1 can be stopped.

The user can check the live view image LV1 displayed on the EVF or the finder image displayed on the OVF by looking into the eyepiece portion of the view finder 243.

[Second Embodiment of Virtual Image Display Method]

Figure 32:
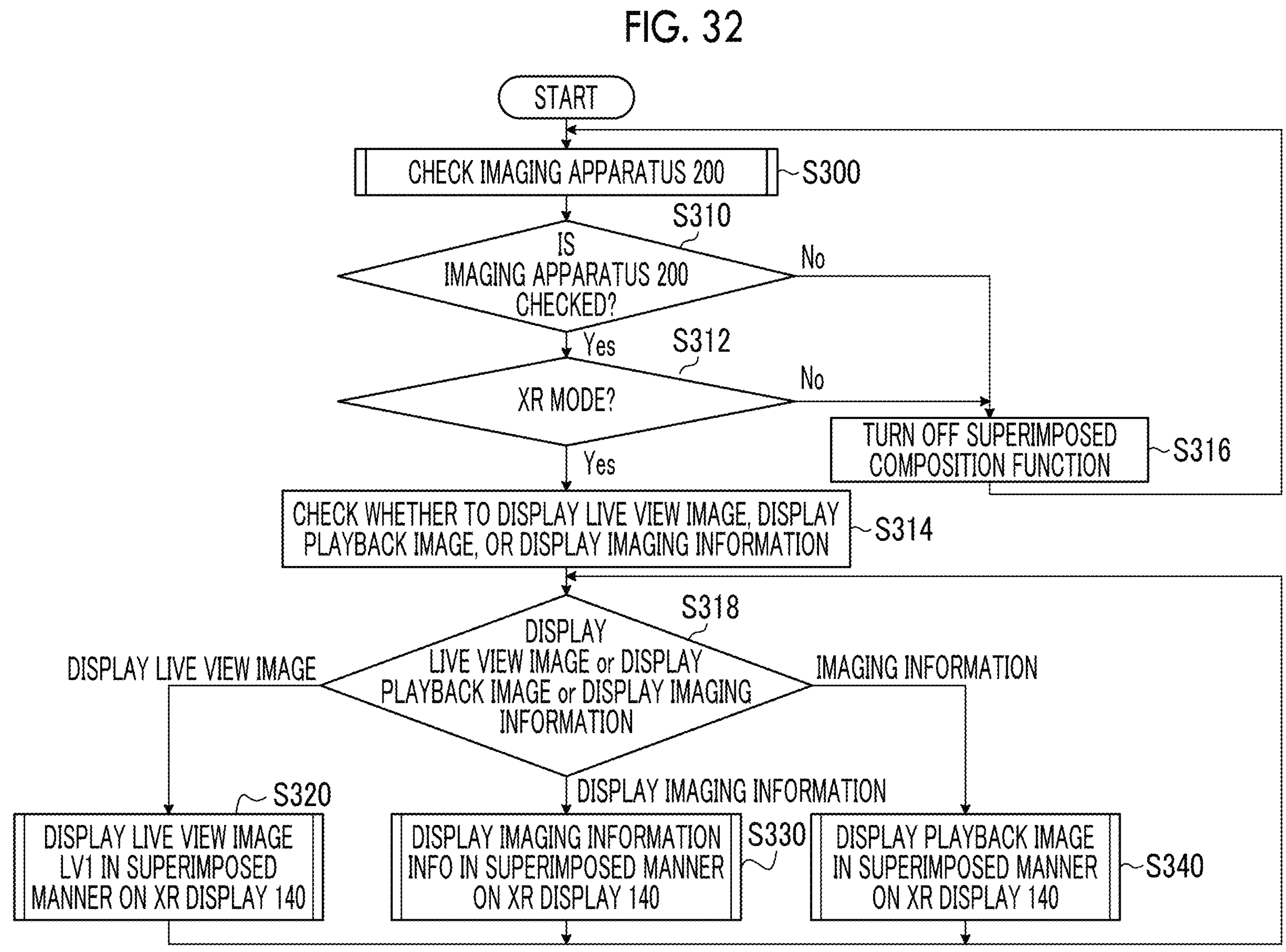
FIG. 32 is a flowchart illustrating a second embodiment of the virtual image display method according to the embodiment of the present invention.

FIG. 32 is a flowchart illustrating a second embodiment of the virtual image display method according to the embodiment of the present invention.

The virtual image display method of the second embodiment illustrated in FIG. 32 is a method mainly performed by the XR processor 110 of the virtual image display apparatus 100 illustrated in FIG. 6, like that of the first embodiment illustrated in FIG. 30.

In FIG. 32, the XR processor 110 first checks the imaging apparatus 200 (step S300).

Figure 33:
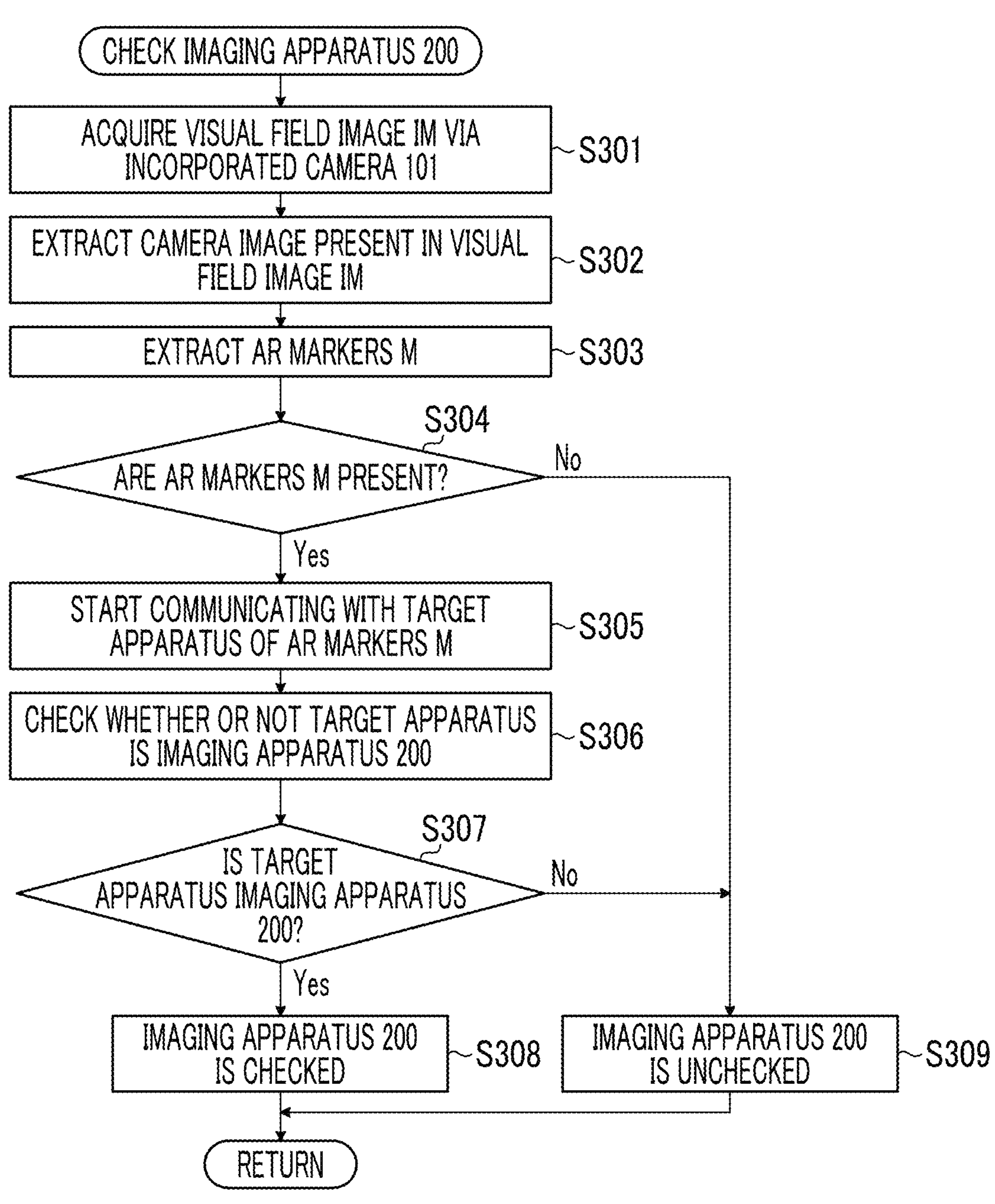
FIG. 33 is a subroutine illustrating an embodiment of processing of step S300 illustrated in FIG. 32 in which the imaging apparatus is checked.

FIG. 33 is a subroutine illustrating an embodiment of the processing of step S300 illustrated in FIG. 32 in which the imaging apparatus is checked.

In FIG. 33, the XR processor 110 acquires the visual field image IM captured by the incorporated camera 101 (step S301) and extracts the camera image of the imaging apparatus 200 present in the visual field image IM (step S302).

Next, the XR processor 110 performs image analysis of the camera image and performs processing of extracting the AR markers M (step S303). Since the imaging apparatus 200 that is the XR-compatible camera of the present example is provided with the AR markers M, presence or absence of the imaging apparatus 200 can be checked from presence or absence of the AR markers M.

In step S304, in a case where it is determined that the AR markers M are "present" ("Yes"), a transition is made to step S305, and the XR processor 110 starts communicating with a target apparatus having the AR markers M.

Next, the XR processor 110 performs communication to check whether or not the target apparatus is the imaging apparatus 200 of the user (step S306). For example, the XR processor 110 can check whether or not the target apparatus is the imaging apparatus 200 of the user by checking whether or not the apparatuses have been paired with each other once. The virtual image display apparatus 100 and the imaging apparatus 200 of the user can be paired with each other using a well-known method.

In step S307, in a case where it is determined that the target apparatus is the imaging apparatus 200 of the user ("Yes"), the XR processor 110 checks that the camera image included in the visual field image IM is the imaging apparatus 200 of the user (step S308).

In step S304, in a case where it is determined that the AR markers M are not present in the visual field image IM (camera image) ("No"), or in step S307, in a case where it is determined that the target apparatus is not the imaging apparatus 200 of the user ("No"), the XR processor 110 determines that the imaging apparatus 200 of the user cannot be checked (unchecked) (step S309).

With reference to FIG. 32 again, in step S310, in a case where the presence of the imaging apparatus 200 of the user is checked ("Yes"), the XR processor 110 determines whether or not the imaging apparatus 200 is in the XR mode (step S312). A method of determining the XR mode can be performed in the same manner as the method described above. Thus, description of the method will be omitted.

In step S312, in a case where it is determined that the imaging apparatus 200 is set to the XR mode ("Yes"), the XR processor 110 checks whether to display the live view image in a superimposed manner, display the playback image in a superimposed manner, or display the imaging information INFO in a superimposed manner on the display region A of the imaging apparatus 200 (step S314).

In a case where the imaging apparatus 200 is used in the XR environment, the imaging apparatus 200 can receive a user instruction indicating which one of the live view image, the playback image, or the imaging information INFO is to be displayed in the display region A of the imaging apparatus 200, and transmits information corresponding to the received user instruction (the live view image, the playback image, or the imaging information INFO) to the virtual image display apparatus 100.

Accordingly, the XR processor 110 can check whether to display the live view image in a superimposed manner, display the playback image in a superimposed manner, or display the imaging information INFO in a superimposed manner on the display region A of the imaging apparatus 200 based on the information (the live view image or the like) received from the imaging apparatus 200.

In step S318, in a case where it is determined that the live view image is to be displayed, the XR processor 110 transitions to step S320 and displays the live view image received from the imaging apparatus 200 in a superimposed manner on the XR display 140.

Figure 34:
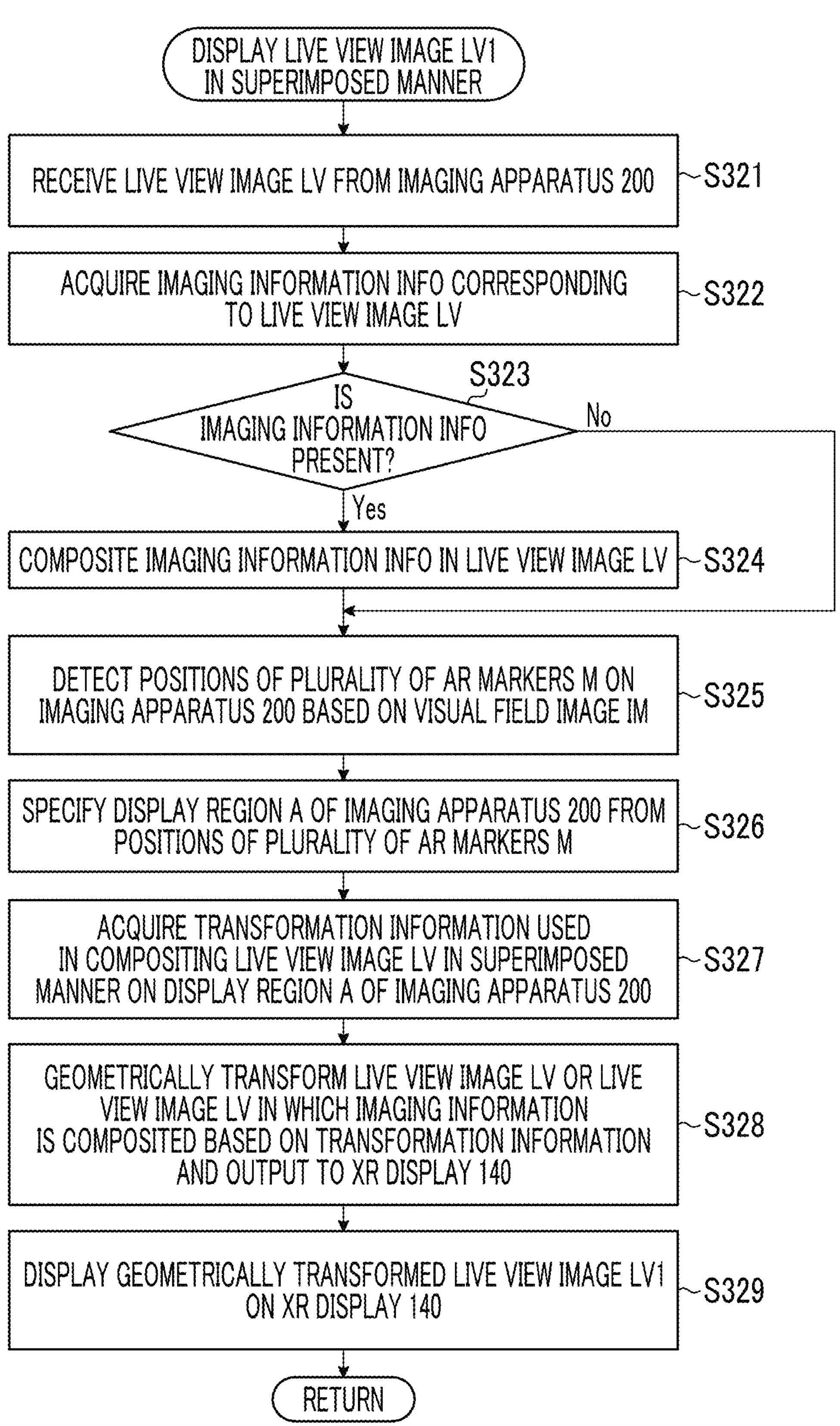
FIG. 34 is a subroutine illustrating an embodiment of processing of step S320 illustrated in FIG. 32 in which a live view image LV1 is displayed in a superimposed manner.

FIG. 34 is a subroutine illustrating an embodiment of the processing of step S320 illustrated in FIG. 32 in which the live view image LV1 is displayed in a superimposed manner.

In FIG. 34, the XR processor 110 receives the live view image LV from the imaging apparatus 200 (step S321).

Next, the XR processor 110 acquires the imaging information INFO corresponding to the received live view image LV (step S322). For example, the imaging information INFO is text information and is accessory information associated with one frame or each of a plurality of frames of the live view image LV.

In step S323, in a case where it is determined that the imaging information INFO is "present" ("Yes"), the XR processor 110 transitions to step S324 and composites the imaging information INFO in an edge part region of the live view image LV (step S324).

In step S323, in a case where it is determined that the imaging information INFO is "not present" ("No"), the XR processor 110 transitions to step S325 by skipping step S324.

In a case where the imaging information INFO is acquired but handover information of the imaging information INFO includes information indicating "not displayed", the XR processor 110 determines that the imaging information INFO is "not present" and transitions to step S325 by skipping step S324. In creating the live view image by operating the imaging apparatus 200 based on data acquired from the XR server 300, in a case where the imaging information INFO of the live view image is acquired but is the imaging information INFO of the live view image generated by operating the imaging apparatus 200, it is determined that the imaging information INFO is "not present", and a transition is made to step S325 by skipping step S324.

In step S325, the XR processor 110 acquires the visual field image IM from the incorporated camera 101 and detects positions of the plurality of AR markers M on the imaging apparatus 200 based on the acquired visual field image IM.

Then, the XR processor 110 displays the live view image LV1 in a superimposed manner on the display region A of the imaging apparatus 200 observed through the XR display 140, by performing processing of steps S326 to S329. The processing of steps S326 to S329 is the same as the processing of steps S112, S114, S118, and S120 of the flowchart illustrated in FIG. 30. Thus, detailed description of the processing will be omitted.

With reference to FIG. 32 again, in step S318, in a case where it is determined that the imaging information is to be displayed, the XR processor 110 transitions to step S330 and displays the imaging information INFO received from the imaging apparatus 200 in a superimposed manner on the XR display 140.

Figure 35:
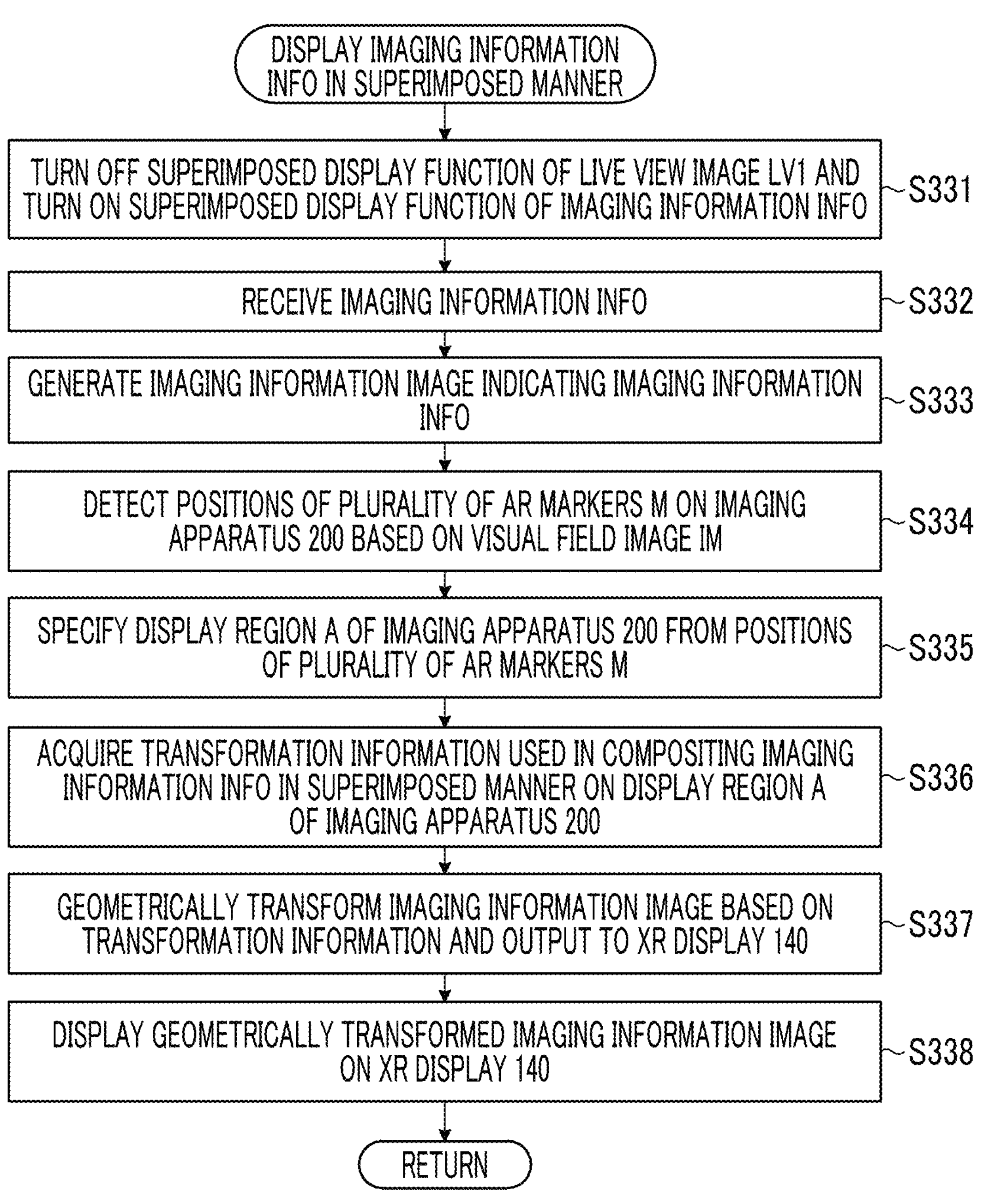
FIG. 35 is a subroutine illustrating an embodiment of processing of step S330 illustrated in FIG. 32 in which imaging information INFO is displayed in a superimposed manner.

FIG. 35 is a subroutine illustrating an embodiment of the processing of step S330 illustrated in FIG. 32 in which the imaging information INFO is displayed in a superimposed manner.

In FIG. 35, the XR processor 110 turns OFF a superimposed display function of the live view image LV1 in the virtual image display apparatus 100 and turns ON a superimposed display function of the imaging information INFO (step S331).

Next, the XR processor 110 receives the imaging information INFO of the text data from the imaging apparatus 200 (step S332).

The XR processor 110 generates an imaging information image (a raster image or a vector image) indicating the imaging information INFO from the received imaging information INFO (step S333).

Then, the XR processor 110 displays the imaging information image indicating the imaging information INFO in a superimposed manner on the display region A of the imaging apparatus 200 observed through the XR display 140, by performing processing of steps S334 to S338. While the processing of steps S334 to S338 is different from the processing of steps S325 to 329 of the flowchart illustrated in FIG. 34 in terms of displaying the imaging information image instead of the live view image LV1 (that is, a displayed image is different), the rest of the processing is the same. Thus, detailed description of the processing will be omitted.

With reference to FIG. 32 again, in step S318, in a case where it is determined that the playback image is to be displayed, the XR processor 110 transitions to step S340 and displays the playback image received from the imaging apparatus 200 in a superimposed manner on the XR display 140.

FIG. 36 is a subroutine illustrating an embodiment of the processing of step S340 illustrated in FIG. 32 in which the playback image is displayed in a superimposed manner.

In FIG. 36, the camera processor 210 of the imaging apparatus 200 identifies whether the playback image selected in the imaging apparatus 200 is an image of the imaging apparatus 200 (a captured image recorded in the second memory 220 of the imaging apparatus 200) or an image on a network (not illustrated) (an image of the user managed by a server on the network) (step S280). In this case, the imaging apparatus 200 can connect to the network and store the captured image in the server on the network or read out the captured image from the server.

In step S281, in a case where it is determined that the playback image is an image in the imaging apparatus 200, the camera processor 210 reads out the playback image from the second memory 220 of the imaging apparatus 200 in accordance with a user operation (step S282). The playback image may be read out from a memory card that is attachable and detachable to and from the imaging apparatus 200, instead of the second memory 220 that is an incorporated memory.

In step S281, in a case where it is determined that the playback image is an image on the network, the camera processor 210 reads out the playback image from an image group of the user stored on the network in accordance with a user operation (step S283).

The camera processor 210 transmits the playback image read out in step S282 or S283 to the virtual image display apparatus 100 (step S284).

The processing of steps S280 to S284 is processing performed by the imaging apparatus 200, and each processing below is processing performed by the virtual image display apparatus 100.

The XR processor 110 of the virtual image display apparatus 100 receives the playback image transmitted from the imaging apparatus 200 (step S341).

Then, the XR processor 110 displays the playback image in a superimposed manner on the display region A of the imaging apparatus 200 observed through the XR display 140 by performing processing of steps S342 to S346. While the processing of steps S342 to S346 is different from the processing of steps S325 to 329 of the flowchart illustrated in FIG. 34 in terms of displaying the playback image instead of the live view image LV1 (that is, a displayed image is different), the rest of the processing is the same. Thus, detailed description of the processing will be omitted.

As described above, the virtual image display apparatus 100 can display the live view image LV1, the imaging information INFO, or the playback image in a superimposed manner on the display region A of the imaging apparatus 200 observed through the XR display 140, and the user wearing the virtual image display apparatus 100 (smart glasses) can visually recognize the live view image LV1 or the like superimposed on the real world seen through the smart glasses.

<Method of Changing Exterior of Imaging Apparatus>

Figure 37:
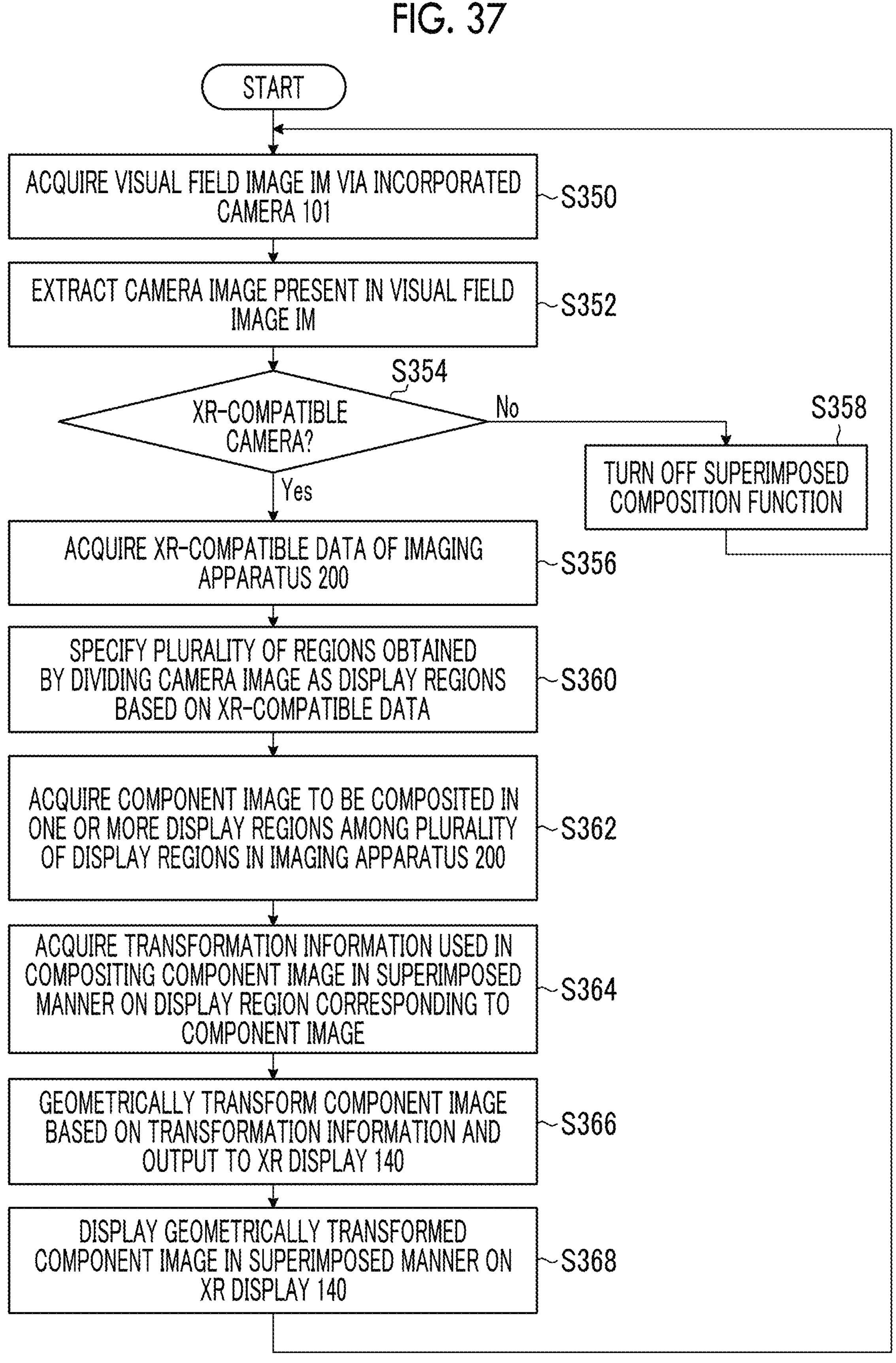
FIG. 37 is a flowchart illustrating an embodiment of a method of changing the exterior of the imaging apparatus.

FIG. 37 is a flowchart illustrating an embodiment of a method of changing the exterior of the imaging apparatus.

The method of changing the exterior of the imaging apparatus 200 illustrated in FIG. 37 is a method mainly performed by the XR processor 110 of the virtual image display apparatus 100 illustrated in FIG. 6.

In the method of changing the exterior of the imaging apparatus 200 of the present example, the exterior of the imaging apparatus 200 is not physically changed, and the exterior of the imaging apparatus 200 observed through the virtual image display apparatus 100 (smart glasses) is changed on the image.

In FIG. 37, the XR processor 110 acquires the visual field image IM captured by the incorporated camera 101 (step S350) and extracts the camera image of the imaging apparatus 200 present in the visual field image IM (step S352).

The XR processor 110 determines whether or not the imaging apparatus 200 is the XR-compatible camera from the extracted camera image (step S354). For example, this determination can be performed by comparing the extracted camera image with the exterior data of the XR-compatible camera stored in advance in the first memory 120.

In step S354, in a case where it is determined that the imaging apparatus 200 imaged by the incorporated camera 101 is the XR-compatible camera ("Yes"), the XR processor 110 acquires XR-compatible data of the imaging apparatus 200 (step S356). The XR-compatible data includes data indicating exterior shapes of an interchangeable lens portion, a leather exterior portion, an operation dial portion, an upper exterior portion, a finder portion, a monitor portion, and the like of the imaging apparatus 200.

In step S354, in a case where it is determined that the imaging apparatus 200 imaged by the incorporated camera 101 is not the XR-compatible camera ("No"), the XR processor 110 turns OFF the superimposed composition function of the live view image in the virtual image display apparatus 100 (smart glasses) (step S358) and returns to step S350. Accordingly, the user can see only the real world (the actual imaging apparatus 200) seen through the smart glasses.

Next, the XR processor 110 specifies a plurality of regions obtained by dividing the camera image as display regions based on the camera image extracted in step S352 and on the XR-compatible data acquired in step S356 (step S360). That is, regions of the interchangeable lens portion, the leather exterior portion, the operation dial portion, the upper exterior portion, the finder portion, the monitor portion, and the like corresponding to the XR-compatible data are specified as the display regions.

Next, the XR processor 110 acquires a component image to be composited in one or more display regions among a plurality of display regions in the imaging apparatus 200 based on a selection operation performed by the user (step S362). The first memory 120 of the virtual image display apparatus 100 stores component images (virtual object images) indicating the exterior for each divided region obtained by dividing the exterior of the imaging apparatus 200 into a plurality of regions, and the user can display a plurality of component images stored in the first memory 120 on the main monitor 241 and select the component image to be composited in the display region using the operation unit 230. The component images can be obtained by pasting an image on an outer surface of a three-dimensional model of a component.

The XR processor 110 acquires transformation information used in superimposing a three-dimensional component image on a two-dimensional display region corresponding to the component image (step S364). Three-dimensional data of the component image is already known, and two-dimensional data of the display region can also be detected. Thus, the transformation information for projecting the three-dimensional component image to coincide with the corresponding display region can be acquired.

The XR processor 110 geometrically transforms the component image based on the transformation information acquired in step S364 and outputs the geometrically transformed component image to the XR display 140 (step S366).

The XR display 140 displays the geometrically transformed component image in a superimposed manner on the display region of the imaging apparatus 200 by receiving input of the component image and displaying the component image on the display element 144 (step S368). The user can visually recognize the component image (the skin that changes the exterior) superimposed on the real world (the display region of the imaging apparatus 200) through the optical system 146 of the XR display 140. That is, the user can set an original imaging apparatus having a preferred exterior. One imaging apparatus can be differently used with several types of exteriors.

It is also possible to display the live view image LV1 or the like in a superimposed manner on the display region of the monitor portion of the imaging apparatus while changing the exterior of the imaging apparatus.

Other

The imaging apparatus 200 of the present embodiment can perform selfie imaging in a case where the XR mode is set. In this case, the live view image LV1 can be displayed in a display region set on the front surface of the imaging apparatus 200 or the display region A on the submonitor 242 side of the monitor panel 240 rotationally moved by 180°. While the user is wearing the smart glasses or the VR goggles, it is preferable to composite a face image of the avatar in a face region of the user.

The imaging apparatus 200 has a function of switching among a display aspect of compositing the imaging information INFO in the live view image LV and displaying the live view image LV on the main monitor 241, a display aspect of displaying only the live view image LV on the main monitor 241, and a display aspect of displaying only the imaging information INFO each time the display/return button 247 is pushed in the non-XR environment. However, in a case where the imaging apparatus 200 is used in the XR environment, the virtual image display apparatus 100 preferably displays the live view image LV1 or the like in accordance with the display aspect set in the non-XR environment.

The XR processor 110 of the virtual image display apparatus 100 preferably changes brightness of the live view image LV1 to be composited in accordance with brightness of the visual field image IM captured by the incorporated camera 101 such that the brightness of the live view image LV1 is increased in a case where the display region A of the imaging apparatus 200 is bright and is decreased in a case where the display region A of the imaging apparatus 200 is dark. In a case where the brightness causes washing out or darkening, the XR processor 110 preferably controls the brightness of the live view image LV1 within a range not exceeding a threshold value set in advance so that washing out or darkening does not occur.

In the present embodiment, for example, a hardware structure of a processing unit such as a central processing unit (CPU) that executes various types of processing includes various processors illustrated below. The various processors include a CPU that is a general-purpose processor functioning as various processing units by executing software (program), a programmable logic device (PLD) such as a field programmable gate array (FPGA) that is a processor having a circuit configuration changeable after manufacture, a dedicated electric circuit such as an application specific integrated circuit (ASIC) that is a processor having a circuit configuration dedicatedly designed to execute specific processing, and the like.

One processing unit may be composed of one of the various processors or may be composed of two or more processors of the same type or different types (for example, a plurality of FPGAs or a combination of a CPU and an FPGA). A plurality of processing units may be composed of one processor. Examples of the plurality of processing units composed of one processor include, first, as represented by a computer such as a client and a server, an aspect in which one processor is composed of a combination of one or more CPUs and software, and the processor functions as the plurality of processing units. Second, as represented by a system on chip (SoC) and the like, an aspect of using a processor that implements functions of the entire system including the plurality processing units in one integrated circuit (IC) chip is included. As described above, various processing units are configured using one or more of the various processors as a hardware structure.

The hardware structure of the various processors is more specifically an electric circuit (circuitry) in which circuit elements such as semiconductor elements are combined.

Any modifications that comprise a plurality of embodiments described above and to which the imaging apparatus or the system according to the embodiment of the present invention can be applied can be made to the present invention in a selective or compatible manner.

While the "first display" of the virtual image display apparatus is a wearable device having an eyewear type or goggles type virtual image display function and provides a video including a virtual image using an HMD device or a transmissive type smart glasses, other methods (for example, a method of displaying a virtual image based on a projection mapping principle using a retinal projection apparatus incorporated in the smart glasses or the like or a projector as a display method of the first display) to which the imaging apparatus or the system according to the embodiment of the present invention can be applied and that can implement display which is the nature of the present invention may be used for a display unit as the first display.

While the virtual image display apparatus 100 geometrically transforms the live view image LV and outputs the geometrically transformed live view image LV1 to the XR display 140, the virtual image display apparatus 100, as described above, may acquire the geometrically transformed live view image LV1 from the XR server 300 or acquire the geometrically transformed live view image LV1 from the imaging apparatus 200. In this case, in order to perform processing of geometrically transforming the live view image LV, the imaging apparatus 200 needs to acquire the visual field image IM from the virtual image display apparatus 100 or acquire the information indicating the relative three-dimensional position and the relative posture between the virtual image display apparatus 100 and the imaging apparatus 200.

In a case where the imaging apparatus 200 is used in the XR environment (in a case where the XR mode is set), the virtual image display apparatus 100 displays the live view image LV1 in a superimposed manner on the display region of the imaging apparatus 200 on the XR display 140. However, even in a case where the imaging apparatus 200 is used in the non-XR environment (normal environment) (in a case where the non-XR mode is set), the virtual image display apparatus 100 may turn ON the superimposed composition function of the live view image LV1. Accordingly, in a case where the imaging apparatus 200 is used in the normal environment, an advantage of being able to favorably observe the live view image LV1 even in a case where it is difficult to see the display of the imaging apparatus 200 because of irradiation with direct sunlight is achieved.

Even in a case where the imaging apparatus 200 using this technology is "being used in the XR environment", it may be configured to selectively display the live view image on the display of the imaging apparatus 200 by providing a mode in which the live view image LV is not automatically transmitted to the virtual image display apparatus 100.

The present invention is not limited to the embodiments described above, and various modifications can be made without departing from the spirit of the present invention.

EXPLANATION OF REFERENCES

10, 11: virtual image display system
100: virtual image display apparatus
101: incorporated camera
102: imaging lens
104: image sensor
110, 111: XR processor
112: transformation information acquisition unit
114: composition unit
116: geometric transformation unit
120: first memory
130, 230: operation unit
140, 141: XR display
142: display control unit
143: image composition unit
144, 145: display element
146, 147: optical system
146A: lens
146B: half mirror
150: virtual object generation unit
151: interchangeable lens portion
152: leather exterior portion
153: operation dial portion
154: upper exterior portion
155: finder portion
156: monitor portion
160: first communication unit
170, 270: GPS receiver
172, 272: gyro sensor
174, 274: acceleration sensor
176, 276: geomagnetic sensor
180: virtual image display apparatus
200, 280: imaging apparatus
201: imaging unit
202: interchangeable lens
203: camera body
204: image sensor
210: camera processor

220: second memory
232: shutter button
234: sensitivity dial
236: exposure correction dial
240: monitor panel
241: main monitor
242: submonitor
243: view finder
244: toggle switch
245: execution button
246: play button
247: button
248: display control unit
250: image processing unit
260: second communication unit
281: dummy lens
282: real lens
283: dummy monitor
290, 290B, 290C, 292: virtual camera
291: smartphone
300: XR server
302: database
310: drone camera
320: multi-view camera
330: surveillance camera
340: driving recorder
A: display region
IM: visual field image
INFO: imaging information
LV, LV1: live view image
M, M1 to M9: AR marker
P1 to P4: feature point
P1' to P4': corresponding point
S100 to S122, S200 to S284, S300 to S368: step

What is claimed is:

1. A virtual image display apparatus comprising:

a processor; and a first display, wherein the virtual image display apparatus receives a live view image from a first imaging apparatus, the processor is configured to:

acquire information used in superimposing the live view image on a display region of the first imaging apparatus; and transform the live view image based on the information, and the first display displays the transformed live view image.

2. The virtual image display apparatus according to claim 1, wherein the first display is a wearable device having an eyewear type or goggles type virtual image display function.

3. The virtual image display apparatus according to claim 1, further comprising:

a second imaging apparatus that images a visual field range of a user, wherein the processor is configured to specify the display region by analyzing a captured image captured by the second imaging apparatus and acquire the information.

4. The virtual image display apparatus according to claim 3, wherein the processor is configured to acquire the information based on a position of a marker of the first imaging apparatus imaged by the second imaging apparatus.

5. The virtual image display apparatus according to claim 1, wherein the processor is configured to acquire information indicating a three-dimensional position and a posture of the first imaging apparatus with reference to the first display and acquire the information based on the information indicating the three-dimensional position and the posture.

6. The virtual image display apparatus according to claim 1, wherein the first imaging apparatus includes a second display that displays the live view image, and the display region is a display region of the second display.

7. The virtual image display apparatus according to claim 6, wherein the second display includes a rotational moving mechanism capable of changing a relative posture relationship with an apparatus body of the first imaging apparatus by rotationally moving the second display, and the display region is a display region of the rotationally moved second display.

8. The virtual image display apparatus according to claim 1, wherein the first imaging apparatus includes a view finder, and the display region is a display region of the view finder.

9. The virtual image display apparatus according to claim 1, wherein the first display is a display through which a visual field is seen, and displays the transformed live view image in a visual field in a real world.

10. The virtual image display apparatus according to claim 1, further comprising:

a second imaging apparatus that images a visual field range of a user, wherein the first display is an immersive type display covering a visual field, and displays a composite image obtained by superimposing the transformed live view image on a captured image captured by the second imaging apparatus.

11. The virtual image display apparatus according to claim 1, wherein the processor is configured to composite a virtual object image in the live view image.

12. The virtual image display apparatus according to claim 1, wherein the transformation is geometric transformation.

13. A virtual image display system comprising:

the virtual image display apparatus according to claim 1; and an imaging apparatus.

14. An imaging apparatus comprising:

an imaging unit that captures a live view image;

a mode switching unit that switches between a first mode and a second mode;

a second display or a view finder that displays the live view image in a case where the imaging apparatus is switched to the first mode; and a communication unit that transmits the live view image to the virtual image display apparatus according to claim 1 in a case where the imaging apparatus is switched to the second mode.

15. The imaging apparatus according to claim 14, wherein in a case where the imaging apparatus is switched to the second mode, a marker is displayed on the second display or the view finder.

16. A virtual image display system comprising:

the imaging apparatus according to claim 14; and a virtual image display apparatus comprising a processor and a first display, wherein the virtual image display apparatus receives a live view image from a first imaging apparatus, the processor is configured to:

acquire information used in superimposing the live view image on a display region of the first imaging apparatus; and transform the live view image based on the information, and the first display displays the transformed live view image.

17. The virtual image display system according to claim 16, wherein the processor of the virtual image display apparatus is configured to:

composite a virtual object image in the live view image; and in a case where imaging for recording is performed in a state where the imaging apparatus is switched to the second mode, transmit the virtual object image to the imaging apparatus, and in a case of performing the imaging for recording in a state where the imaging apparatus is switched to the second mode, the imaging apparatus records the captured image and the virtual object image received from the virtual image display apparatus in association with each other or records the captured image and the virtual object image by compositing the virtual object image in the captured image.

18. A virtual image display system comprising:

the virtual image display apparatus according to claim 1; and a server that communicates with the virtual image display apparatus, wherein the server manages a three-dimensional image having three-dimensional information of a real space, and the processor is configured to:

cut out a three-dimensional image corresponding to an imaging region of the first imaging apparatus from the three-dimensional image managed by the server based on first information indicating a three-dimensional position and a posture of the first imaging apparatus; and transform the cut three-dimensional image into a two-dimensional image and use the two-dimensional image as the live view image.

19. The virtual image display system according to claim 18, wherein the server generates and manages the latest three-dimensional image from images captured by a large number of cameras including a multi-view camera, a surveillance camera, a driving recorder, a drone camera, or a portable terminal camera disposed in a real space.

20. The virtual image display system according to claim 18, wherein the server composites a virtual object image in the three-dimensional image.

21. A virtual image display apparatus comprising:

a processor;

a first display; and a second imaging apparatus that images a visual field range of a user, wherein the processor is configured to:

cut out an image corresponding to an angle of view of a virtual camera including at least a grip portion from an image captured by the second imaging apparatus and acquire the cut image as a live view image;

acquire information used in superimposing the live view image on a display region of the virtual camera; and transform the live view image based on the information, and the first display displays the transformed live view image.

22. The virtual image display apparatus according to claim 21, wherein the transformation is geometric transformation.

23. A virtual image display system comprising:

the virtual image display apparatus according to claim 21; and an imaging apparatus.

24. The virtual image display system according to claim 23, wherein the processor of the virtual image display apparatus is configured to:

composite a virtual object image in the live view image; and in a case where imaging for recording is performed in a state where the imaging apparatus is switched to the second mode, transmit the virtual object image to the imaging apparatus, and in a case of performing the imaging for recording in a state where the imaging apparatus is switched to the second mode, the imaging apparatus records the captured image and the virtual object image received from the virtual image display apparatus in association with each other or records the captured image and the virtual object image by compositing the virtual object image in the captured image.

25. A virtual image display system comprising:

the virtual image display apparatus according to claim 21; and a server that communicates with the virtual image display apparatus, wherein the server manages a three-dimensional image having three-dimensional information of a real space, and the processor is configured to:

cut out a three-dimensional image corresponding to an imaging region of the virtual camera from the three-dimensional image managed by the server based on first information indicating a three-dimensional position and a posture of the virtual camera; and transform the cut three-dimensional image into a two-dimensional image and use the two-dimensional image as the live view image.

26. The virtual image display system according to claim 25, wherein the server generates and manages the latest three-dimensional image from images captured by a large number of cameras including a multi-view camera, a surveillance camera, a driving recorder, a drone camera, or a portable terminal camera disposed in a real space.

27. The virtual image display system according to claim 25, wherein the server composites a virtual object image in the three-dimensional image.

28. A virtual image display method executed by a virtual image display apparatus including a processor and a first display, the method comprising:

a step of receiving a live view image from a first imaging apparatus via the processor;

a step of acquiring information used in superimposing the live view image on a display region of the first imaging apparatus via the processor;

a step of transforming the live view image based on the information via the processor; and a step of displaying the transformed live view image via the first display.

* * * * *